Jan. 25, 1966 H. W. FAEBER 3,231,100

AUTOMATIC JOGGER MECHANISM

Filed May 15, 1961 32 Sheets-Sheet 1

INVENTOR.
HARRY W. FAEBER

BY Brumbaugh, Free, Graves & Donohue
his ATTORNEYS

INVENTOR.
HARRY W. FAEBER
BY
Brumbaugh, Free, Graves & Donohue
his ATTORNEYS

Jan. 25, 1966 H. W. FAEBER 3,231,100

AUTOMATIC JOGGER MECHANISM

Filed May 15, 1961 32 Sheets-Sheet 3

INVENTOR.
HARRY W. FAEBER

BY

Brumbaugh, Free, Graves & Donohue
his ATTORNEYS

AUTOMATIC JOGGER MECHANISM

Filed May 15, 1961 32 Sheets-Sheet 4

INVENTOR.
HARRY W. FAEBER

BY
Brumbaugh, Free, Graves & Donohue
his ATTORNEYS

AUTOMATIC JOGGER MECHANISM

INVENTOR.
HARRY W. FAEBER

BY

Brumbaugh, Free, Graves & Donohue
his ATTORNEYS

AUTOMATIC JOGGER MECHANISM

Filed May 15, 1961

INVENTOR.
HARRY W. FAEBER

BY

Brumbaugh, Free, Graves & Donohue his ATTORNEYS.

INVENTOR.
HARRY W. FAEBER

BY

Brumbaugh, Free, Graves & Donohue
his ATTORNEYS

Jan. 25, 1966 H. W. FAEBER 3,231,100

AUTOMATIC JOGGER MECHANISM

Filed May 15, 1961 32 Sheets-Sheet 8

INVENTOR.
HARRY W. FAEBER

BY

[signature]

his ATTORNEYS.

Jan. 25, 1966 H. W. FAEBER 3,231,100

AUTOMATIC JOGGER MECHANISM

Filed May 15, 1961 32 Sheets-Sheet 9

INVENTOR.
HARRY W. FAEBER

BY

Brumbaugh, Free, Graves & Donohue
his ATTORNEYS.

Jan. 25, 1966 H. W. FAEBER 3,231,100

AUTOMATIC JOGGER MECHANISM

Filed May 15, 1961 32 Sheets-Sheet 10

INVENTOR.
HARRY W. FAEBER

BY

Brumbaugh, Free, Graves & Donohue

ATTORNEYS

Jan. 25, 1966 H. W. FAEBER 3,231,100

AUTOMATIC JOGGER MECHANISM

Filed May 15, 1961 32 Sheets-Sheet 11

INVENTOR.
HARRY W. FAEBER

BY

Brumbaugh, Free, Graves & Donohue
his ATTORNEYS

Jan. 25, 1966 H. W. FAEBER 3,231,100

AUTOMATIC JOGGER MECHANISM

Filed May 15, 1961 32 Sheets-Sheet 12

INVENTOR.
HARRY W. FAEBER

BY

Brumbaugh, Free, Graves & Donohue his ATTORNEYS

AUTOMATIC JOGGER MECHANISM

Filed May 15, 1961 32 Sheets-Sheet 13

INVENTOR.
HARRY W. FAEBER
BY
Brumbaugh, Free, Graves & Donohue
his ATTORNEYS

INVENTOR.
HARRY W. FAEBER

BY his ATTORNEYS

INVENTOR.
HARRY W. FAEBER
BY
Brumbaugh, Free, Graves & Donohue
his ATTORNEYS

AUTOMATIC JOGGER MECHANISM

Filed May 15, 1961 32 Sheets-Sheet 16

INVENTOR.
HARRY W. FAEBER

BY
Brumbaugh, Free, Graves & Donohue
his ATTORNEYS

INVENTOR.
HARRY W. FAEBER
BY
Brumbaugh, Free, Graves & Donohue
his ATTORNEYS

AUTOMATIC JOGGER MECHANISM

Filed May 15, 1961 32 Sheets-Sheet 18

INVENTOR.
HARRY W. FAEBER

BY

Brumbaugh, Free, Graves & Donohue his ATTORNEYS

INVENTOR.
HARRY W. FAEBER
BY
Brumbaugh, Free, Graves & Donohue
his ATTORNEYS

INVENTOR.
HARRY W. FAEBER

BY
Brumbaugh, Free, Graves & Donohue
his ATTORNEYS

INVENTOR.
HARRY W. FAEBER
BY
Brumbaugh, Free, Graves & Donohue
his ATTORNEYS.

Jan. 25, 1966 H. W. FAEBER 3,231,100

AUTOMATIC JOGGER MECHANISM

Filed May 15, 1961 32 Sheets-Sheet 22

INVENTOR.
HARRY W. FAEBER

BY

Brumbaugh, Free, Graves & Donohue his ATTORNEYS

Jan. 25, 1966 H. W. FAEBER 3,231,100

AUTOMATIC JOGGER MECHANISM

Filed May 15, 1961

32 Sheets-Sheet 23

INVENTOR.
HARRY W. FAEBER

BY

[signature]

his ATTORNEYS

AUTOMATIC JOGGER MECHANISM

Filed May 15, 1961 32 Sheets-Sheet 24

INVENTOR.
HARRY W. FAEBER

BY his ATTORNEYS

INVENTOR.
HARRY W. FAEBER
BY
Brumbaugh, Free, Graves & Donohue
his ATTORNEYS

INVENTOR.
HARRY W. FAEBER
BY
Brumbaugh, Free, Graves & Donohue
his ATTORNEYS

INVENTOR.
HARRY W. FAEBER
BY
Brumbaugh, Free, Graves & Donohue
his ATTORNEYS

AUTOMATIC JOGGER MECHANISM

Filed May 15, 1961 32 Sheets-Sheet 28

INVENTOR.
HARRY W. FAEBER
BY
Brumbaugh, Free, Graves & Donohue
his ATTORNEYS

INVENTOR.
HARRY W. FAEBER

BY
Brumbaugh, Free, Graves & Donohue
his ATTORNEYS

INVENTOR.
HARRY W. FAEBER
BY
Brumbaugh, Free, Graves & Donohue
his ATTORNEYS

Jan. 25, 1966 H. W. FAEBER 3,231,100

AUTOMATIC JOGGER MECHANISM

Filed May 15, 1961 32 Sheets-Sheet 31

INVENTOR.
HARRY W. FAEBER

BY
Brumbaugh, Free, Graves & Donohue
his ATTORNEYS

INVENTOR.
HARRY W. FAEBER
BY
Brumbaugh, Free, Graves & Donohue
his ATTORNEYS 3,231,100
Patented Jan. 25, 1966

3,231,100

AUTOMATIC JOGGER MECHANISM

Harry W. Faeber, Larchmont, N.Y., assignor to Time, Incorporated, New York, N.Y., a corporation of New York Filed May 15, 1961, Ser. No. 111,420
17 Claims. (Cl. 214—6)

This is a continuation-in-part of copending application Serial No. 838,156, filed September 4, 1959, now abandoned, for Automatic Jogger Mechanism.

This invention, generally, relates to apparatus for stacking flexible sheets, such as signatures and the like, in an aligned relationship to facilitate subsequent handling.

With present-day high-speed printing apparatus, a moving web, after leaving a printer, is cut at appropriate intervals to form separate sheets. One or more of the printed sheets are folded to form "signatures." Machines are available today to perform these operations at extremely high speeds.

Until recently, the signatures leaving the folder apparatus were jogged manually to arrange them in stacks with the folded edges in accurate alignment, and this operation required relatively large number of "fly boys" to keep up with the output of the high-speed printers and folders. Attempts have been made in the past to develop mechanisms for jogging the signatures automatically as they are received from the folder apparatus and to deliver the jogged, aligned signatures to a binder machine. However, with the increased speeds at which printers and folders operate today, a need has been recognized for a completely automatic jogger mechanism capable of operating at speeds at least as great as the speeds of the printer and folder apparatus.

Accordingly, it is an object of this invention to provide a novel, completely automatic, high-speed mechanism to receive the signatures directly from the folder apparatus, arrange signatures in stacks with accurately aligned edges, and to deliver the aligned stacks to a binder apparatus.

It is also an object of this invention to provide a mechanism for automatically diverting a flow of signatures from one jogger receptacle to another receptacle without interrupting the flow of signatures from the folder apparatus.

A further object of the invention is to provide a mechanism utilizing a single jogger receptacle for automatically stacking signatures in piles with accurately aligned edges and delivering the stacks of aligned signatures at high speeds to a conveyor without interrupting the flow of signatures from the folder apparatus.

Generally, the automatic jogger mechanism of the invention embodies a conveyor system to receive signatures in an overlapped and stepped or echeloned stream as they come from a folder apparatus. The conveyor system delivers the signatures to a jogger receptacle of unique construction so that the signatures are rapidly stacked with the folded edges in accurate alignment. At appropriate, predetermined intervals the jogger receptacle is emptied, and the stack of signatures is delivered automatically to an output station from which it is delivered for subsequent operations. To permit various actions, such as, for example, transferring the delivery of signatures from one piece of apparatus to another, an interrupter mechanism is provided for temporarily interrupting the stream of signatures to form a gap in the stream.

Other objects and advantages of the present invention will become apparent from the following detailed description taken in conjunction with the accompanying drawings.

In the drawings:

FIGURES 1A, 1B and 1C arranged, respectively, from right to left, show an illustrative embodiment of a jogger mechanism in accordance with the present invention;

Figure 17A:
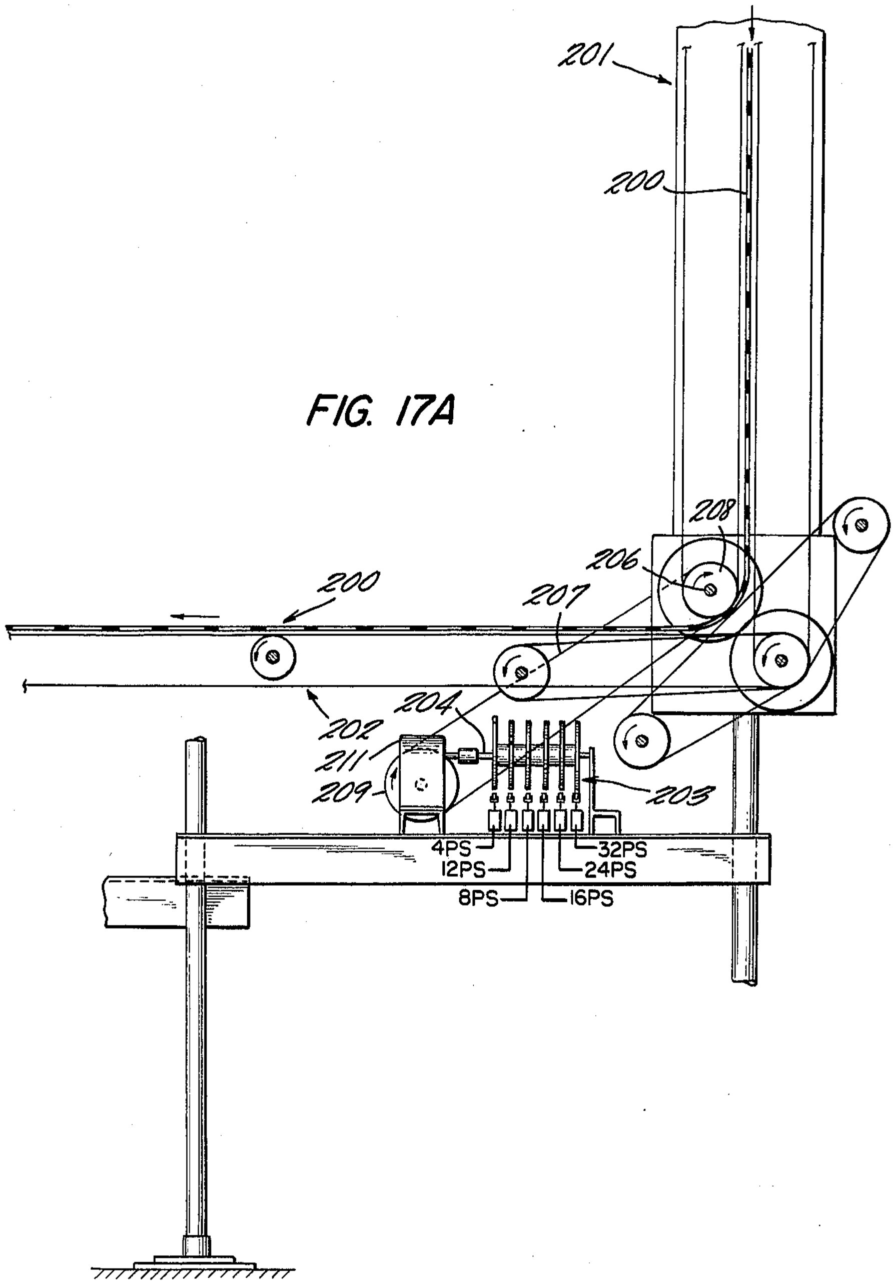
Figure 17B:
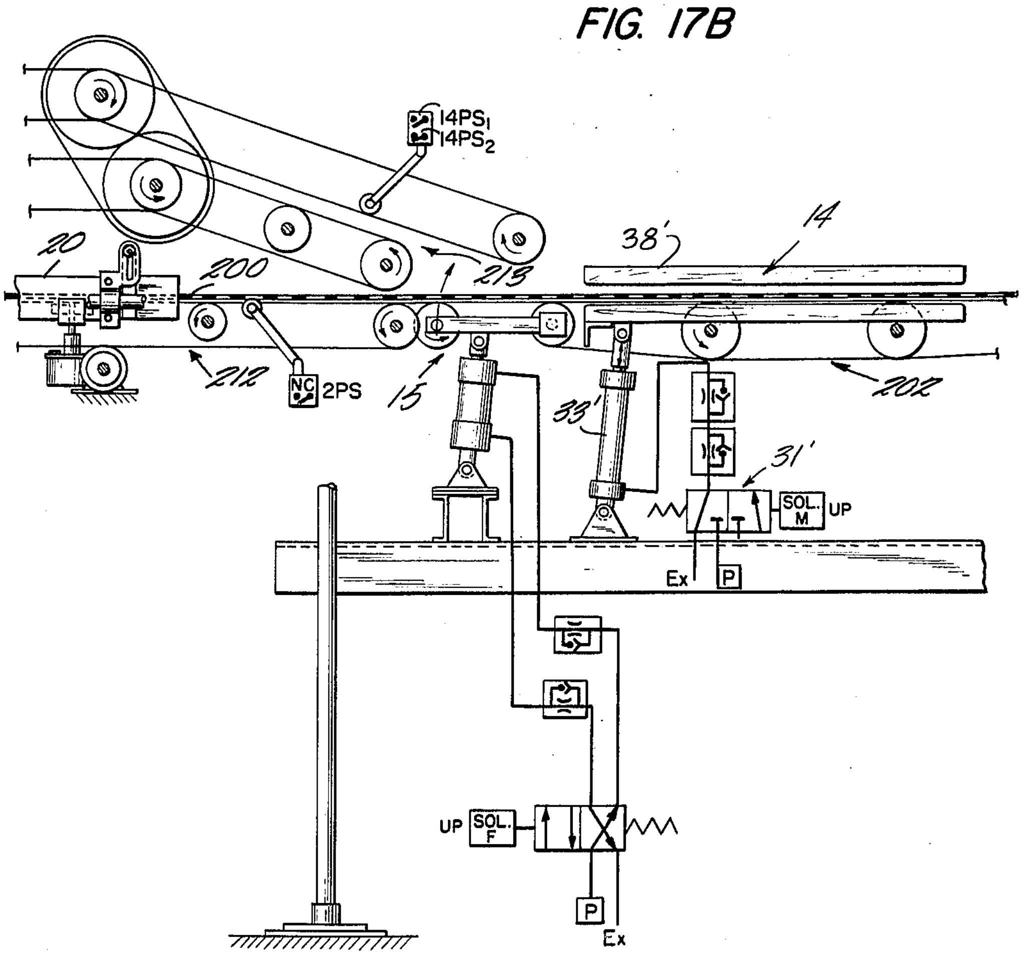
Figures 17C, 17D:
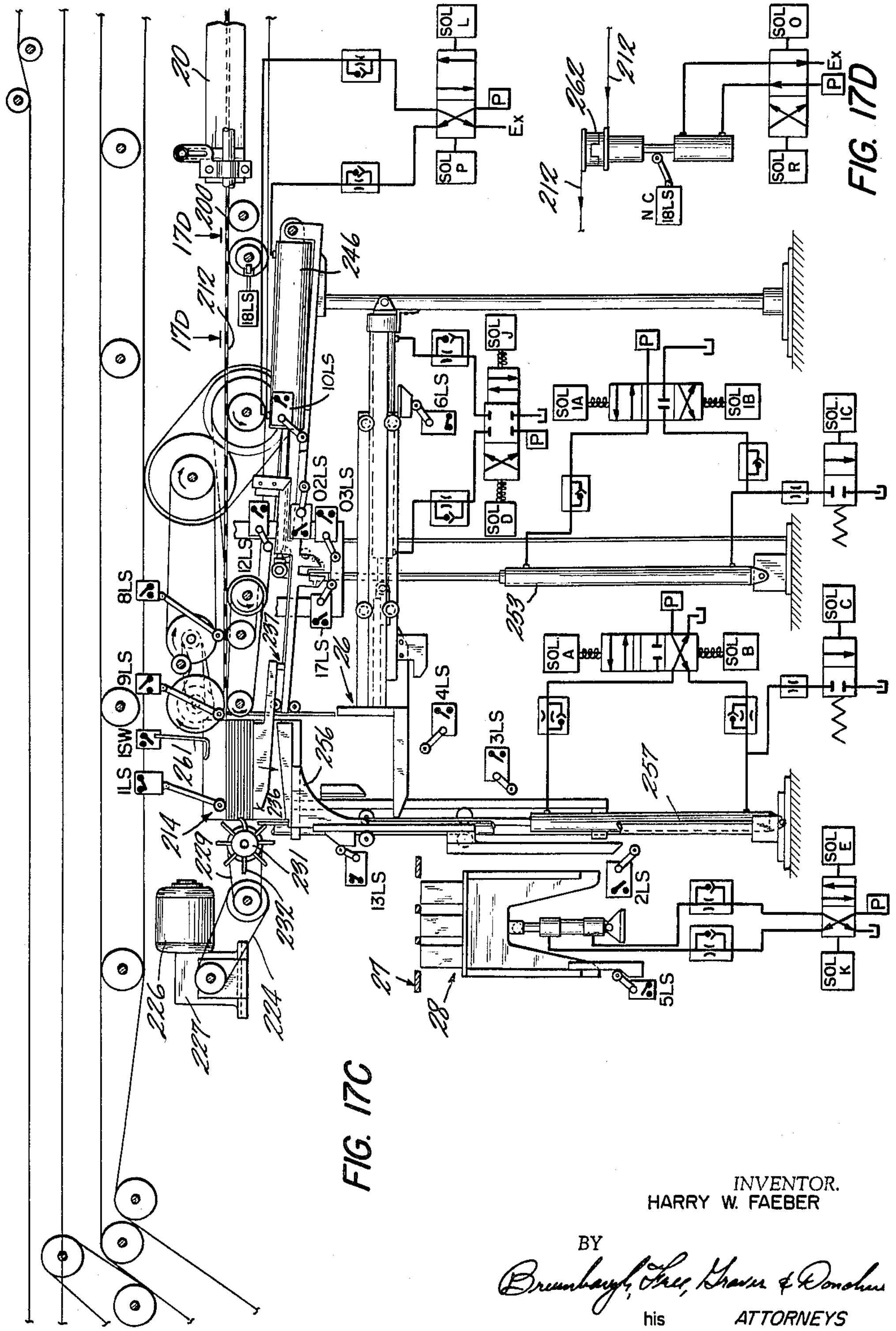
Figures 17E, 17F:
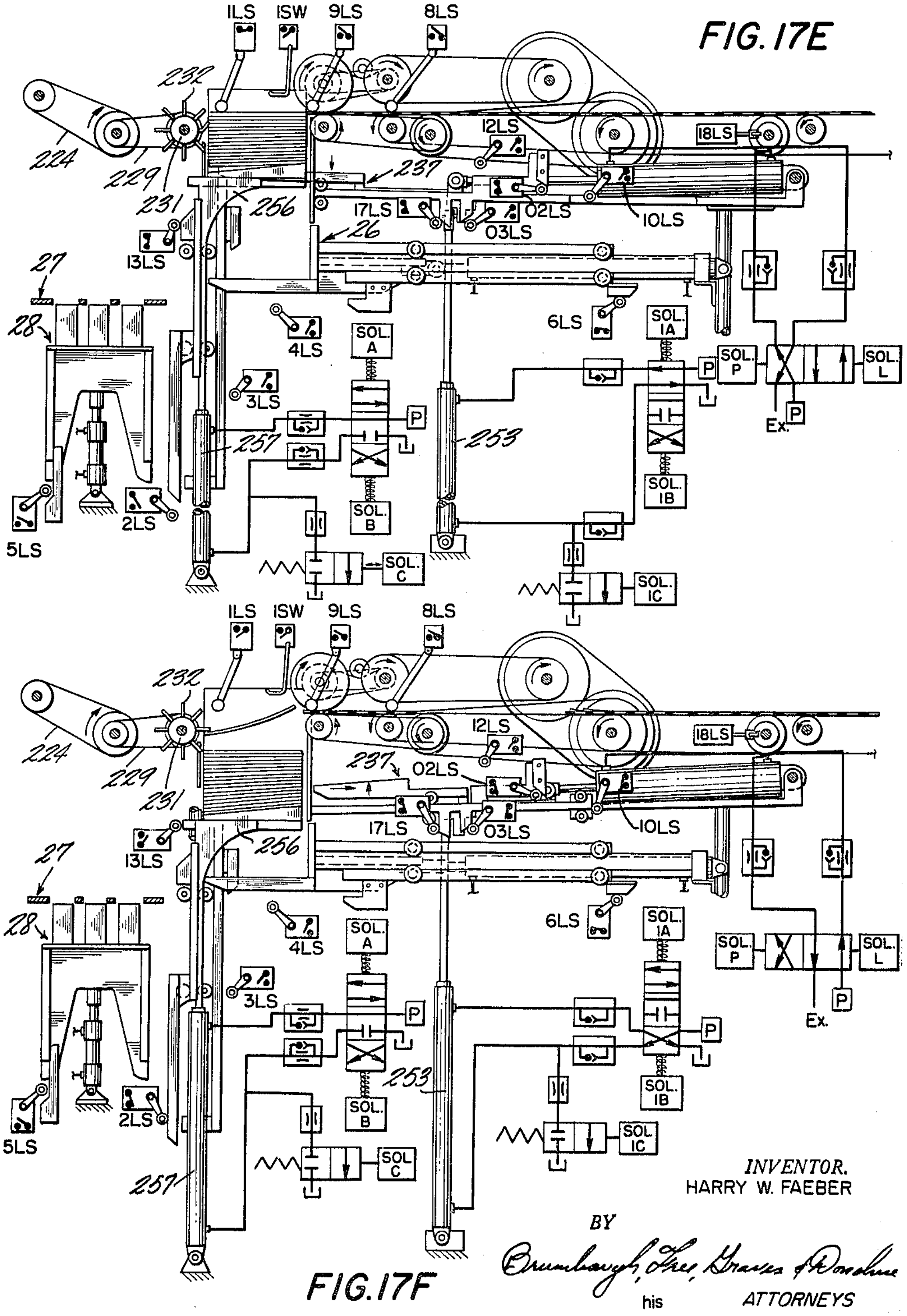
Figure 17G:
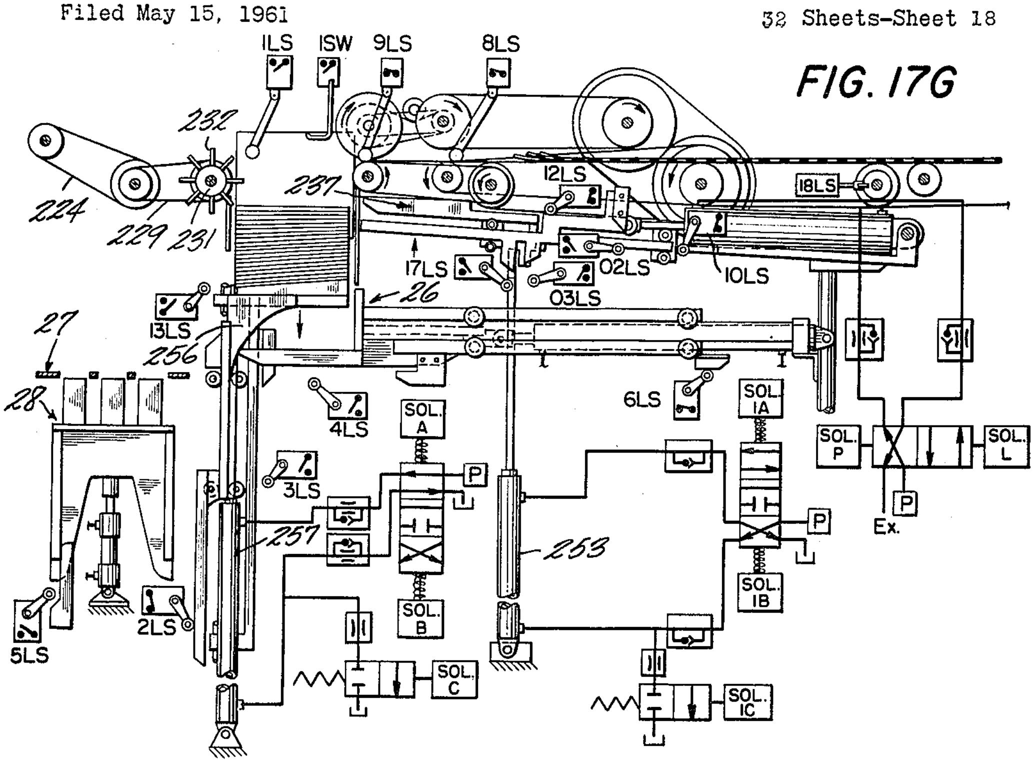
Figure 17H:
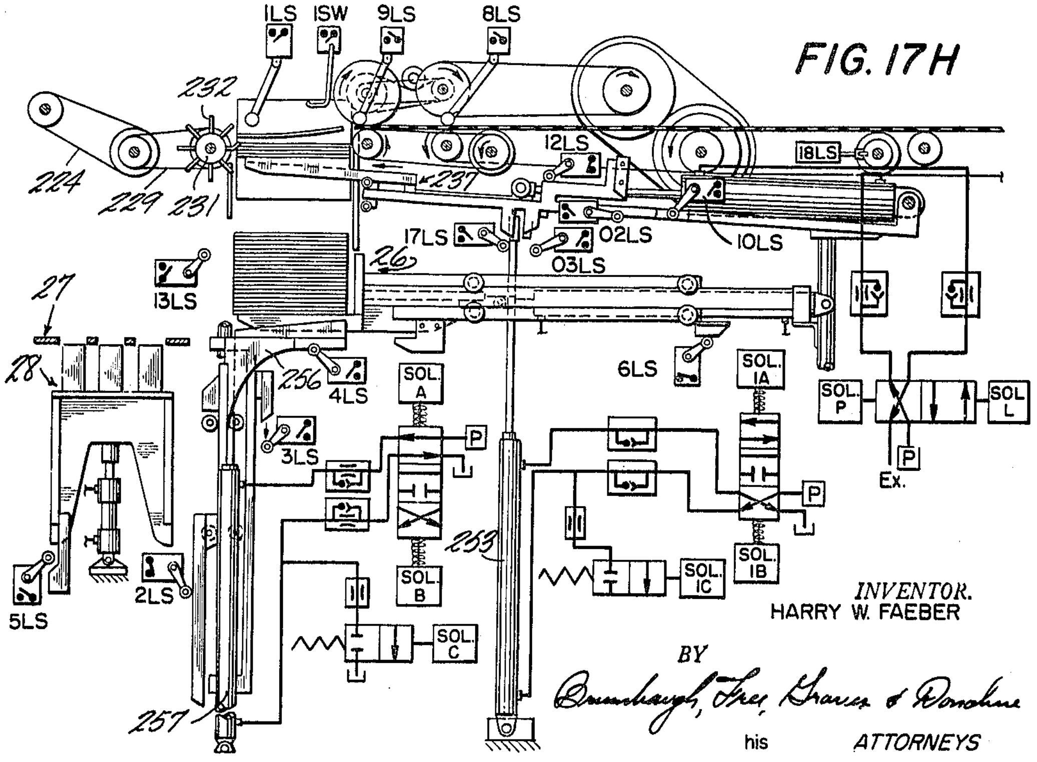
Figure 19:
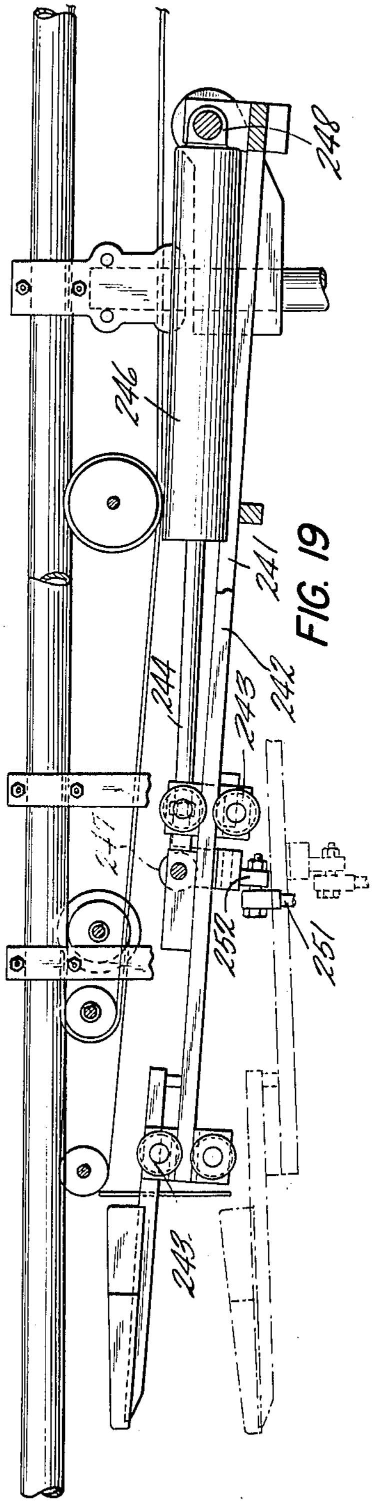
Figure 18:
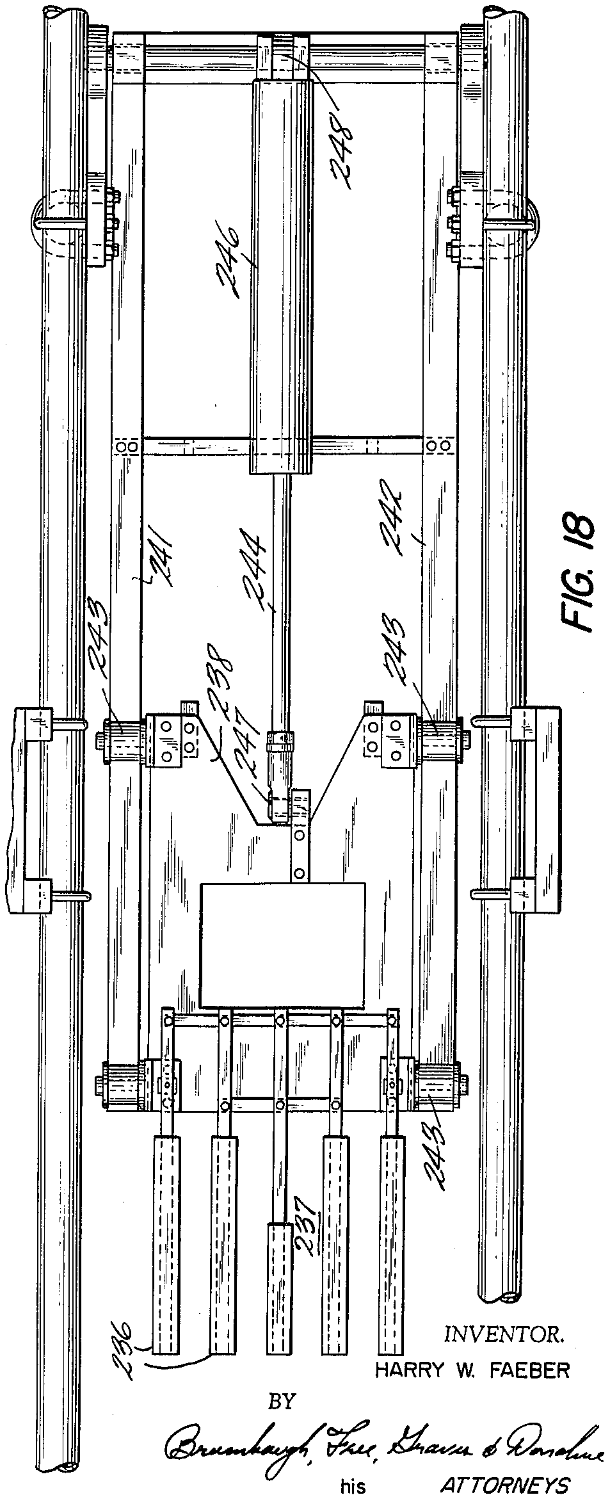
Figures 20, 23:
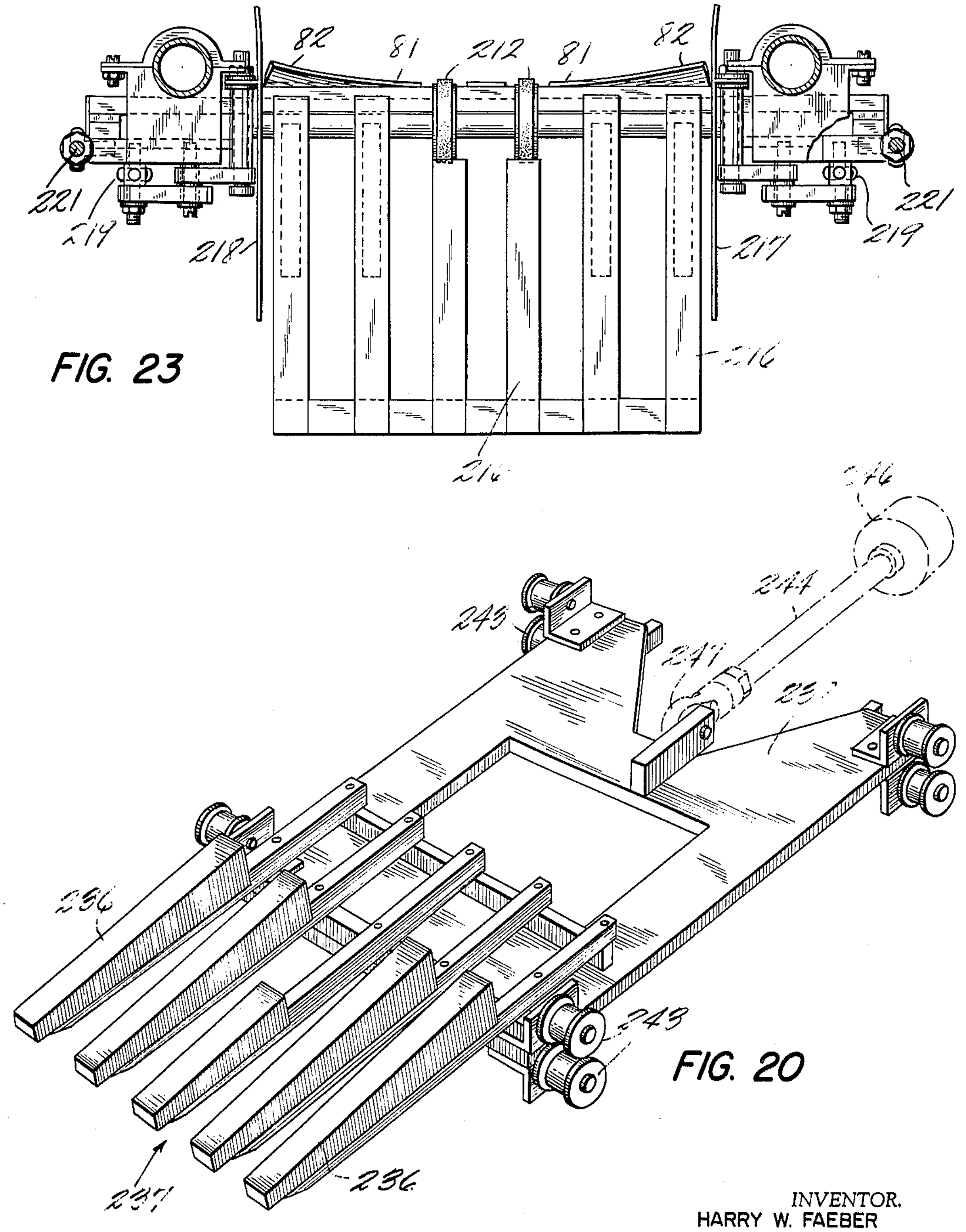
Figure 21:
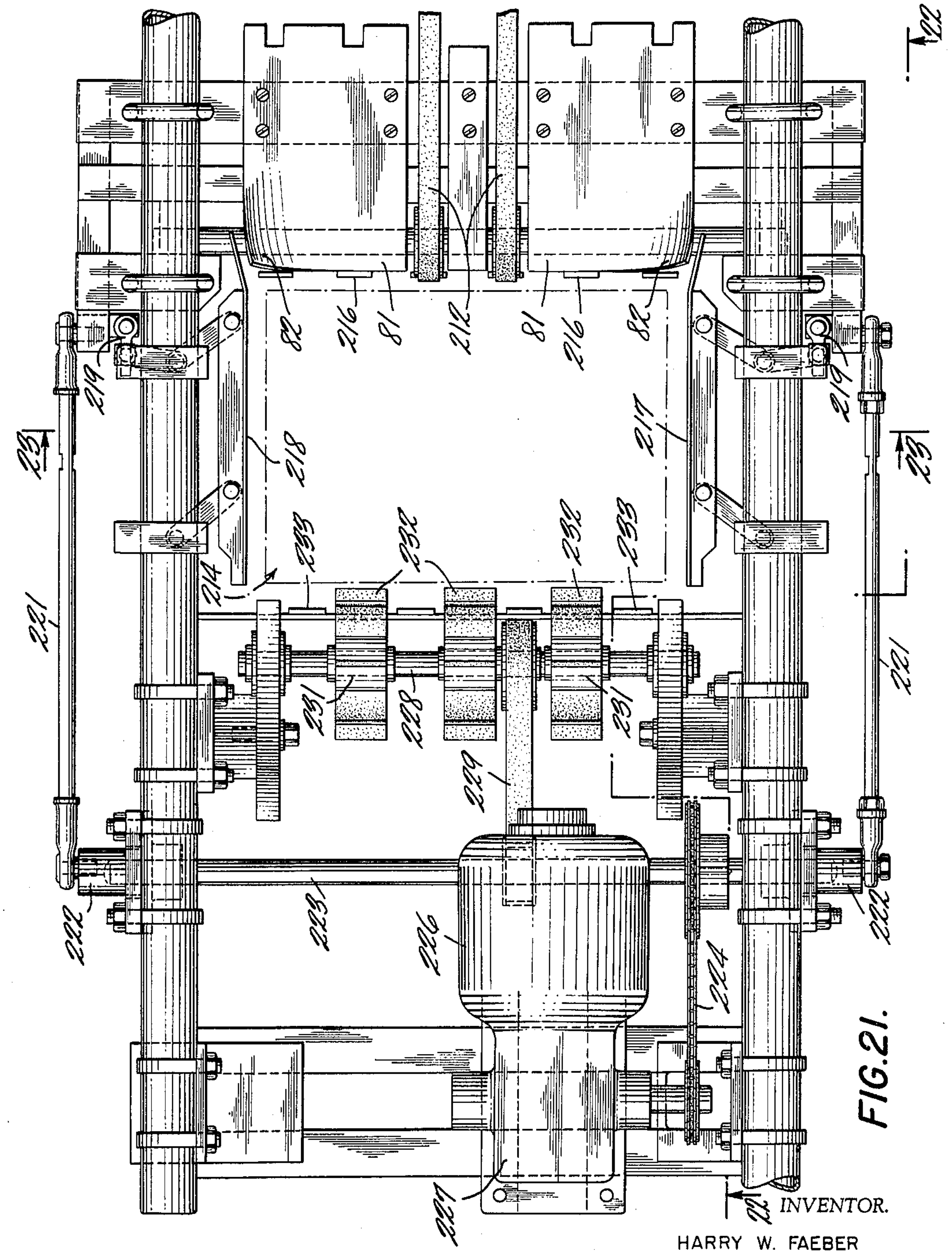
Figure 22:
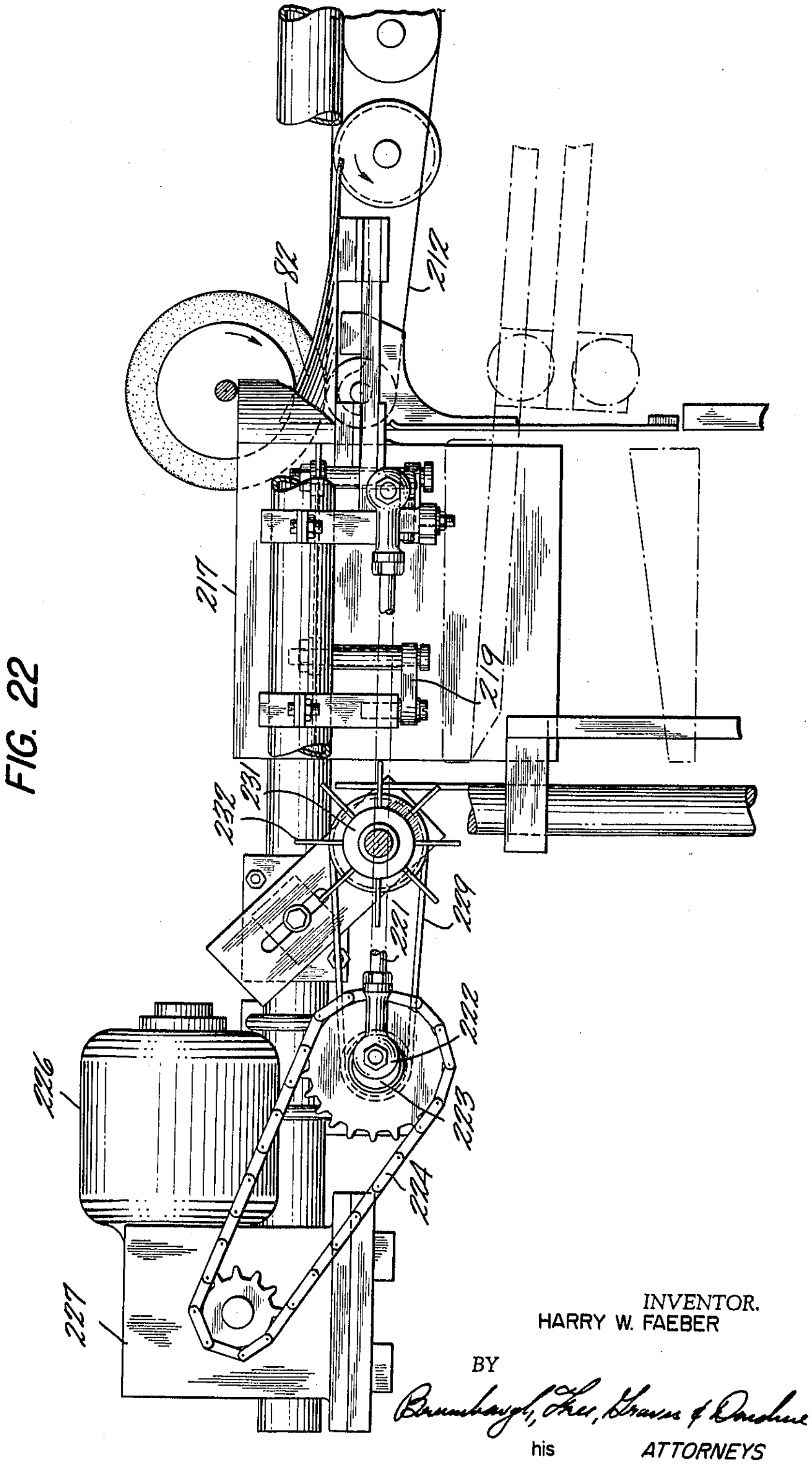
Figure 24:
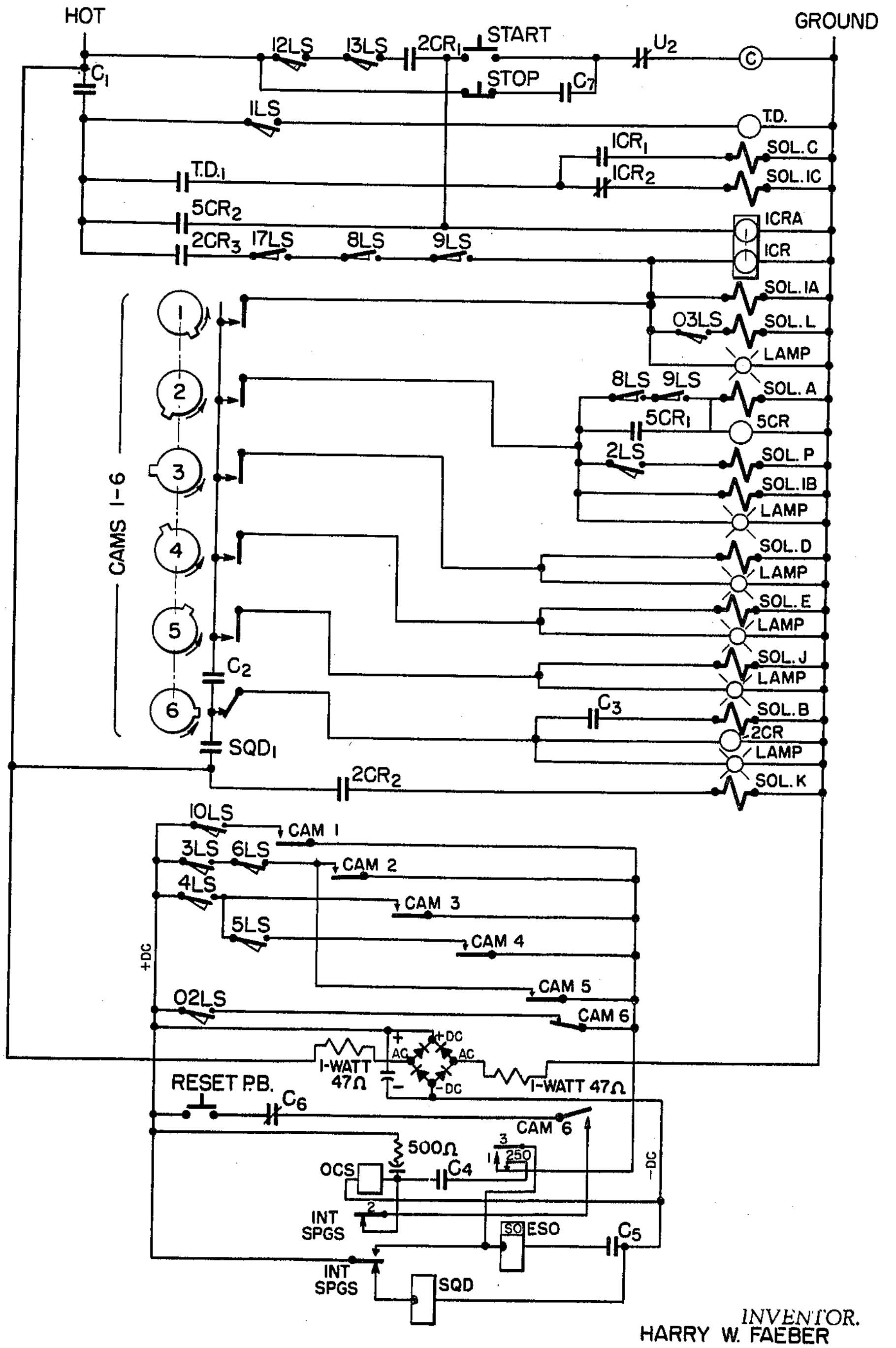
Figure 25:
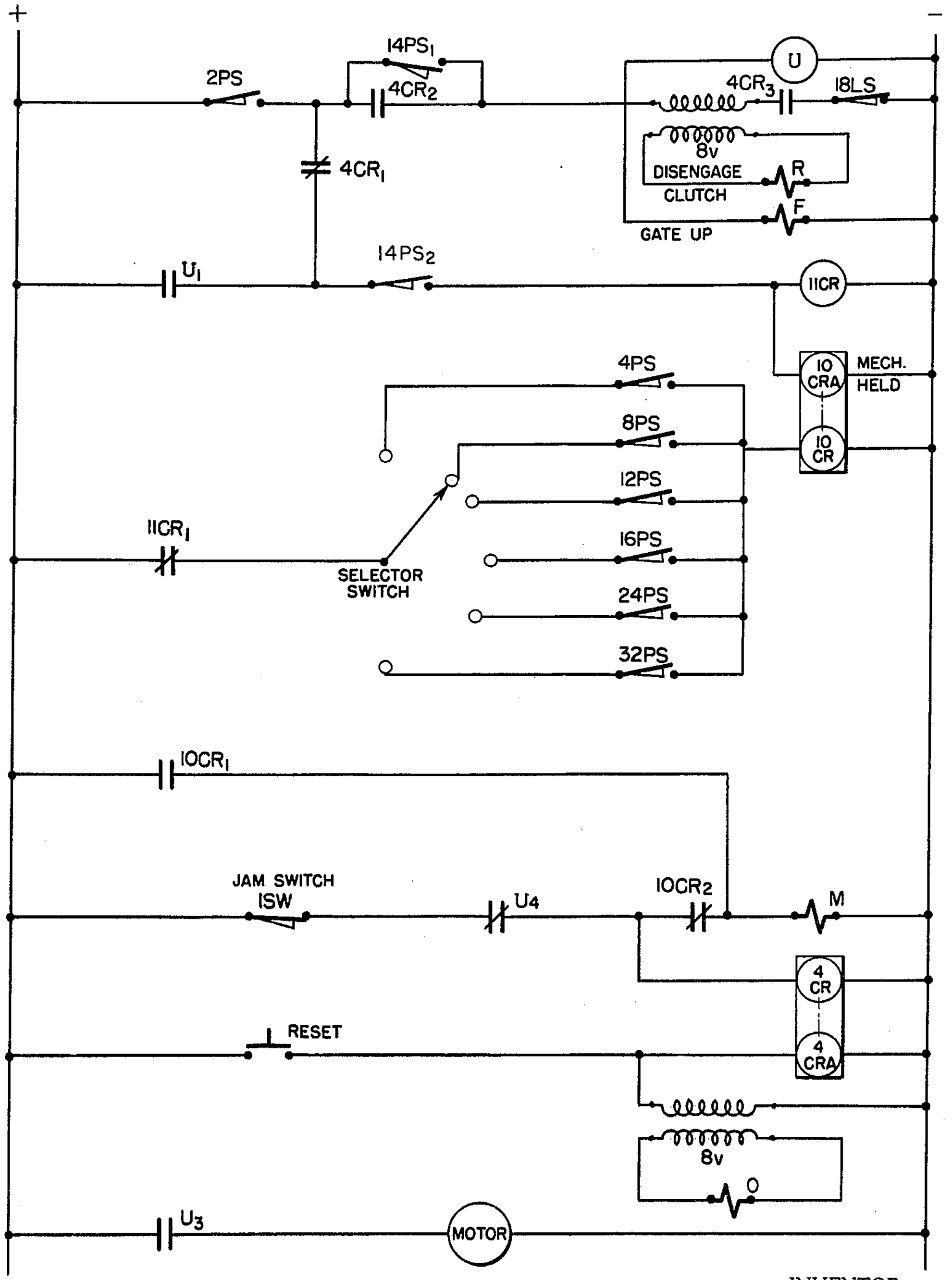
Figures 26A, 27:
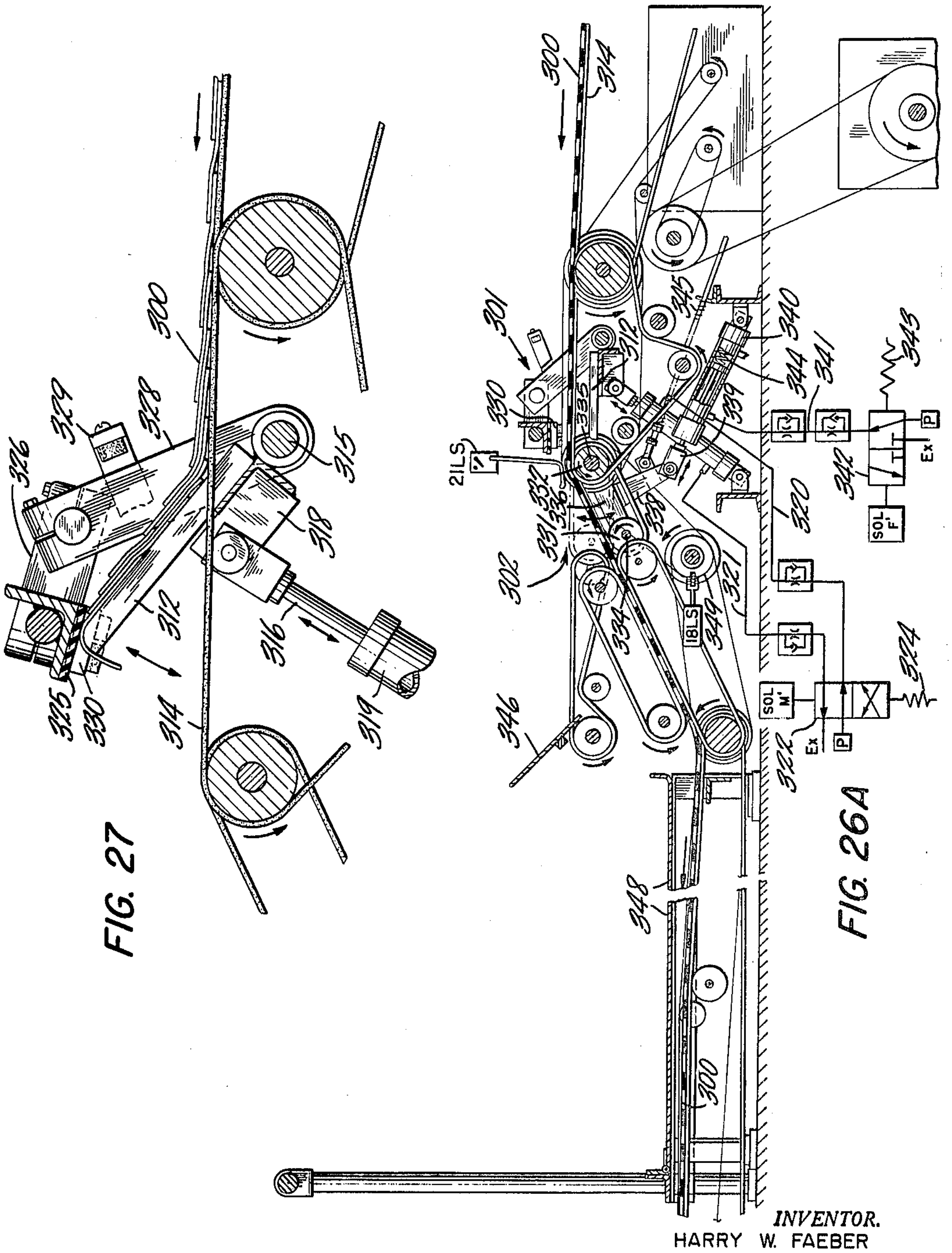
Figure 26B:
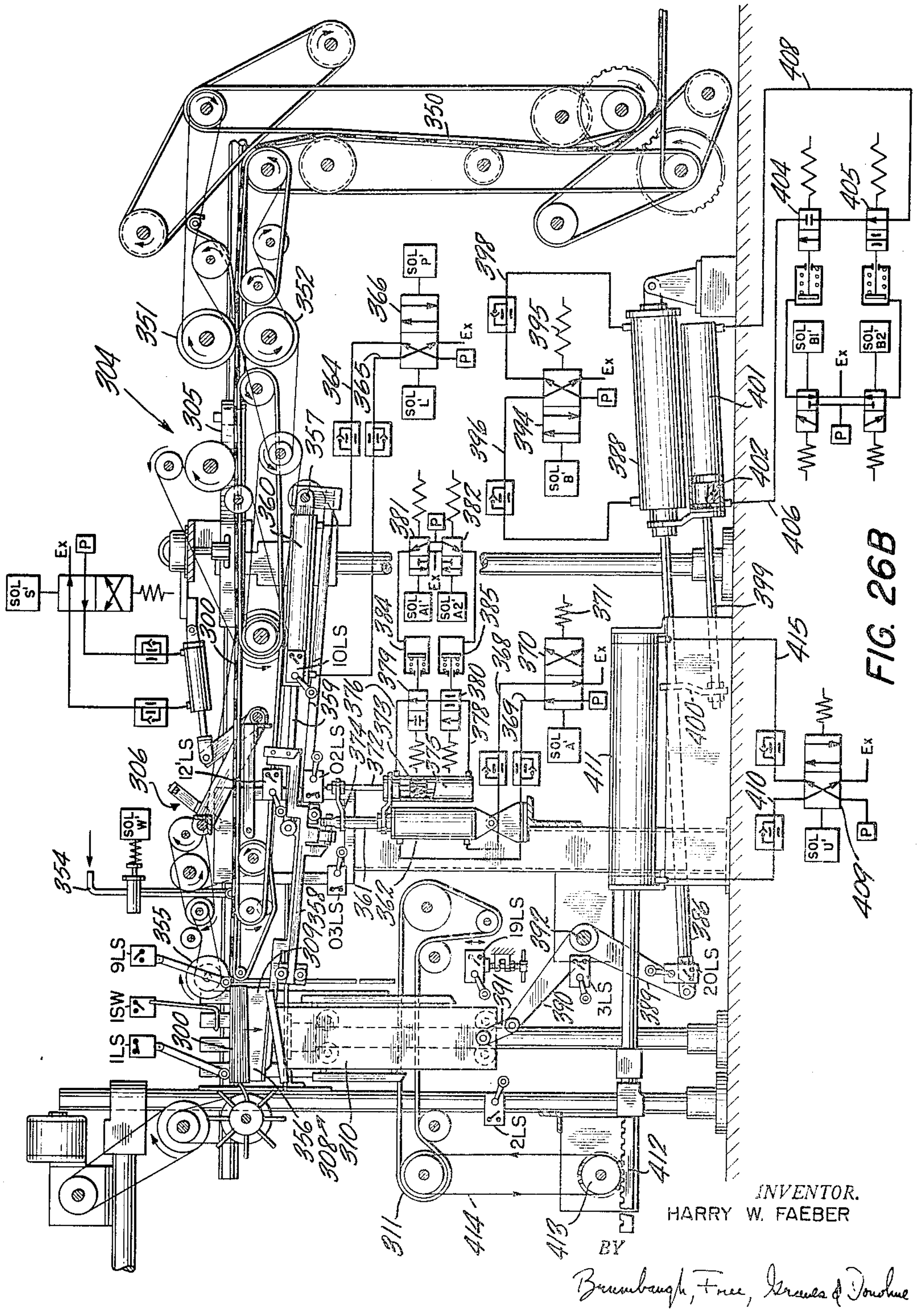
Figure 26C:
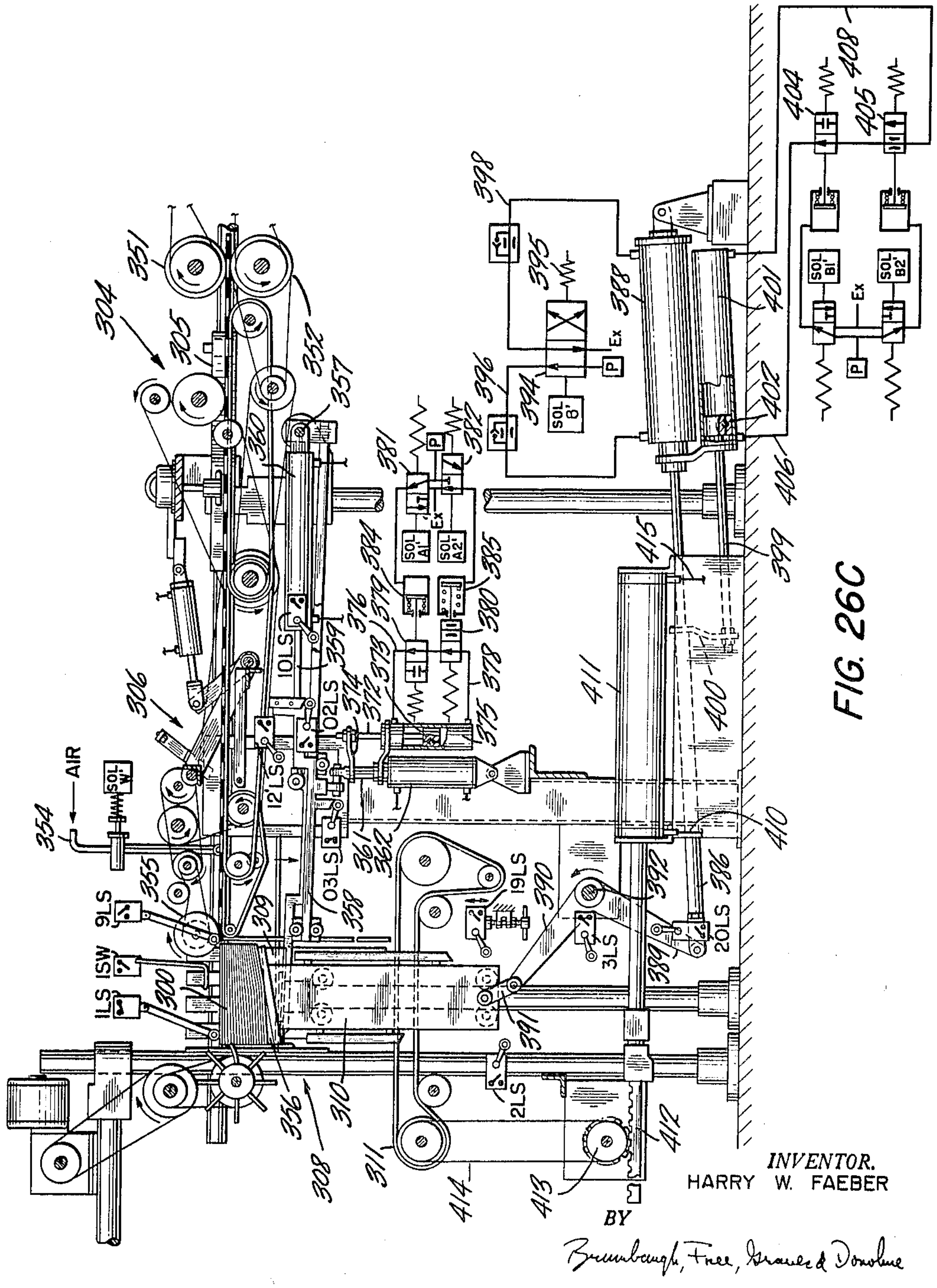
Figure 26D:
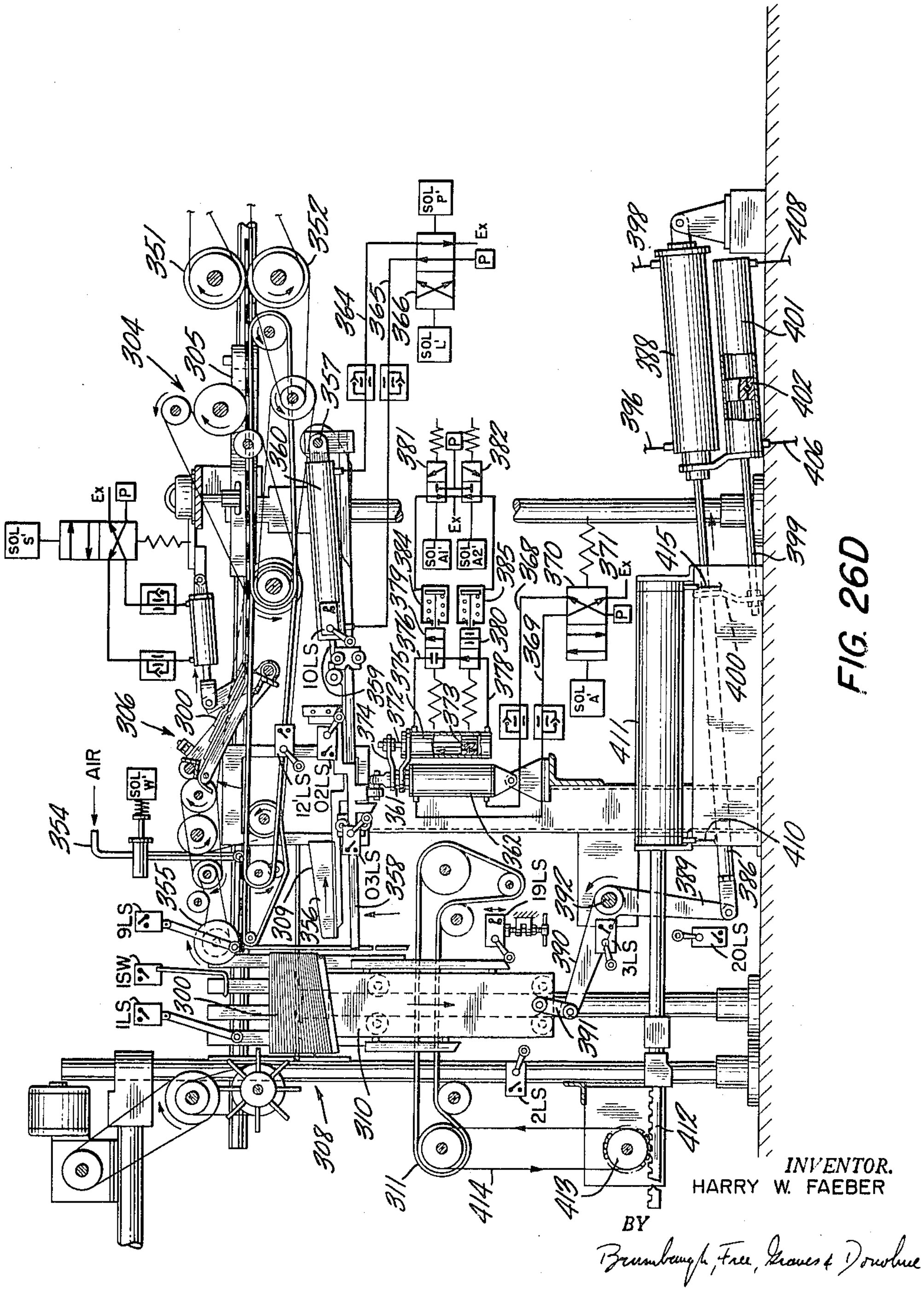
Figure 26E:
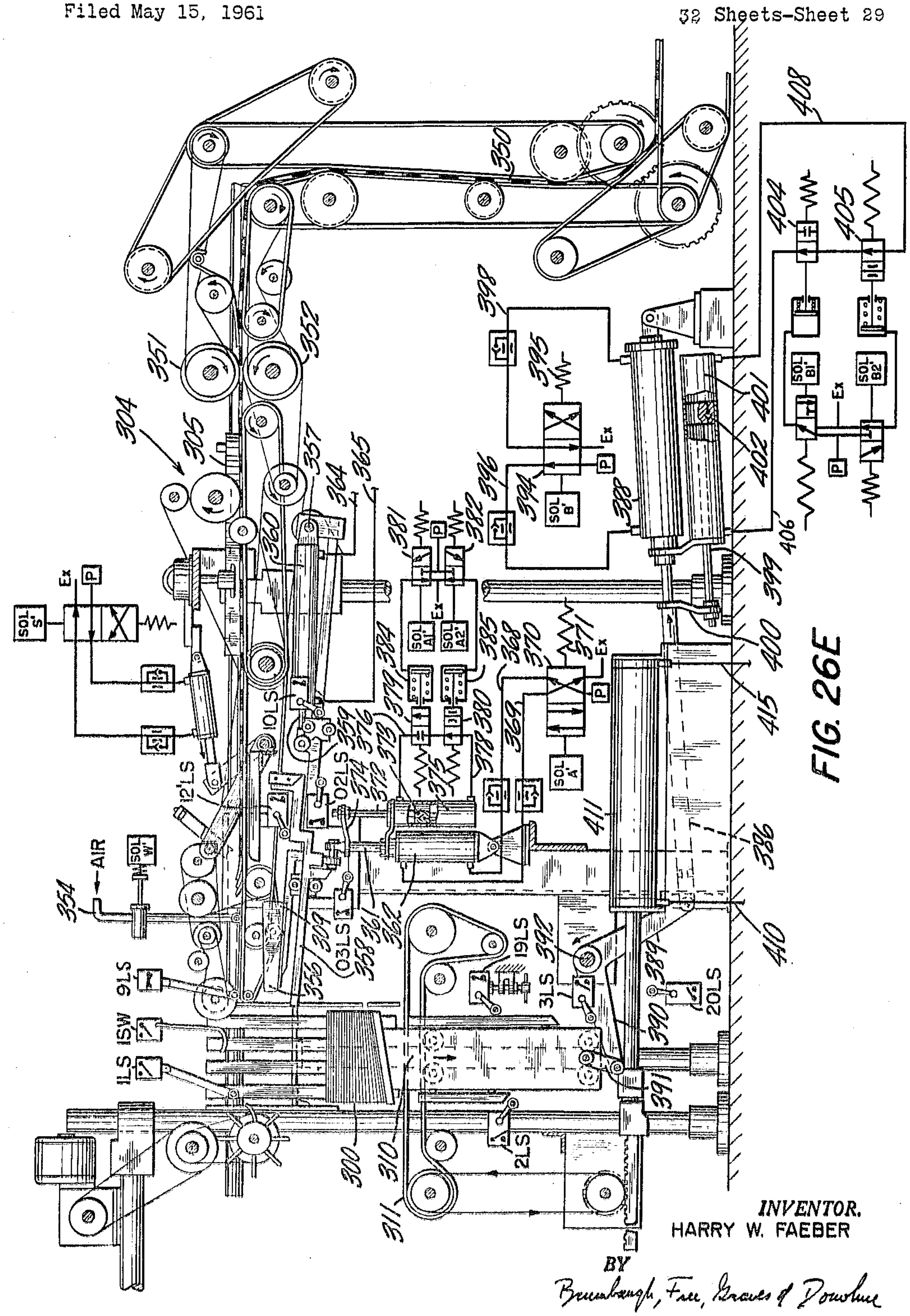
Figure 26F:
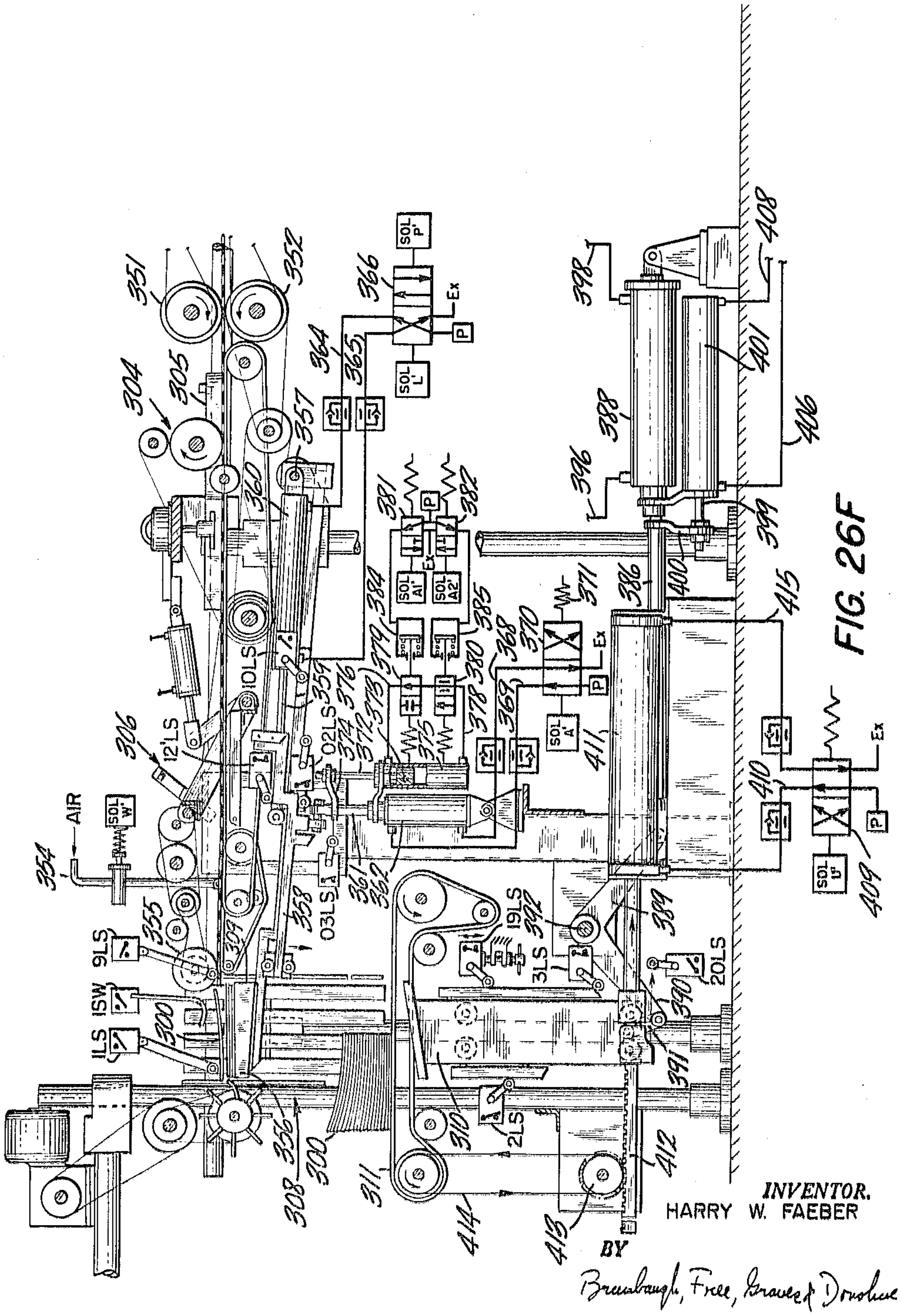
Figure 28A:
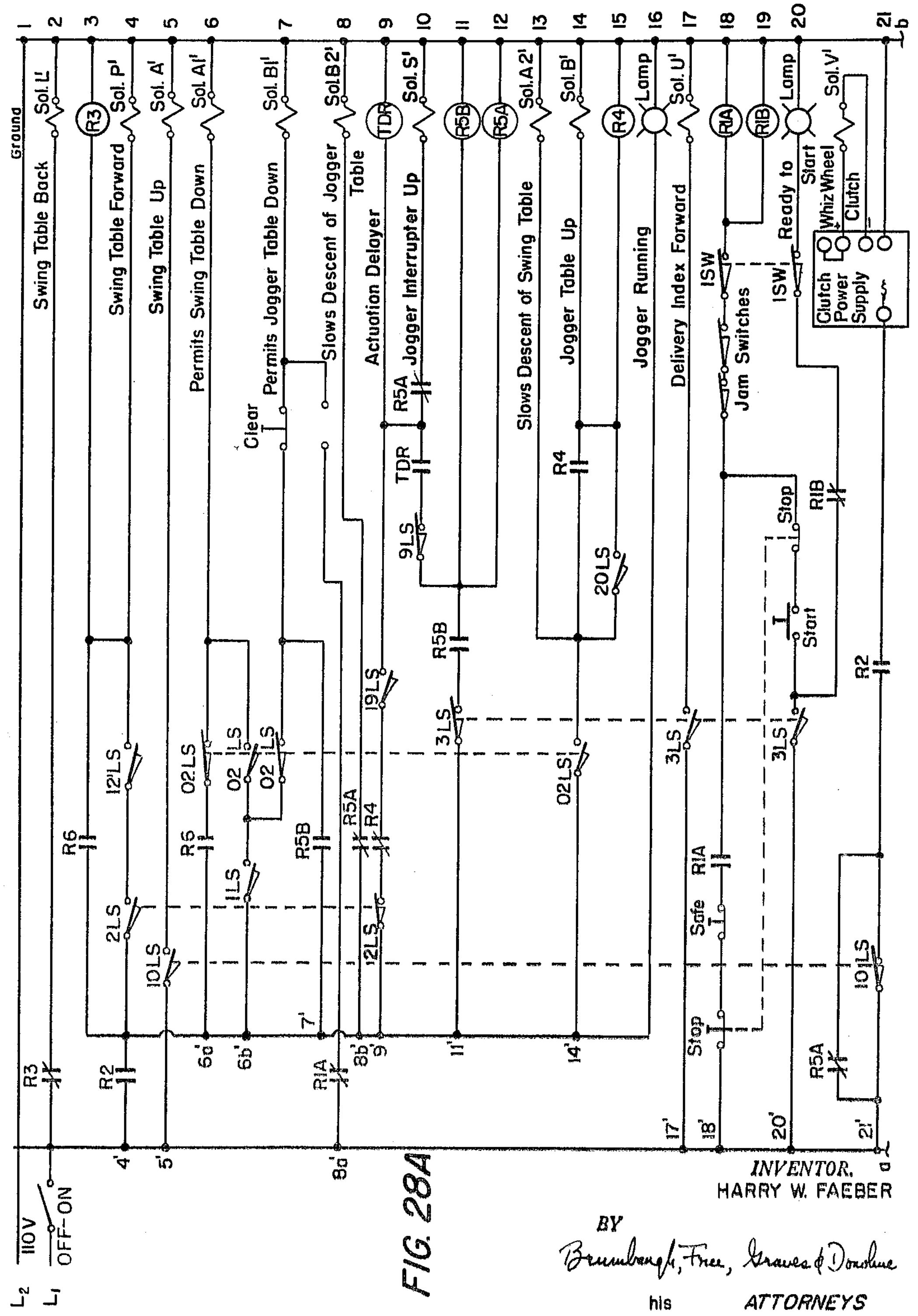
Figure 28B:
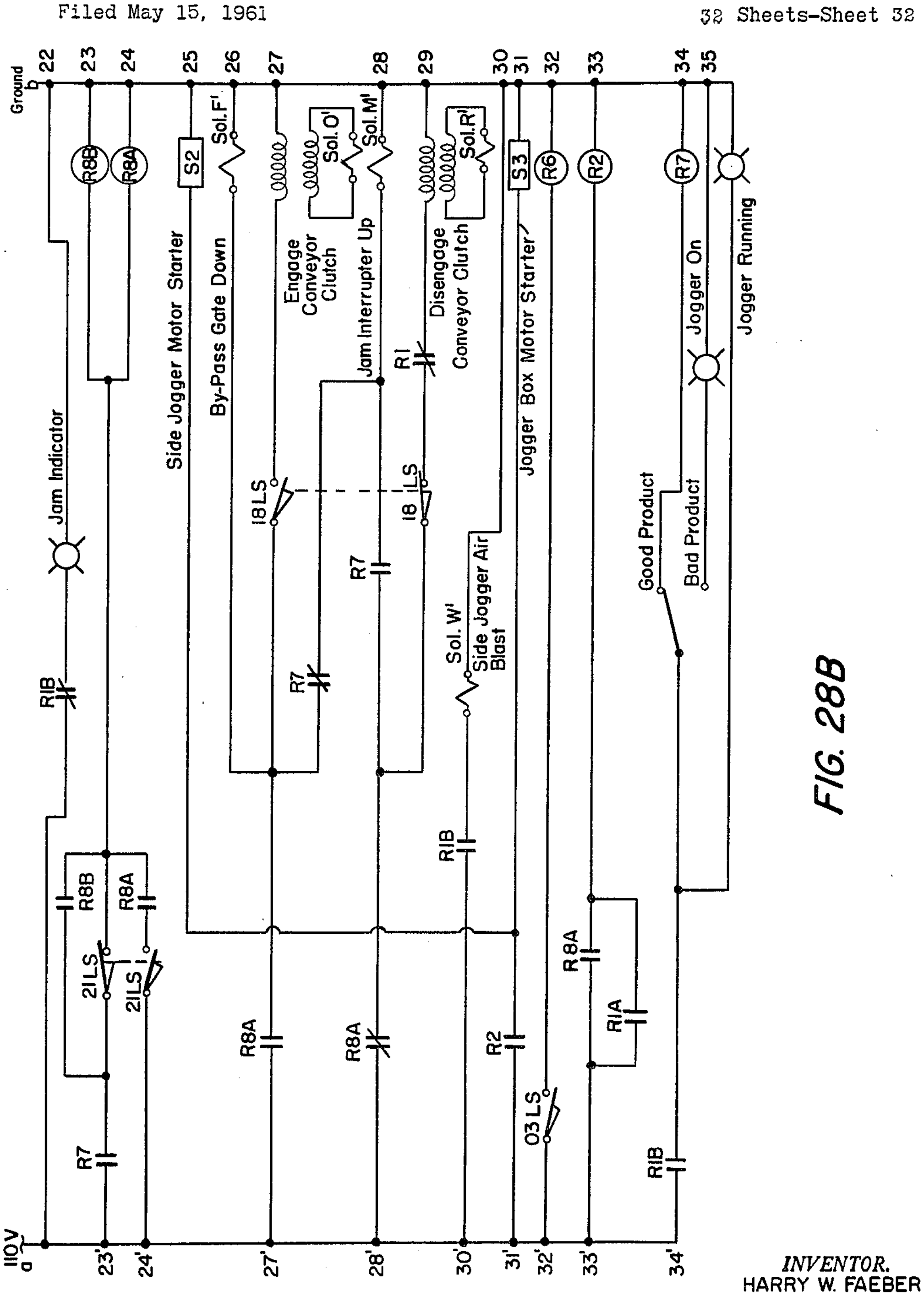

FIGURES 17A, 17B and 17C arranged, respectively, from right to left, show a modification of the arrangement illustrated in FIGURES 1–15;

FIGURE 17D is a plan view of a clutch mechanism taken along the line 17D—17D in FIGURE 17C, looking in the direction of the arrows;

FIGURE 17E is a view similar to FIGURE 17C showing the jogger receptacle substantially filled, ready for delivery of the signature stack from a jogger table on a swing arm to a vertically operable elevator;

FIGURE 17F is a view similar to FIGURE 17E showing the signature stack delivered to the vertically operable elevator and the swing arm in its retracted position;

FIGURE 17G is a view similar to FIGURE 17F showing the vertically operable elevator beginning its downward movement and the swing arm in its retracted and uppermost position;

FIGURE 17H is a view similar to FIGURE 17G showing the vertically operable elevator in its downmost position with the signature stack transferred to a pusher conveyor and the swing arm in its extended position to receive the next signature stack;

FIGURE 18 is a plan view of the swing arm;

FIGURE 19 is a view in elevation of the swing arm shown in FIGURE 18;

FIGURE 20 is a view in perspective of part of the swing arm;

FIGURE 21 is a plan view of the jogger receptacle and a depressor;

FIGURE 22 is a view in elevation of the jogger receptacle shown in FIGURE 21;

FIGURE 23 is a front elevation view in section of the jogger receptacle taken along the line 23—23 in FIGURE 21, looking in the direction of the arrows;

FIGURE 24 is a circuit diagram including timing cams for controlling the automatic jogger mechanism shown in FIGURES 17–23;

FIGURE 25 is a circuit diagram for controlling the operation of a jam device and the interrupter shown in FIGURE 17B;

FIGURES 26A and 26B arranged, respectively, from right to left show another exemplary embodiment of the present invention;

FIGURE 26C is a view similar to FIGURE 26B showing a partially completed stack of signatures being transferred from a swing table, upon which the stack was formed, to a vertically operable jogger table;

FIGURE 26D is a view similar to FIGURE 26C showing the continued formation of a stack of signatures upon the vertically operable jogger table and showing the swing table in its downward and retracted position;

FIGURE 26E is a view similar to FIGURE 26D showing a completed stack of signatures formed upon the jogger table and showing the swing table in its upward position ready to move forward to receive a new series of signatures;

FIGURE 26F is a view similar to FIGURE 26E showing the completed stack of signatures placed upon a conveyor system and showing the swing table in its forward position moving slowly downward and receiving signatures thereon;

FIGURE 27 is an enlarged view, in elevation and in partial section, of an interrupter mechanism shown in FIGURE 26A, with the interrupter in its closed, or interrupting, position; and FIGURES 28A and 28B together form a complete circuit diagram of electrical apparatus for controlling the jogger mechanism shown in FIGURES 26A through 26F and 27.

Figure 1A:
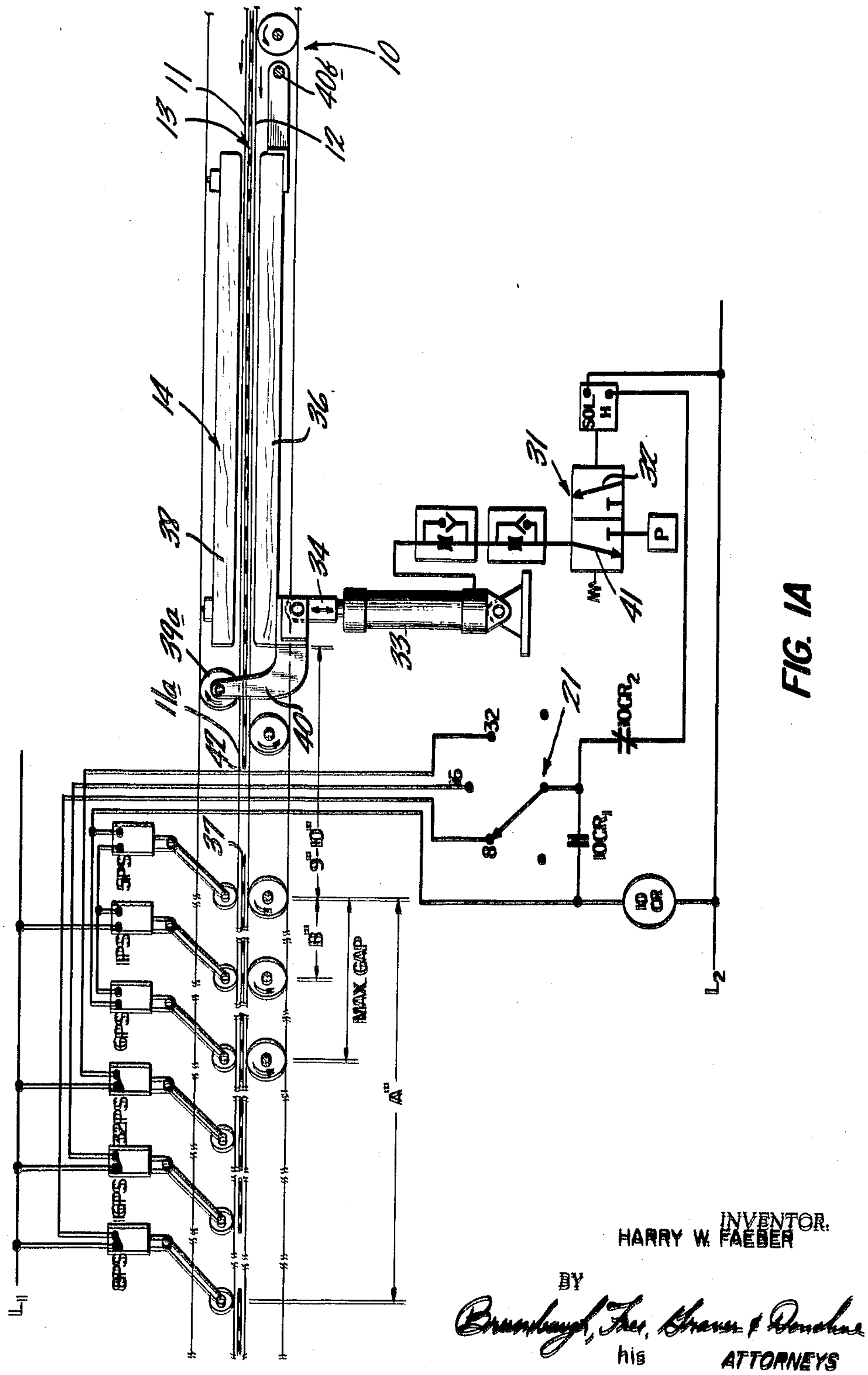
Figures 1B, 5:
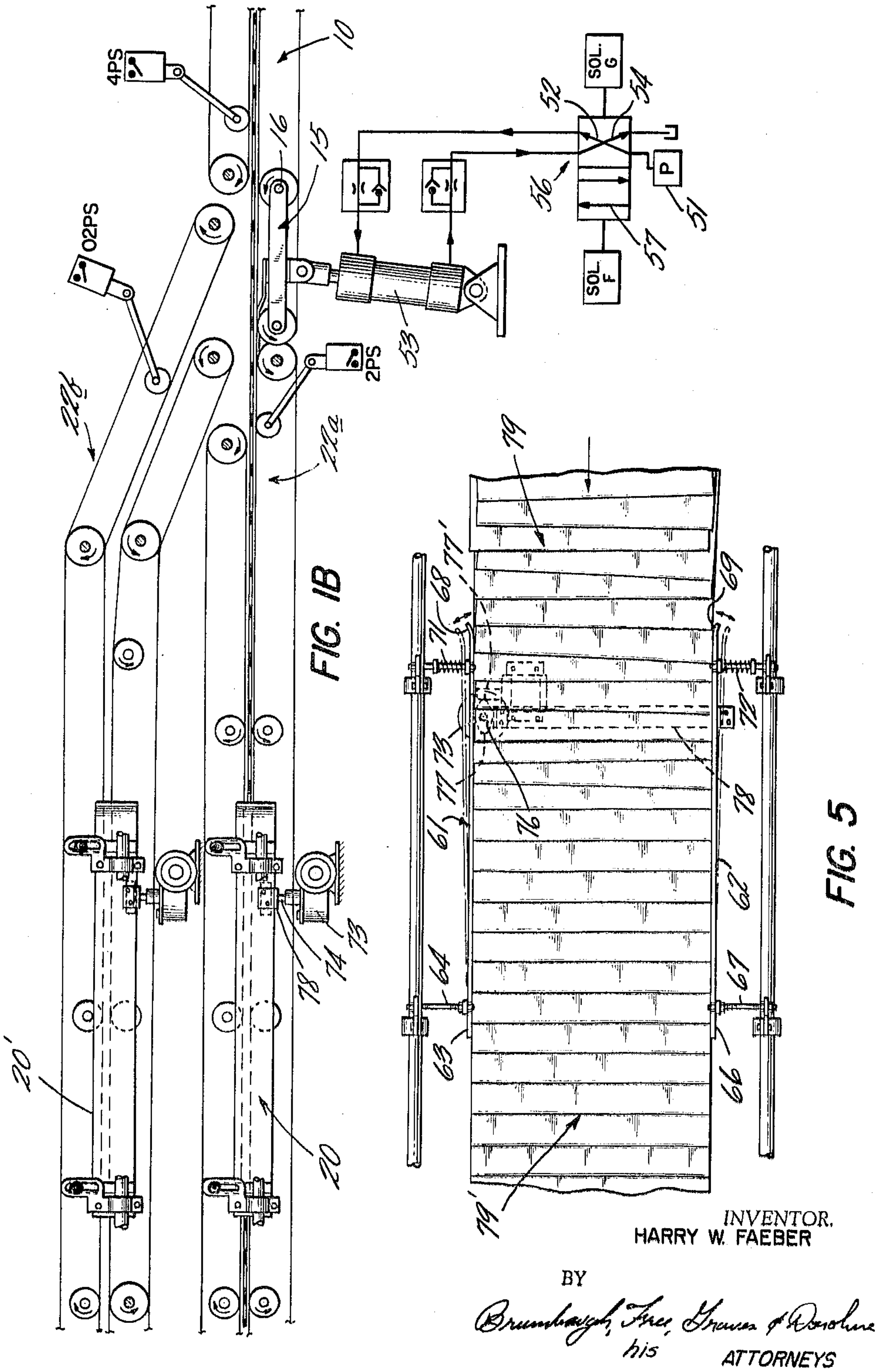
FIGURE 5 is a plan view of a side jogger structure to jog the signatures laterally.
Figure 1C:
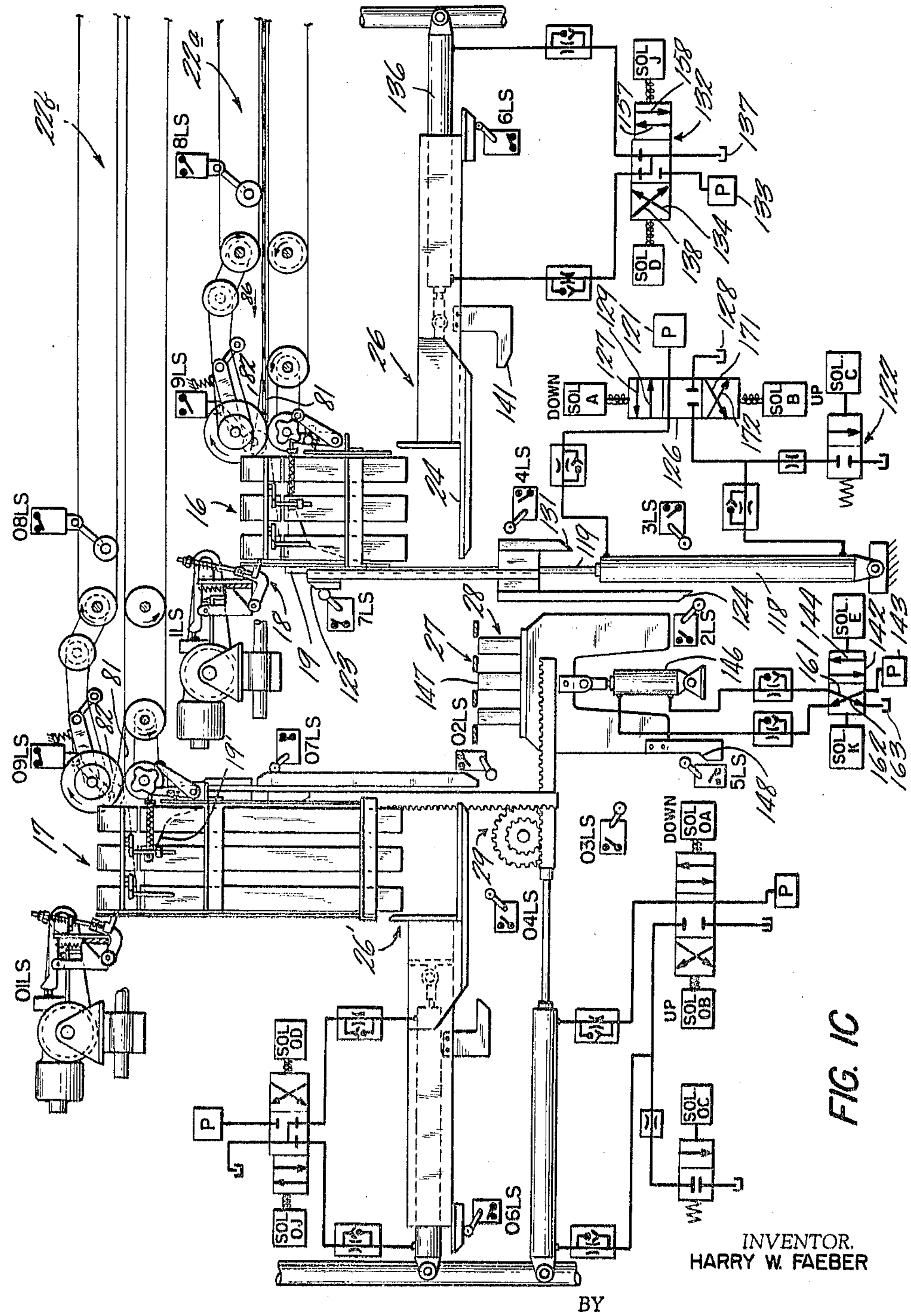

Referring now to one form of the invention and, more particularly, to FIGURES 1A, 1B and 1C, signatures are delivered, usually, from a folder apparatus (not shown) to a conveyor 10 having upper and lower resilient belt sections 11 and 12, respectively, which, for example, may be formed of spiral springs. The signatures, indicated generally by the numeral 13, are received in an overlapping relationship to be transported by the conveyor 10 through an interrupter 14 (FIGURE 1A), past a gate 15 (FIGURE 1B), to a second conveyor **22*a* which transports the signature stream through a side jogger 20 and, ultimately, to a first jogger receptacle 16. Alternatively, when the first jogger receptacle 16 is filled and the gate 15 is moved to an upper position, the signatures are transported by a third conveyor 22*b*, through a second side jogger 20′ to a second jogger receptacle 17, which is substantially identical to the receptacle 16**.

As the signatures 13 are delivered to a jogger receptacle (receptacle 16, for example), motor-driven depressors 18 travel in a predetermined, constrained path to contact the top of the signatures with a downward, forward motion to draw the signatures uniformly against the vertical bars 87 (FIGURE 7) of the receptacle 16. At the same time, the signatures are jogged, as will be described in greater detail presently. When the signature stack is built up in the receptacle 16 to a certain height, a switch 1LS, associated with the motor driven depressors 18, is actuated to lower the elevator table 19 (FIGURE 1C) in incremental amounts such as, for example, one-quarter of an inch. Thus, the table 19 is lowered incrementally at a speed commensurate with the speed at which the signature stack builds up in the jogger receptacle 16.

The number of signatures making up one stack on the elevator table 19 is predetermined by the setting of switch 21 (FIGURE 1A). At the appropriate time, the interrupter 14 closes momentarily and creates a gap in the signature stream. As a gap in the signature stream arrives across the gate device 15, the gate is operated to move to an upper position so that the stream of signatures following the gap will be directed along conveyor **22*b* for delivery to jogger receptacle 17**.

The portion of the elevator table 19 that supports the signature stack is formed of a plurality of spaced-apart brackekts 23 and slats 25 (FIGURE 9), and the slats 25 are positioned to move vertically between spaced-apart slats 24 and a horizontal pusher conveyor 26. When the last signature of a particular stack is delivered to the jogger receptale 16, the table 19 lowers to transfer the stack to the horizontal pusher conveyor 26. In this manner, the stack is transferred from the slats 25 to the slats 24.

While the table 19 is still in its lowermost position beneath the slats 24 of the pusher conveyor 26, the conveyor 26 moves to the left from a first, retracted position (as seen in FIGURE 1C) to a second, extended position over a horizontal belt conveyor 27. The stack is transferred from the pusher conveyor 26 to the belt conveyor 27 by the operation of a lifter 28 (also shown in FIGURE 11) which moves a plurality of projections, or knobs 147, between the belts of the conveyor 27 and the slats 24 of the pusher conveyor 26 to lift the stack. While the stack is in this lifted position, the pusher conveyor 26 is retracted, and the lifter 28, then, lowers to transfer the stack to the belt conveyor 27, by which means the stack is delivered to receive subsequent treatment (for example, to a binder apparatus).

With the pusher conveyor 26 fully retracted, the elevator table 19 now rises to its initial, uppermost position to receive the next stack of signatures. During the course of the operation just described, the signature stream is being delivered to the second jogger receptacle 17 which, by this time, has received sufficient signatures to form another stack.

Upon the completion of a stack in the second jogger receptacle 17, a gap is formed in the signature stream and, when this gap straddles the gate 15, the gate 15 is moved to its lower position (as seen in FIGURE 1B). The stack of signatures in the receptacle 17 now is transferred to a pusher conveyor 26′ similar to the pusher conveyor 26. Since, in the illustrative embodiment disclosed here, the receptacle 17 is displaced upwardly a greater amount than the receptacle 16, the elevator 19′ must travel a greater distance downwardly to transfer a signature stack to the pusher conveyor 26′. Therefore, to avoid the necessity of using a hydraulic cylinder and piston with an extremely long stroke, a gear arrangement 29 is provided to give sufficient mechanical advantage so that a shorter-stroke piston may be used to move the elevator 19′. In all other respects, the two jogger receptacles 16 and 17 and the associated components are identical, and the gate 15 operates to transfer the signature stream from one receptacle to the other.

Having described the mechanism in brief and general terms, a more detailed description will now be given.

INTERRUPTER

The purpose of the interrupter 14 is to create a gap of predetermined length in the stream of signatures for the purpose of permitting a space and, thus, an interval of time for the gate 15 to move from one position to the other. As best seen in FIGURES 1A, 2, 3 and 4, the stream of signatures is interrupted by a gripping action between a plurality of upper wooden strips 38 and a plurality of matching lower wooden strips 36. Both the upper and lower strips are spaced intermediate the conveyor belts so that when a hydraulic cylinder 33 is actuated to raise the lower strips 36, the signatures are gripped between the strips 36 and 38.

All of the pulleys **39*a*–39*f* are rotatably mounted on a common shaft 40*a* supported at opposite ends by arms 40 and 40', respectively, which extend from one end of the lower strips 36. The ends of the strips 36 opposite the pulleys 39***a*–39*f* are pivotally attached to a fixed shaft 40*b* so that the action of the hydraulic cylinder 33 raises and lowers one end only of the lower strips 36, although it is understood that this arrangement is merely illustrative.

The upper belt section 11 is formed of overlapping belt portions rather than one long continuous belt.

Figures 2, 3, 4:
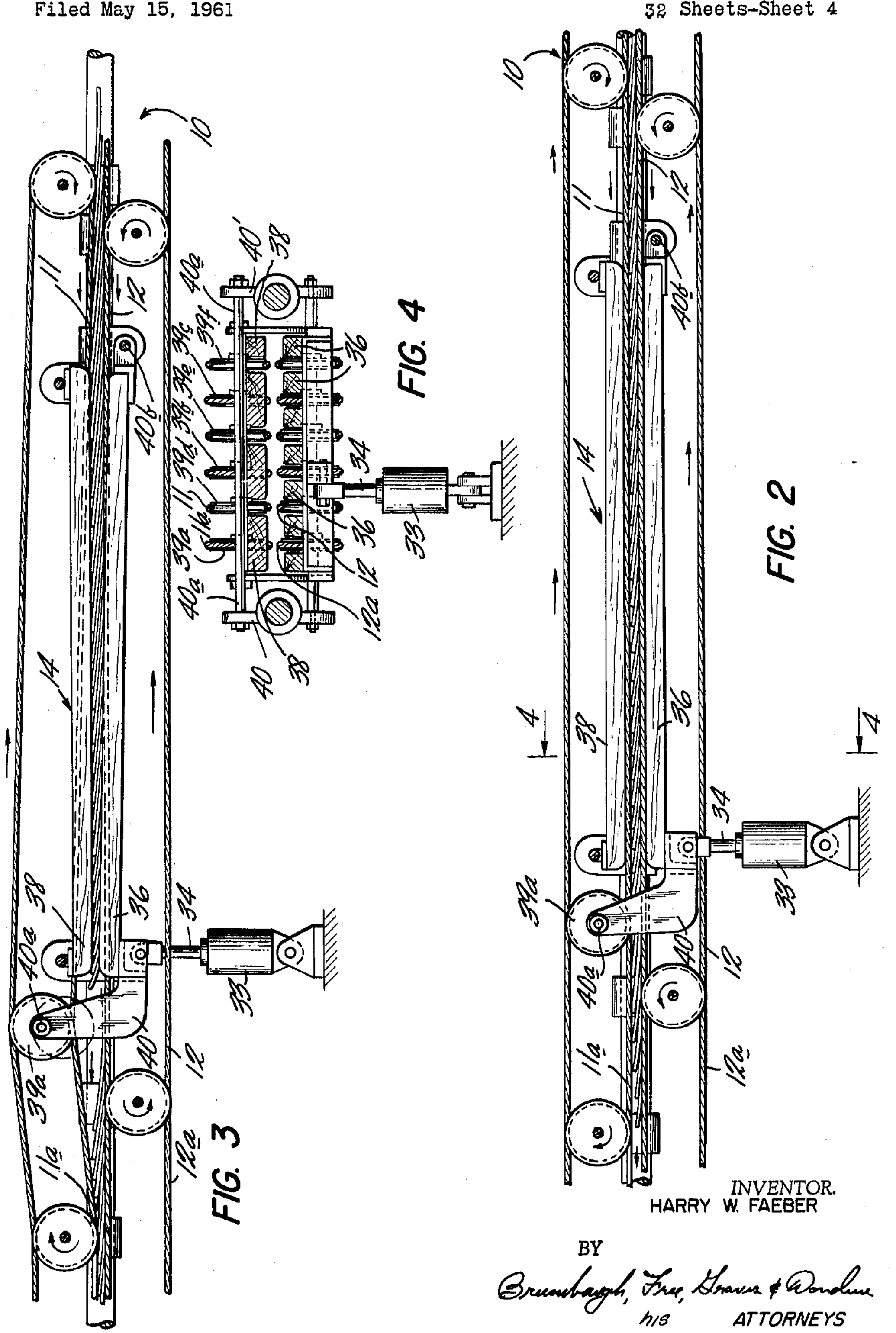
FIGURE 2 is a view in elevation, partly in section, of an interrupter constructed in accordance with the invention, the interrupter being shown in its open, or uninterrupting position.
FIGURE 3 is a view similar to FIGURE 2 with the interrupter being shown in a closed, or interrupting, position.
FIGURE 4 is a view in cross-section along the line 4—4 in FIGURE 2, looking in the direction of the arrows.

As seen in FIGURE 4, the pulleys 39*a*, 39*b* and 39*c* are alternated with pulleys 39*d*, 39*e* and 39*f*, pulley 39*f* being the last pulley to the right in FIGURE 4. The belts of the conveyor section 11 pass around the pulleys 39*d*, 39*e* and 39*f*; and the belts of the conveyor section 11*a* pass around the pulleys 39*a*, 39*b* and 39*c*.

Therefore, when the lower strips 36 are raised, the belts of both upper conveyor sections 11 and 11*a* are raised also. Thus, in its interrupting position, the lower wooden strips 36 of the interrupter 14 raise the signatures out of contact with the lower conveyor section 12, and the belts of the upper conveyor section 11 recede in between the upper strips 38, leaving the signatures gripped firmly between the strips 36 and 38.

The operation of the interrupter 14 is controlled by the physical, lineal position of a plurality of contacts in engagement with the signature stream. The relative position of the contacts 1PS and 5PS (FIGURE 1A) determines the length of gap in the signature stream formed by the interrupter.

The length of the signature stream between gaps and, therefore, the approximate number of signatures to be formed in a single stack, is determined by the physical, lineal distance between contact 5PS and any of contacts 32PS, 16PS or 8PS, as determined by the setting of a selector switch 21.

Power is supplied to operate the interrupter 14 by an electrical circuit connected between line $L_1$ and line $L_2$ located at the top and bottom, respectively, of FIGURE 1A. The coil of relay 10CR is connected in series with switches 1PS and 5PS between the lines $L_1$ and $L_2$. The setting of selector switch 21, however, determines an alternative path connected also in series with the relay coil 10CR.

The particular alternative path shown in FIGURE 1A is from coil 10CR, through the 10CR$_1$ contacts (when closed), through selector switch 21, and through switch 8PS to the line $L_1$. As the signature stream approaches the interrupter 14, the relay coil 10CR is energized by the series connection between normally-closed contacts 1PS and 5PS so that the contact 10CR$_2$ is maintained open.

When the signature stream is passing contacts 5PS and 1PS, both of the contacts 5PS and 1PS are open, and relay coil 10CR is de-energized, thus, closing contact 10CR$_2$ and opening contact 10CR$_1$.

The number of signatures for a particular stack to be formed by the jogger receptacle is determined by the physical, lineal distance between the contact 5PS and a contact 8PS, 16PS or 32PS, whichever is selected by the selector switch 21. As shown in FIGURE 1A, selector switch 21 is illustrated as being connected to the contact 8PS and, therefore, the arrival of the first signature at the contact 8PS completes a circuit between $L_1$ and $L_2$ to energize solenoid H through contact 8PS, selector switch 21 and contact 10CR$_2$. The interrupter 14 is closed, i.e., in its interrupting position, by the energization of the solenoid H.

The energization of solenoid H moves a spring-biased hydraulic valve 31 to the left from the position shown in FIGURE 1A so that a passageway 32 is completed from a source of fluid pressure P into the bottom of a hydraulic cylinder 33. Fluid pressure in the bottom of cylinder 33 moves piston arm 34 upwardly so that the lower strips 36 of the interrupter 14 are pivoted about a shaft 40*b* to clamp the signature stream against upper matching strips 38. In this manner, the flow of signatures is interrupted and a gap will begin to form.

The trailing edge 37 of the signatures that are not gripped by the interrupter 14 form an increasing gap in the signature stream, and as the trailing edge 37 passes from under contact 5PS, the arm of the contact 5PS drops and the contact 5PS is closed in series with the coil 10CR. When the trailing edge 37 of the signatures passes from under the contact 1PS also, the contact 1PS drops and closes to complete the series circuit to energize the coil 10CR. Upon the energization of the coil 10CR, the contact 10CR$_1$ closes and the contact 10CR$_2$ opens to de-energize solenoid H.

Upon the de-energization of the solenoid H, the hydraulic valve 31 returns to the position shown in FIGURE 1A under the influence of its biasing spring so that the passageway 41 exhausts the lower end of the cylinder 33 to retract the piston rod 34. Thus, the interrupter 14 is opened, i.e., moved to its uninterrupting position. Therefore, it may be seen that the length of the gap in the signature stream is determined by the lineal distance between the contact 1PS and the downstream end of the interrupter 14. However, because the contact 5PS is positioned virtually adjacent the downstream end of the interrupter, the length of the gap in the signature stream is effectively determined by the lineal distance between the contacts 5PS and IPS.

While the gap appears beneath the contact 1PS, the contact 5PS is opened by the approaching signature stream; however, the coil 10CR is maintained energized by the series circuit through the contact 10CR$_1$, selector switch 21 and the contact 8PS. When the gap in the signature stream appears beneath, for example, the contact 8PS (since the selector switch 21 is shown connected to the contact 8PS), the contact 8PS drops open, and the coil 10CR is de-energized, returning the contact 10CR$_2$ to its normally closed position. However, the solenoid H remains de-energized since contact 8PS is open. When the gap has passed and the leading edge 42 of the next successive signature stream passes under the contact 8PS, the contact 8PS is closed, solenoid H is energized, and the hydraulic cylinder 33 again actuates the interrupter 14 to repeat the cycle just described.

The distance indicated by the letter "A" in FIGURE 1A, as mentioned previously, determines the number of signatures for each stack, or, in other words, the height of each signature stack, and this distance may be varied by selecting contact 16PS or contact 32PS by the selector switch 21, as desired. Of course, it is understood that any desired number of contacts similar to the contacts 8PS, 16PS and 32PS may be used, and the selector switch 21 may have any number of positions to conect the circuit selectively to one of these contacts.

In a somewhat similar manner, the length of the gap formed by the interrupter 14 is determined by the distance indicated by the letter "B" in FIGURE 1A, which distance may be changed by physically moving the contact 1PS relative to the contact 5PS. Therefore, the length of the gap in the signature stream is increased by moving the contact 1PS closer to contact 6PS.

It should be noted that the contact 6PS is electrically connected in parallel with the contact 5PS. With the contact 5PS operative, the contact 6PS has no effect, and the length of the gap in the stream is determined by the distance between the contacts 5PS and 1PS as described above. If the contact 5PS is in operative, however, for example, if it is jammed open, then the contact 6PS is controlling, and the length of the gap in the stream is determined by the distance between the contact 6PS and the downstream end of the interrupter 14.

GATE

A hydraulically actuated gate structure 15 is positioned in the conveyor line to direct the signature stream selectively along the lower conveyor 22*a* or along an upper conveyor **22*b*. An electrical circuit is provided so that the gate 15** is operated only when a gap in the signature stream appears across the gate.

Figure 6:
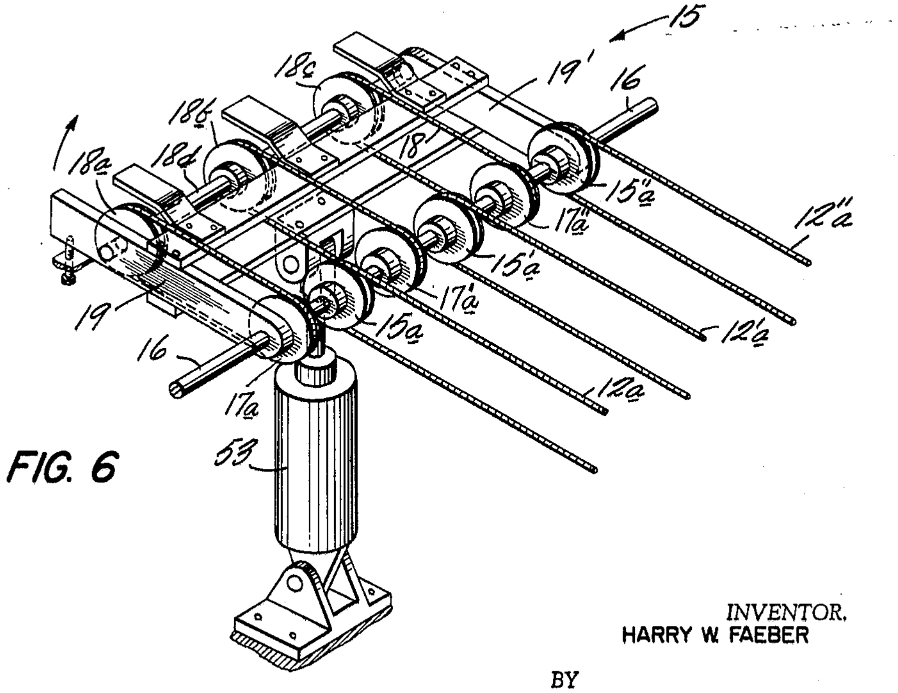
FIGURE 6 is a perspective view of a gate for diverting the flow of signatures from a first to a second path.

As best seen in FIGURE 6 of the drawings, the belts **12*a*, 12*a*′ and 12*a*″ of the lower conveyor section pass around pulleys 15*a*, 15*a*′ and 15*a*″, respectively, and each of these pulleys is rotatably mounted on a shaft 16. Also rotatably mounted on the shaft 16 are pulleys 17*a*, 17*a*′ and 17*a*″ around which similar belts 18 pass to connect with pulleys 18*a*, 18*b* and 18*c* rotatably mounted on shaft 18*d*. The shaft 18*d*, in turn, is supported at its opposite ends by spaced-apart side bars 19 and 19′ which are movable about the shaft 16 by the action of hydraulic cylinder 53**.

A principal purpose of the gate 15 is to direct a stream of signatures selectively along, for example, the lower conveyor **22*a* before a gap is formed, and the stream of signatures following a gap is directed to the upper conveyor 22*b*. Thus, each time a gap in the signature stream appears across the gate 15**, the gate moves to the position oppoiste to the position it occupied just prior to the arrival of the gap.

Figure 16:
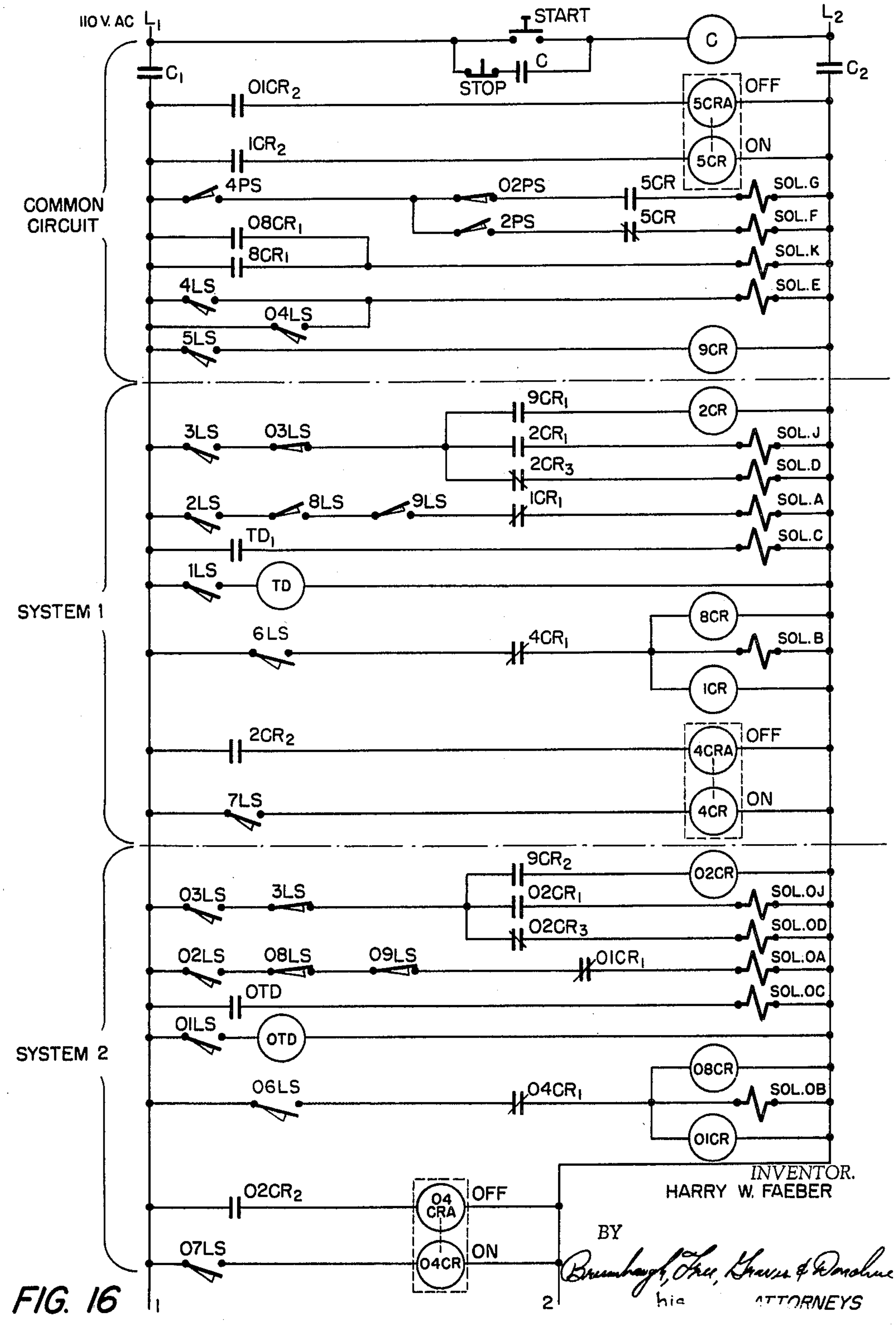
FIGURE 16 shows a circuit diagram for operating the automatic jogger mechanism of FIGURES 1–15.

For an illustration of the operation of the gate 15, reference is made to that portion of the circuit diagram in FIGURE 16 identified by the words "Common Circuit" and to FIGURE 1B.

With the signature stream flowing past the gate 15, the two normally-closed contacts 4PS and 2PS are maintained in an open position. In this position, a fluid valve 56 is in the position shown in FIGURE 1B, and fluid pressure from a suitable source 51 is passed through passage 52 into the upper part of cylinder 53. The lower part of the cylinder 53 is exhausted through passage 54.

Figure 12:
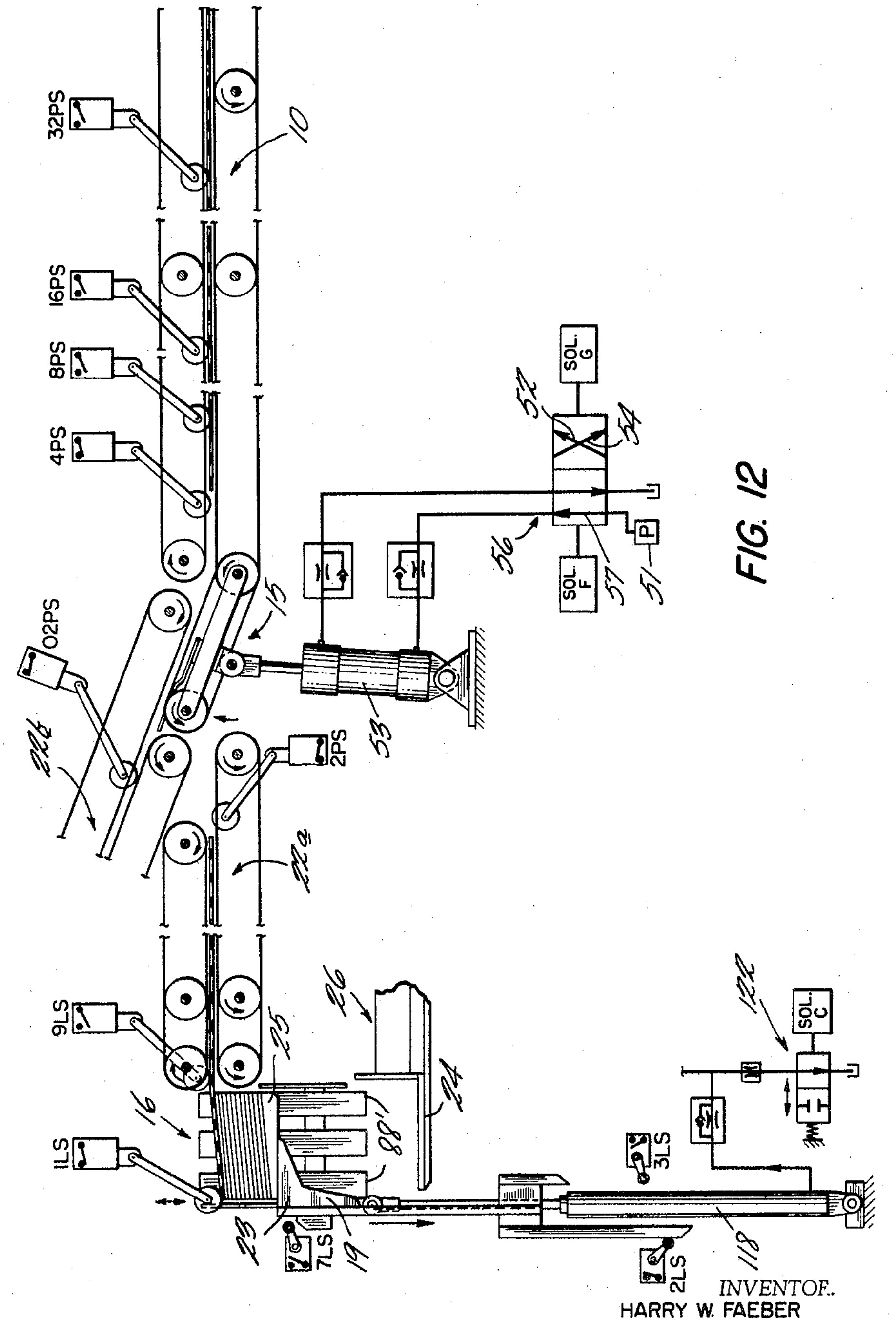
FIGURE 12 is a fragmentary view of the jogger mechanism in elevation showing the gate of FIGURE 6 in position to divert the signature stream to an upper path.

When a gap in the signature stream arrives simultaneously beneath the contacts 4PS and 2PS, the solenoid F is energized since the lower, or "on" contact 5CR is in its normally-closed position. The energization of the solenoid F moves an unbiased hydraulic valve 56 to the right from the position shown in FIGURE 1B so that fluid pressure from the pressure source 51 is applied through a passage 57 to the lower part of cylinder 53, thus raising the gate 15 as seen in FIGURE 12, for example.

By "raising the gate 15" is is meant that the gate is pivoted in a clockwise direction about the shaft 16 as viewed in FIGURE 1B to communicate the first conveyor 10 with the third, or upper, conveyor **22*b*. The conveyor 22*a* will be identified and referred to in the following description as the second, or lower, conveyor, although it is understood that the two conveyors 22*a* and 22*b*** may be positioned relative to each other in a different arrangement from that shown in the drawings, if desired.

As seen above, the positon of the gate 15 is changed during the brief interval that a gap in the signature stream appears simultaneously between the contacts 4PS and 2PS. Thus, the next portion of the signature stream following the gap is directed to the upper conveyor **22*b*, and the signatures in the stream already on the lower conveyor 22*a* will complete the stack being formed in the jogger receptacle 16**.

When the next gap formed by the interrupter 14 arrives simultaneously beneath the contacts 4PS and O2PS, solenoid F is de-energized, solenoid G is energized, and the valve 56 is returned to the position shown in FIGURE 1B so that fluid under pressure from source 51 is directed through passage 52 to the upper part of cylinder 53 to return the gate 15 to the position shown in FIGURE 1B. In this manner, the signature stream is directed selectively between the lower conveyor **22*a* and the upper conveyor 22*b***.

SIDE JOGGER

A metal plate is positioned on each side of both the lower conveyor **22*a* and the upper conveyor 22*b***, and the plates are vibrated to jog the signatures laterally so that the leading, folded edges are arranged substantially parallel to each other (FIGURES 1B and 5).

The two slide jogger devices 20 and 20′ are identical and, therefore, a description of only one will suffice. Referring now more particularly to FIGURES 1B and 5, a side plate 61 is positioned on one side of the signature stream, and a similar side plate 62 is positioned adjacent the opposite side of the stream. The end identified by the numeral 63 of the side plate 61 is fixedly positioned by the bolt 64, and the end identified by the numeral 66 of the side plate 62 is positioned in a similar manner by a bolt 67.

The ends 68 and 69 opposite the ends 63 and 66 are free to vibrate as illustrated by the phantom lines in FIGURE 5. Resilient coil springs 71 and 72 are attached to the side plates 61 and 62, respectively, adjacent the ends 68 and 69 to enhance the vibration of the plates.

Power to vibrate the side plates 61 and 62 is supplied by a motor 73 which is mounted beneath the conveyor with the motor shaft 74 extending substantially vertically toward the under side of the conveyor. A cam 76 is fixedly attached to the end of the motor shaft 74 to be rotated thereby. The cam 76, in turn, is formed with lobes 77 and 77′ which impart the vibratory motion to the side plate 61, as best seen in FIGURE 5.

Cam 76 actuates side plate 61 by direct contact and side plate 62 by way of a bar 78 which is attached to side plate 62 and is in contact with the cam. Thus side plates 61 and 62 move simultaneously towards or away from one another. In this manner, the approaching signatures having leading edges that are askew with respect to each other, as illustrated by the numeral 79 (FIGURE 5), are jogged so that the leading edges are arranged in substantially parallel relationship, as illustrated by the numeral 79′.

Of course, the invention is not limited to this specific structural arrangement but includes within its scope those modifications and alterations that are suggested to one skilled in this art by the above-detailed description. For example, the same rate of vibration for the side plates 61 and 62 may be obtained, if desired, by substituting for the cam 76 another cam having a different number of lobes, and the speed of the motor 73 may be changed correspondingly. If four lobes are used, for example, the motor speed may be reduced to one-half and still obtain the same rate of vibration. Also, the side plates may be vibrated by electromagnetic or other means.

JOGGER RECEPTACLE

Since the jogger receptacles 16 and 17 positioned at the end of the lower conveyor **22*a* and at the end of the upper conveyor 22*b*, respectively, are substantially identical, the following description, for illustrative purposes, will be directed only to the jogger receptacle 16 at the end of the lower conveyor 22*a***.

A brief, general description of the mechanism that forms each signature stack will present a broad, over-all view before the more detailed description that follows. Consider, now, that the signatures in the stream, still traveling at a relatively high speed, are directed successively to the receptacle 16 and supported in the receptacle by spaced-apart slats 25 (best seen in FIGURE 9).

Figure 7:
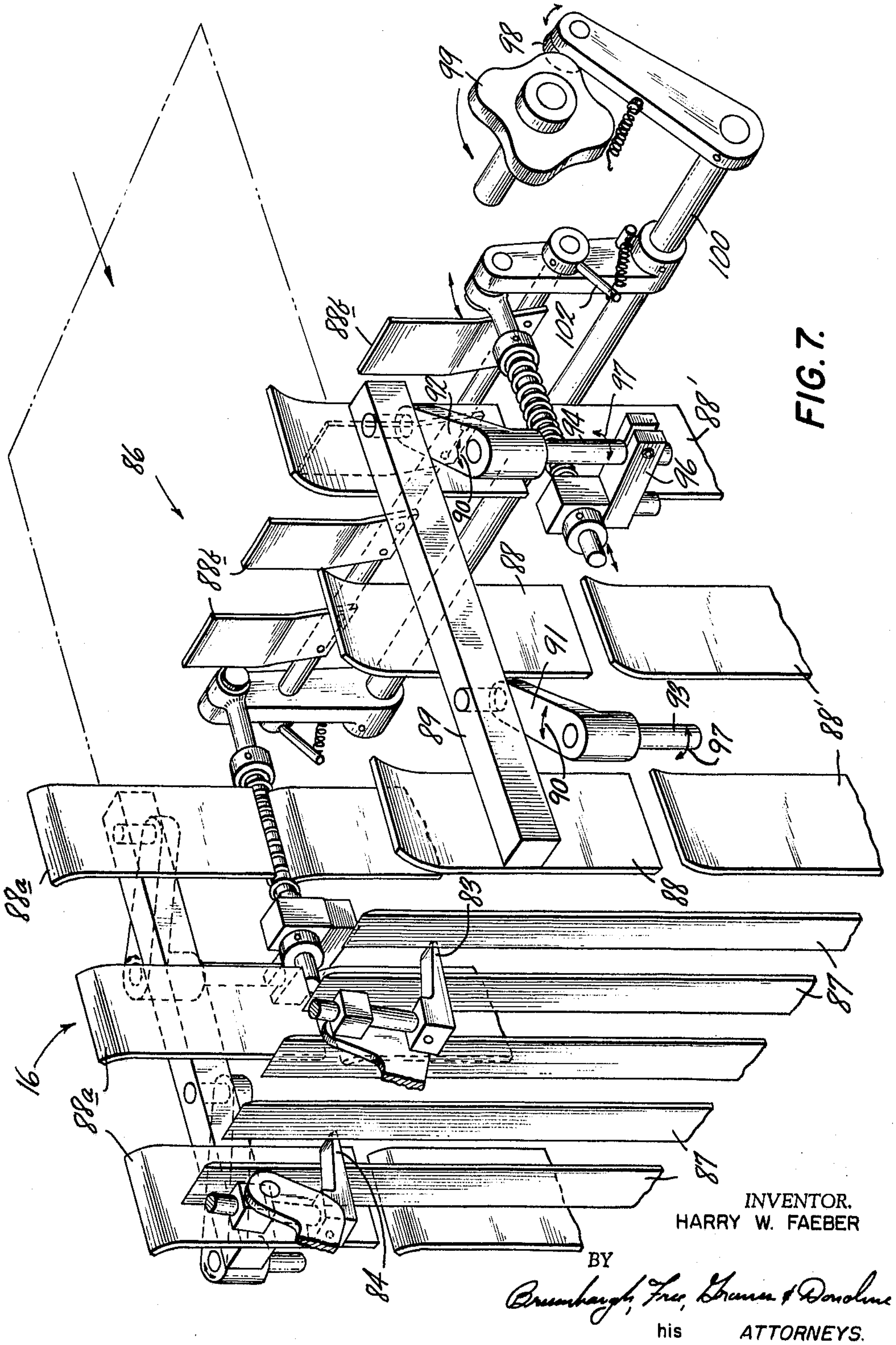
FIGURE 7 is a view in perspective of an illustrative embodiment of a jogger receptacle in accordance with the invention.
Figure 8:
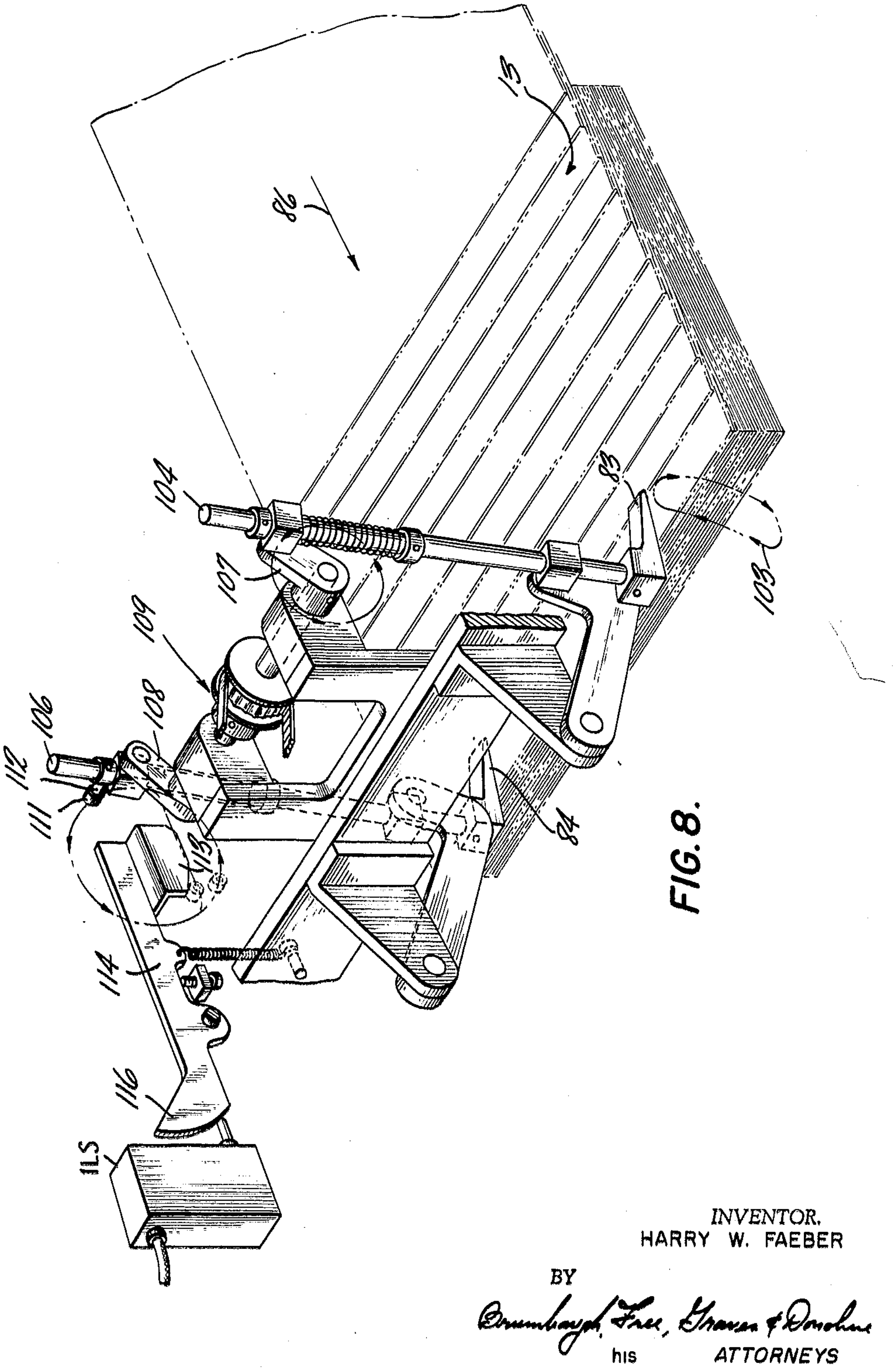
FIGURE 8 is a view in perspective of a depressor, part of which is shown with the jogger receptacle of FIGURE 7.
Figure 9:
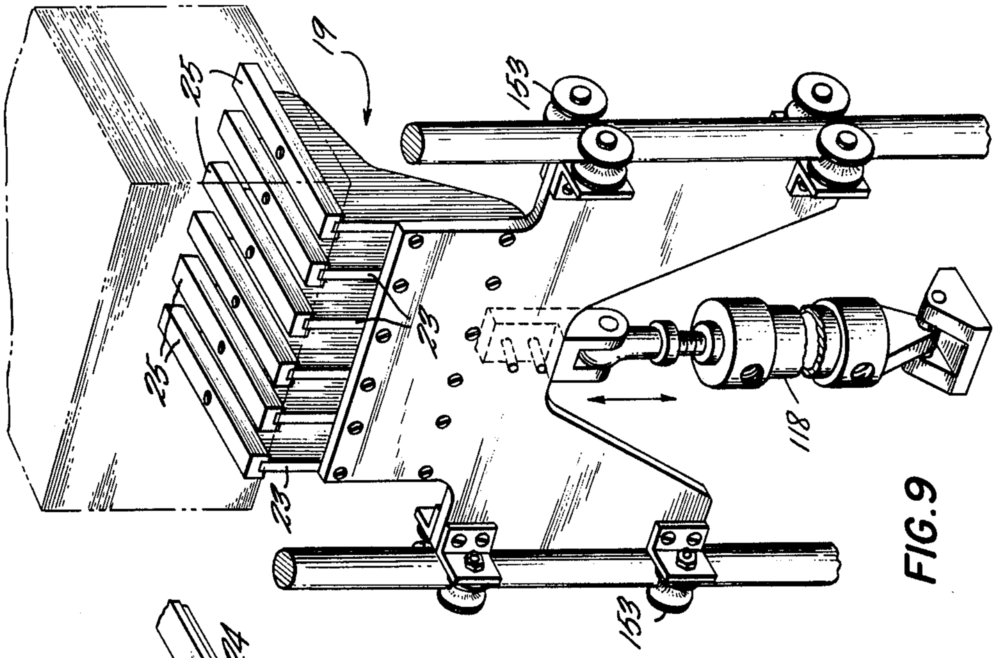
FIGURE 9 is a view in perspective of an illustrative embodiment of a vertically operable elevator.

As the signatures are delivered to the receptacle 16, they are jogged on three sides by vertical strips 88, **88*a* and 88*b*, all attached through linkages to a common shaft 100. (See FIGURE 7.) In addition to the jogging of the signatures, each signature delivered to the receptacle is pressed downwardly and pulled forwardly by two depressors 83 and 84. Each of the depressors moves in a vertical, approximately elliptical path (as illustrated in FIGURE 8 by the numeral 103) and as the height of the stack increases to, for example, three inches, this is detected by the depressors 83 and 84 to actuate an electrical contact 1LS so that the elevator 19 supporting the slats 25** is lowered an incremental amount such as, for example, one-quarter of an inch.

When the last signature of a particular stream passes beneath a contact 9LS adjacent the receptacle 16, the vertical elevator 19 is lowered rapidly, the spaced-apart slats 25 passing between slats 24 of a pusher conveyor 26 so that the signature stack is transferred to the slats 24. In its lowermost position, the elevator 19 actuates a contact 3LS which moves the pusher conveyor 26 to the left (as seen in FIGURE 1C).

Figure 10:
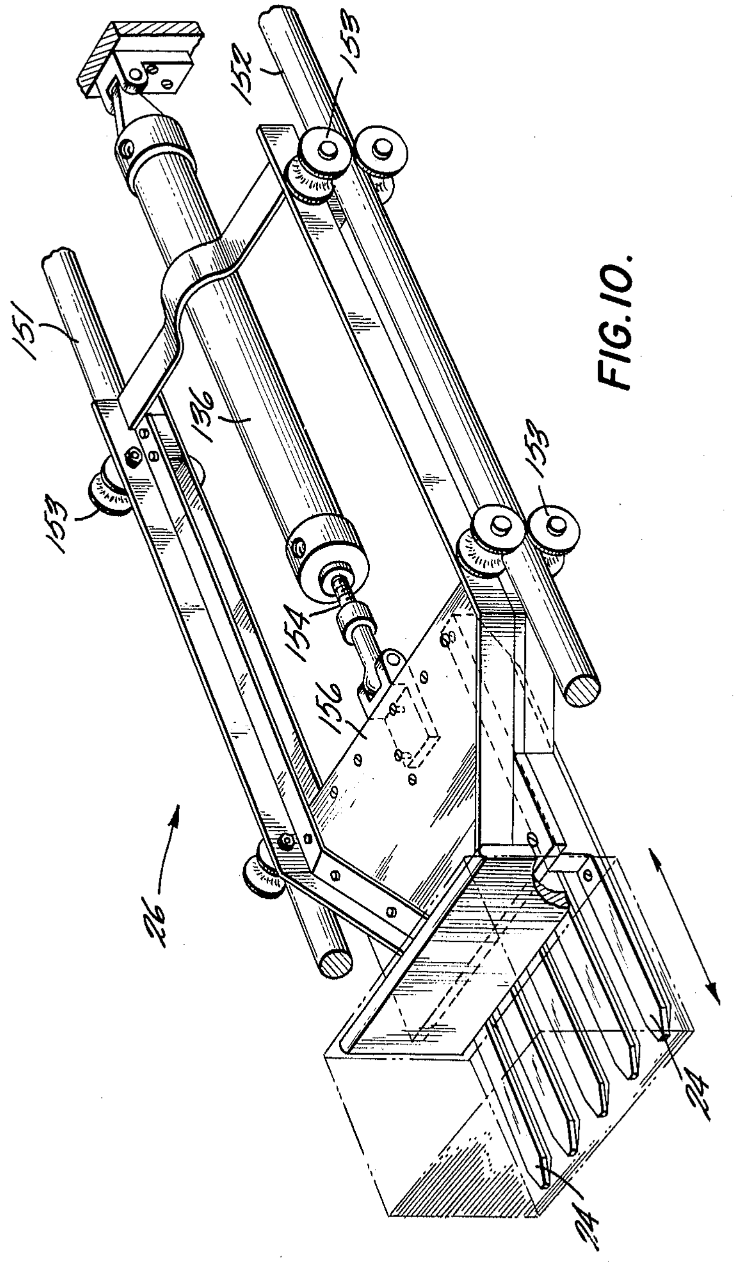
FIGURE 10 is a view in perspective illustrating a pusher conveyor.

The structural arrangement of this pusher conveyor 26 is best illustrated in FIGURE 10 where it is seen that two spaced-apart rails 151 and 152 support the carriage 156 of the pusher conveyor 26 by means of spool-type rollers 153. A hydraulic cylinder 136 having a long stroke provides the motive power to move the conveyor 26 forward and backward.

With the signature stack transferred to the slats 24 of the pusher conveyor 26, the pusher conveyor moves the stack to the left (as seen in FIGURE 1C) to a position above a horizontal belt conveyor 27.

Figure 11:
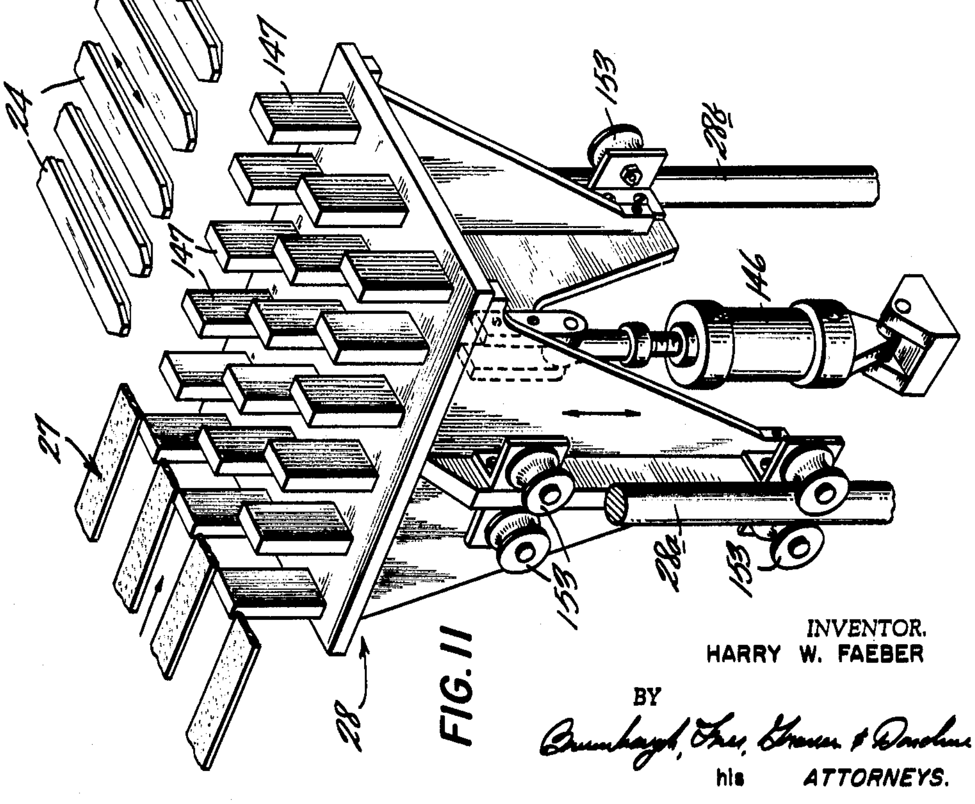
FIGURE 11 is a view in perspective of a signature stack lifter.

In this extended position, the pusher conveyor 26 actuates a contact 4LS to raise a lifter 28 having a plurality of projections 147 intermediate the belt conveyor 27 and, also, intermediate the slats 24 of the pusher conveyor 26 so that the signature stack is lifted from the slats 24. As best seen in FIGURE 11, the lifter supporting the projections 147 is movable vertically in a manner similar to the elevator 19. Two rails **28*a* and 28*b* are spaced apart and are gripped by spool-type rollers 153 so that the lifter 28 is movable vertically by a hydraulic cylinder 146**.

After the signature stack is raised from the slats 24, the pusher conveyor 26 is retracted, and the lifter 28 is lowered to transfer the signature stack to the belt conveyor 27. A contact 6LS is closed when the pusher conveyor 26 returns to its retracted position, and the elevator 19 supporting the slats 25 is raised again within the receptacle 16 to receive the next signature stack.

During this cycle of operation in transferring a completed signature stack from the receptacle 16 to the horizontal belt conveyor 27, the stream of signatures is being maintained and directed by the upper conveyor **22*b* to the alternate receptacle 17. By the time the elevator 19 is returned to its initial position, a gap has appeared across the gate 15, the gate has been returned to its lower position, and the signatures are being directed toward the lower receptacle 16** again.

Now, in more detail, referring to FIGURE 1C, the signature stream approaching the jogger receptacle 16 maintains the normally-closed contacts 8LS and 9LS in an open position. A plate 81 having turned-up corners, illustrated by the numeral 82, causes the outer edges of each signature to be curled slightly upward to impart rigidity to the signature. In this manner, each signature injected from the end of the conveyor into the jogger receptacle is maintained substantially straight in the direction of travel.

The signatures are received and supported by a jogger table formed by the plurality of slats 25 supported by the vertical elevator 19, and as each signature is delivered to the elevator 19 it is depressed by two depressors 83 and 84. Referring more particularly to FIGURE 7 of the drawings, the signature stream is directed into the receptacle 16 from a direction indicated by arrow 86 and strikes the forward bars 87 of the receptacle 16 to further align the forward edges. Side plates 88 and **88*a*** are vibrated to align the signatures laterally.

The side plates 88 and **88*a* are connected together by one or more bars 89 which, in turn, are connected to one end of oscillator levers 91 and 92. The levers 91 and 92 are moved backward and forward over a relatively small arc to impart vibrations to the side plates 88 and 88*a***.

As best seen in FIGURE 7, the vibratory side plates 88 extend only part of the way down, the fixed side plates 88′ being positioned to support the signatures laterally as they settle within the receptacle. The other sides of the receptacle are formed in a similar manner.

Each lever 91 and 92 is fixedly attached to rods 93 and 94, respectively, so that pivotal movement of the rod 94 as indicated by the arrow 97 develops an oscillatory movement in the lever 92, and by way of bar 89, in the lever 91 also, as indicated by the arrows 90. The linkage coupling the rod 94 to a power source is shown in FIGURE 7.

Referring again to FIGURE 7, the lower end of rod 94 is received and clamped in an aperture in lever 96. The lever 96, in turn, is coupled by suitable levers to a cam follower 98 which rides on the surface of a cam 99. Due to the four lobes of the cam 99, the cam follower 98 is oscillated four times for each revolution of the cam 99.

The side plates **88*a* receive vibratory motion which is identical with the motion of the side plates 88 due to their connection in a similar manner to the common shaft 100**.

The plates **88*b* are vibrated also by the end connections 102 to the common shaft 100. Thus, each signature delivered to the receptacle is jogged from three sides against the fixed end plates 87, and the signatures are urged downwardly in a close compacting relationship by the depressors 83 and 84**.

As best seen in FIGURE 8, the depressors 83 and 84 are moved in a constrained path indicated by the arrows 103. Shafts 104 and 106 connect the depressors 83 and 84, respectively, to rotating arms 107 and 108, respectively. Power is supplied to the rotating arms 107 and 108 by a belt and pulley arrangement 109.

A roller 111 attached to the end of projection 112 passes a plate 113 during each revolution of the arm 108. Plate 113 is attached to a pivoted arm 114 formed with a cam surface 116 disposed to actuate a switch 1LS. As the stack of signatures increases in the recptacle 16, the depressors 83 and 84 are moved downwardly less and less, the roller 111 strikes the plate 113 progressively harder and thus pivots the lever 114 an increasingly greater amount until the switch 1LS is actuated.

The switch 1LS is normally open, and when it is closed by the cam surface 116, a time delay relay (FIGURE 16) is closed, and the elevator 19 is lowered an incremental amount as, for example, one-quarter of an inch.

A hydraulic cylinder 118 (FIGURE 1C), by means of piston rod 119, is connected to the elevator 19 for movement in a vertical direction. Fluid pressure from a suitable source 121 is continuously applied to the upper end of the cylinder 118 to urge the piston rod 119 downwardly. However, a stop valve 122 is spring biased in a closed position so that the lower end of cylinder 118 is closed and the piston rod 119 will not move downwardly unless the solenoid C is actuated to momentarily exhaust the lower end of the cylinder 118.

Each time the contact 1LS is closed, the solenoid C opens the valve 122 to drain the lower end of cylinder 118, and the piston rod 119 begins an incremental downward movement. The downward movement is halted, however, when the contact 1LS opens and the solenoid C returns to its normally-closed position. The stack of signatures in the receptacle 16, thus, continues to build up.

As the elevator 19 completes its first incremental descent, cam surface 123 moves downwardly a sufficient amount to permit contact 7LS to open. However, as seen in FIGURE 16, the "off-on" switch 4CR is mechanically held in the "on" position.

It is necessary, now, that the three contacts 2LS, 8LS and 9LS be closed for the elevator 19 to lower completely and transfer the signature stack to the pusher conveyor 26. Therefore, as the elevator 19 continues its downward movement in incremental steps, the contact 2LS is closed by the cam surface 124.

The trailing edge of the signature stream passing from under contacts 8LS and 9LS permits these two contacts to close. As seen in FIGURE 1C, the relative position of contact 9LS is such that it will close as the last signature is delivered to the receptacle 16.

Therefore, upon the closing of contact 9LS, solenoid A is energized to move valve 126 downwardly. Fluid pressure from a suitable source 121, then, is connected through passage 127 to the upper part of cylinder 118, and the lower end of cylinder 118 is vented to a suitable exhaust 128 through passage 129 in the valve 126.

The elevator 19 now moves rapidly to its downmost position, the slats 25 (FIGURE 9) passing between the slats 24 (FIGURE 10) transferring the stack of signatures to the pusher conveyor 26. Once lowered, the elevator 19 remains in its lowermost position.

When the elevator 19 first reaches its lowermost position, cam surface 131 closes contact 3LS to energize solenoid D. While the elevator 19 is maintained in its lowermost position, the solenoid D moves valve 132 to the right as seen in FIGURE 1C so that fluid pressure from a suitable source 133 is applied through passage 134 to the rear end of hydraulic cylinder 136, and the forward end of cylinder 136 is vented to a suitable exhaust 137 through passage 138 in the valve 132. With pressure applied to the rear end of cylinder 136, the pusher conveyor 26 with the signature stack supported on the slats 24, moves to the left (as seen in FIGURE 1C).

Referring particularly to FIGURE 10, the pusher conveyor 26 is shown as being a trolley-type of conveyor guided by spaced-apart rails 151 and 152. Matching spool-type rollers 153 are attached to the trolley-like conveyor both above and below each rail 151 and 152 so that the conveyor 26 is guided in only one direction.

The hydraulic cylinder 136 is provided with a piston rod 154, the end of which is attached to the carriage 156 of the conveyor 26. Of course, any suitable structural arrangement of the component parts of the conveyor 26 may be used, the arrangement shown in FIGURE 10 being for illustrative purposes only.

A contact 6LS drops open as the pusher conveyor 26 begins to move from its first, or retracted, position, shown in FIGURE 1C. At the end of the movement of pusher conveyor 26 when the slats 24 supporting the signature stack are positioned directly above the belt conveyor 27, cam surface 141 closes contact 4LS to energize solenoid E (FIGURE 16).

A hydraulic valve 142 is moved to the left (as viewed in FIGURE 1C) by the energized solenoid E so that fluid pressure from a source 143 is directed through passage 144 to the lower end of cylinder 146. The lifter 28 is raised by the hydraulic cylinder 146 so that the projections 147 pass between the slats 24 to raise the signature stack from the slats 24.

At this uppermost position of the lifter 28, cam surface 148 closes switch 5LS to energize coil 9CR so that the electrical contact $9CR_1$ in FIGURE 16 is closed to energize coil 2CR. The energization of coil 2CR closes electrical contact $2CR_1$ and solenoid J becomes energized.

The energization of solenoid J moves the valve 132 to the left (as viewed in FIGURE 1C) so that the fluid pressure source 133 is connected through channel 157 to the forward end of cylinder 136, and the rear end of cylinder 136 is vented to the exhaust 137 through passage 158. In this manner, the pusher conveyor 26 is retracted quickly and smoothly, and the movement of the conveyor 26 permits contact 4LS to drop open, de-energizing solenoid E. In the fully retracted position of the pusher conveyor 26, the contact 6LS is closed to energize solenoid K.

The shift of the energization from solenoid E to solenoid K moves valve 142 to the right to the position shown in FIGURE 1C. Pressure from the fluid source 143 now is applied through passage 161 to the upper end of cylinder 146, and the lower end of cylinder 146 is vented through passage 162 to the exhaust 163. Thus, the lifter 28 is lowered, and the signature stack is transferred to the belt conveyor 27.

With the return of the conveyor 26 to its retracted position and upon the closing of the contact 6LS, the solenoid B is energized to move the valve 126 upwardly, as viewed in FIGURE 1C, to direct pressure from the source 121 through passage 171 to the lower end of cylinder 118, the upper end of the cylinder 118 being vented through passage 172 to the exhaust 128. The elevator 19 now is raised to its initial position to receive signatures for forming the next signature stack.

ELECTRICAL CIRCUIT AND OPERATION OF EMBODIMENT SHOWN IN FIGS. 1–16

A complete cycle of operation is illustrated by assuming that the signatures are approaching the lower jogger receptacle. In presenting this description, reference is made particularly to FIGURES 12–16.

By pressing the start button, coil C is energized and the contacts $C_1$ and $C_2$ are closed. Since the vertical elevator 19 within the jogger receptacle 16 is in its uppermost position, the contact 7LS is closed also and, thus, the coil 4CR is energized and the electrical contact $4CR_1$ is opened. Similarly, the vertical elevator 19' in the upper jogger receptacle 17 is in its uppermost position and, therefore, the contact 07LS is closed and the coil 04CR is energized to hold open the electrical contact $04CR_1$.

The signatures now are being received and jogged in the receptacle 16 as shown in FIGURE 1C. Each time the stack of signatures reaches a sufficient height so that the limit switch 1LS is closed momentarily, the coil TD is energized and the electrical contact $TD_1$ closes to energize solenoid C.

As previously explained, the energization of solenoid C lowers the elevator 19, but the lowering of the elevator 19 opens the contact 1LS, de-energizes the coil TD and, therefore, opens the electrical contact $TD_1$ again. Therefore, the jogger table or slats 25 are lowered by an incremental amount. After the first incremental lowering of the elevator table, however, the contact 7LS opens, but the mechanically held relay 4CR is maintained in its position.

When the jogger receptacle is nearly filled, contact 2LS is closed by the downward incremental movement of the vertical elevator 19. However, the contacts 8LS and 9LS in series with the contact 2LS are maintained open by the continued approach of the signature stream.

At approximately this point in the cycle of operation, a gap in the signature stream, which was formed by the interrupter, permits contact 4PS to close to ready the gate 15 for operation. When the gap is simultaneously beneath the contacts 4PS and 2PS, solenoid F is energized, and the gate 15 swings upwardly to direct the next signature stream after the gap to the upper conveyor **22*b*** (FIGURE 12).

As the end of the signature stream now being transported by the lower conveyor **22*a* passes the contact 8LS, the contact 8LS closes. The gate 15 now is directing the next succeeding signature stream to the upper conveyor 22*b* and the contact 4PS is opened to de-energize solenoid F. However, the gate 15** remains in its uppermost position until later operation of solenoid G. Also, it will be noted that contact 02PS is opened by the signature stream.

As the last signature in the stream on the lower conveyor **22*a* passes contact 9LS, the contact 9LS closes and energizes solenoid A. With the energization of solenoid A, the elevator 19 starts downward at a smooth, rapid rate. The contact 1LS opens and the coil TD is de-energized to open electrical contact $TD_1$ which, in turn, de-energizes solenoid C. During this interval, there is no change in the electrical circuit of the upper conveyor 22***b*, and the signature stream in the upper conveyor 22*b* is approaching the contact 08LS.

Figure 13:
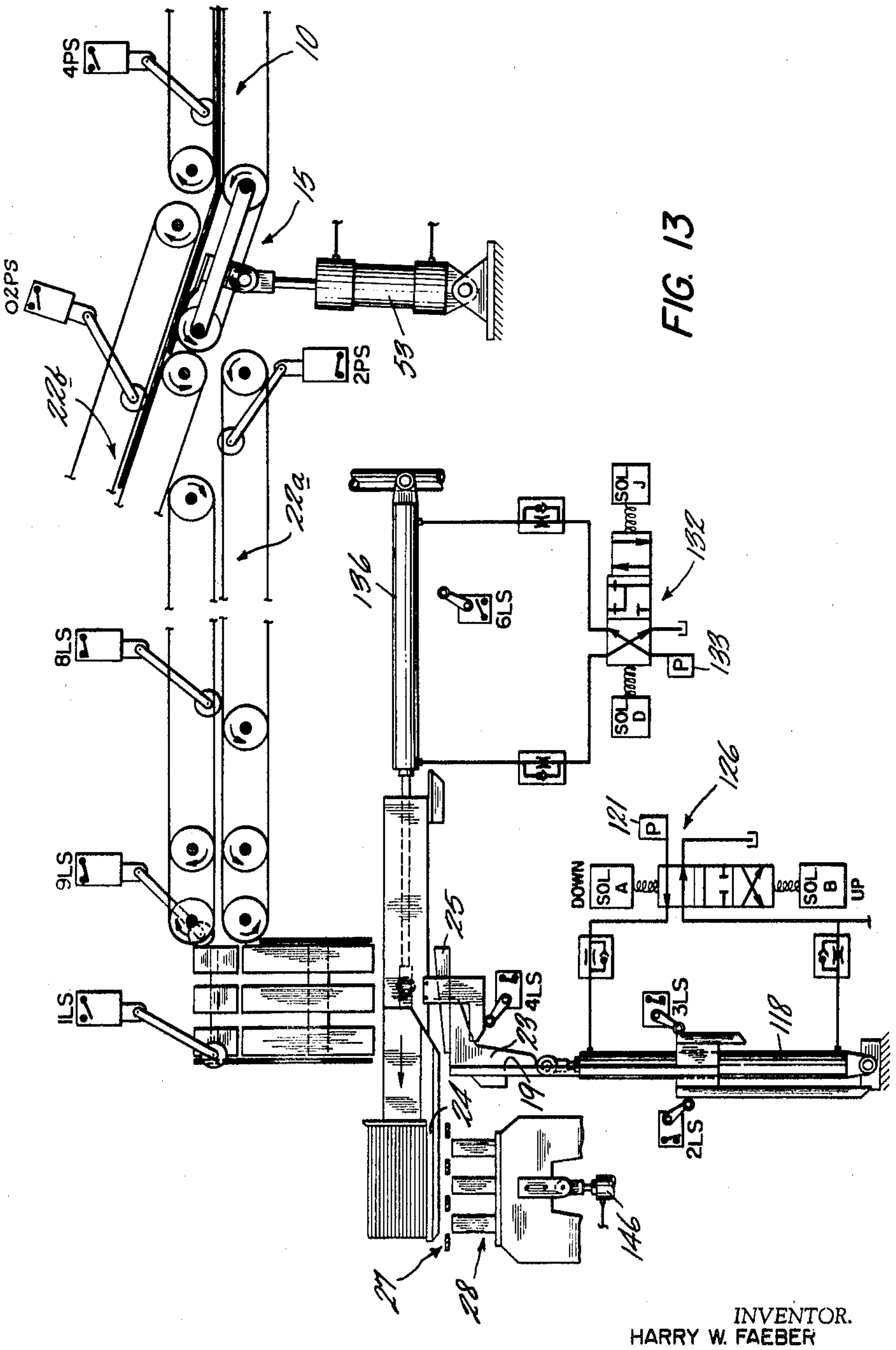
FIGURE 13 is a view similar to that shown in FIGURE 12 with the pusher conveyor of FIGURE 10 shown in delivery position.

The normally-open contact 3LS is closed when the elevator 19 reaches its lowermost position, and the solenoid D is energized. The energization of the solenoid D starts the pusher conveyor 26 forward (to the left as viewed in FIGURE 13) and contact 6LS drops open (FIGURE 13). At this point in the operation, the signatures are about to be delivered to the upper jogger receptacle 17 and the contacts 08LS and 09LS are opened by the passing signature stream.

As the pusher conveyor 26 reaches its extended position with the signature stack supported above the horizontal belt conveyor 27 (FIGURE 13), contact 4LS is closed to energize solenoid E. In response to the energization of solenoid E, the lifter 28 starts upward.

At about this time in the cycle of operation, signatures are being delivered into the jogger receptacle 17 and the elevator 19′ is moving down in incremental amounts as contact 01LS is closed intermittently. The contact 07LS is opened after the first downward incremental movement of the upper elevator 19′.

As the lifter 28 reaches the top of its stroke to raise the signature stack from the pusher conveyor 26, limit contact 5LS is closed and coil 9CR is energized to close electrical contact $9CR_1$ (FIGURE 16). With the electrical contact $9CR_1$ closed, coil 2CR is energized to close electrical contacts $2CR_1$ and $2CR_2$ and to open electrical contact $2CR_3$.

With the closing of the contact $2CR_1$, solenoid J is energized, and with the opening of electrical contact $2CR_3$ the solenoid D is de-energized. Also, the closing of electrical contact $2CR_2$ energizes the coil 4CRA.

Figure 14:
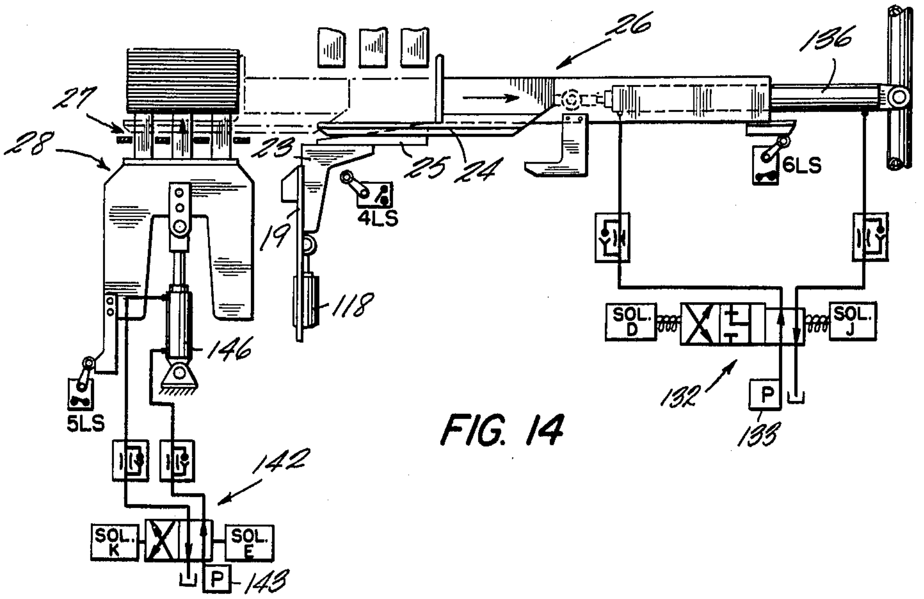
FIGURE 14 shows a portion of the mechanism of FIGURE 13 with the pusher conveyor in its retracted position after having delivered a signature stack.
Figure 15:
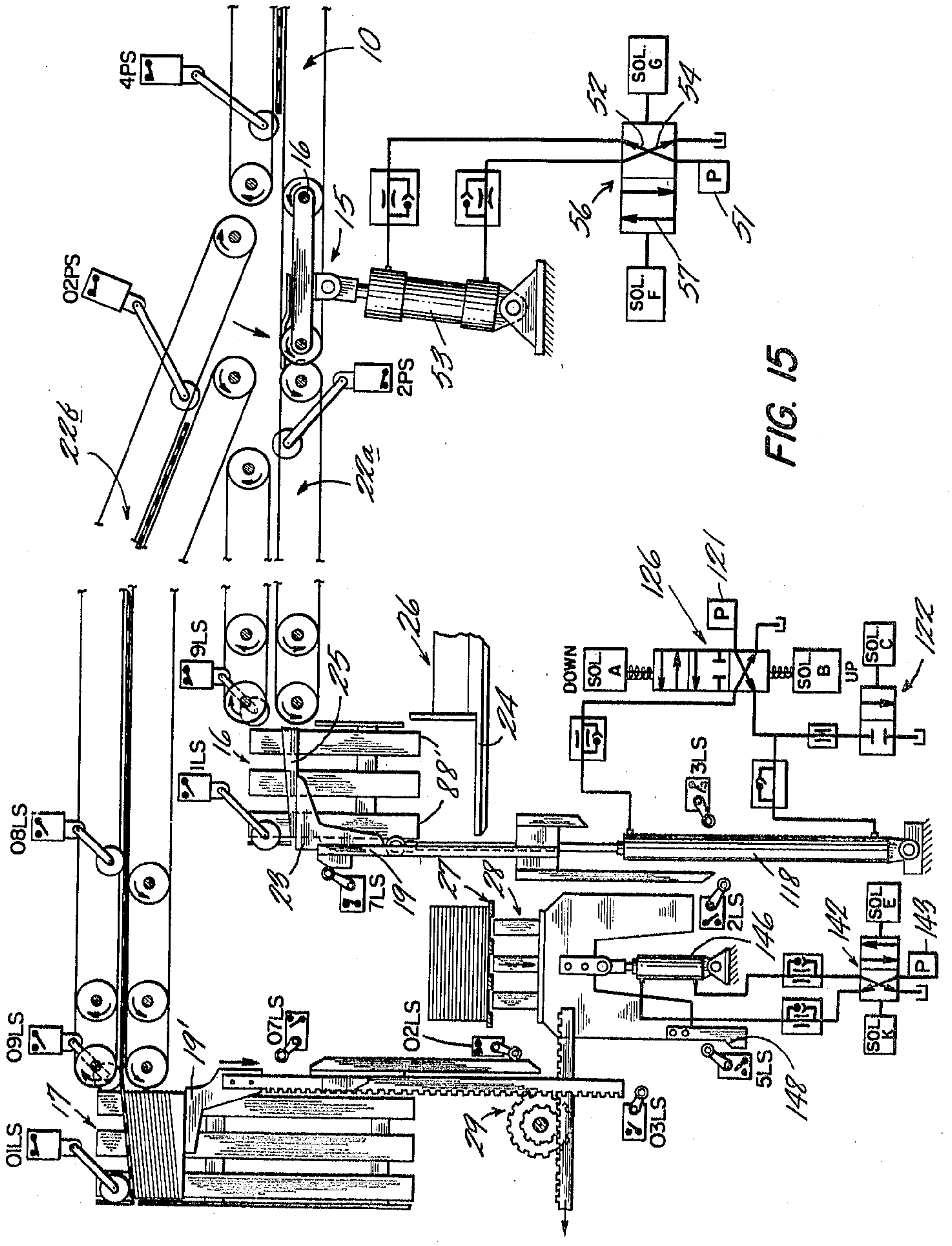
FIGURE 15 is a fragmentary view similar to FIGURE 13 showing the stream of signatures being delivered to a second jogger receptacle but with the gate returned to its first, or initial, position.

When solenoid J is energized, the pusher conveyor 26 is retracted to its initial position closing contact 6LS (FIGURE 14). As the pusher conveyor 26 begins its retracted motion, contact 4LS is opened and the solenoid E is de-energized. At about this point in the cycle of operation of the lower conveyor system, the elevator 19′ in the upper conveyor system has just closed contact 02LS (FIGURE 15).

With the pusher conveyor 26 retracted and contact 6LS closed, solenoid B is energized to start the elevator 19 upward again. In addition, the closing of contact 6LS also energizes coils 1CR and 8CR which, in turn, open electrical contact $1CR_1$ to de-energize solenoid A and close electrical contact $8CR_1$. The closing of electrical contact $8CR_1$ energizes solenoid K and starts the lifter 28 downward (FIGURE 15). As soon as the lifter 28 starts downward, contact 5LS opens to de-energize coil 9CR and opens electrical contact $9CR_1$.

In addition to the above, the energization of coil 1CR closes electrical contact $1CR_2$ to energize coil 5CR. At this point, there is no change in the electrical circuit for the upper conveyor system.

The lifter 28 reaches the bottom of its stroke at approximately the same time as the elevator 19 reaches the top of its stroke. The contact 2LS now is open, and the contact 7LS now is closed. The latter contact energizes electrical contact 4CR which, in turn, de-energizes electrical contacts 8CR and 1CR and solenoids B and K.

By this time, the interrupter device has formed another gap in the signature stream in the manner explained previously and, as the gap passes beneath contacts 4PS and 02PS (FIGURE 15), these contacts close and energize solenoid G. The solenoid G causes the gate 15 to be returned to its horizontal position and the subsequent signature stream to be diverted to the lower conveyor system 22*a*.

The next signature stream on the lower conveyor opens contact 8LS as it passes beneath it. At approximately the same time, the end of the signature stream on the upper conveyor 22*b* passes contact 08LS, and contact 08LS drops closed. On the lower conveyor, the signature stream opens contact 9LS and begins filling the jogger receptable 16 again. As the end of the signature stream on the upper conveyor 22*b* passes contact 09LS, contact 09LS closes and energizes solenoid 0A. The upper elevator 19′ now starts a rapid descent which opens contact 01LS to de-energize solenoid 0C.

The general arrangement of the upper elevator 19′ is substantially similar to the lower elevator 19 and, therefore, as the upper elevator 19′ reaches the lower end of its stroke, contact 03LS is closed to energize solenoid 0D. The pusher conveyor 26′ then starts forward opening contact 06LS, and as the pusher conveyor 26′ reaches the end of its stroke with the signature stack supported over the belt conveyor 27, contact 04LS is closed to energizes solenoid E.

Upon the energization of solenoid E, the lifter 28 starts up to raise the stack from the pusher conveyor 26′. At the upper limit of the stroke of the lifter 28, contact 5LS closes and energizes coil 9CR to close contact $9CR_2$. The closing of the contact $9CR_2$ energizes coil 02CR which, in turn, closes contact $02CR_1$ to energize solenoid 0J.

At the same time, solenoid 0D is de-energized and the pusher conveyor 26′ retracts to its initial position, closing contact 06LS. As the pusher conveyor 26′ starts its retraction motion, however, contact 04LS is opened and solenoid E is de-energized.

The enerfiization of coil 02CR also closes contact $02CR_2$ to energize coil 04CRA to release the mechanical hold on contact 04CR.

Upon the closing of contact 06LS by the return of the pusher conveyor 26′ to its retracted position, solenoid 0B, coil 08CR and coil 01CR are energized. The energization of coil 08CR closes the electrical contact $08CR_1$ to energize solenoid K to start the lifter 28 down again.

The energization of coil 01CR opens electrical contact $01CR_1$ to de-energize solenoid 0A and, by closing the contact $01CR_2$, energizes the coil 5CRA, releasing the mechanical hold of coil 5CR.

As the lifter 28 is being returned to its lowermost position, contact 5LS is opened to de-energize coil 9CR which, in turn, opens electrical contact $02CR_1$ to de-energize solenoid 0J. The energization of solenoid 0B starts the elevator 19′ upward and contact 03LS is opened.

As the lifter 28 reaches the bottom of its stroke and as the elevator 19′ reaches the top of its stroke, contact 02LS opens and contact 07LS closes. The closing of contact 07LS energizes coil 04CR since coil 04CRA is released by the opening of contact $02CR_2$. The energization of coil 04CR opens electrical contact $04CR_1$ to de-energize coil 08CR, coil 01CR and solenoid 0B. The solenoid K is de-energized since the de-energization of coil 08CR opens the electrical contact $08CR_1$. Thus, the elevator 19′ is returned to its initial, upward position to begin receiving signatures to repeat the cycle just described.

FIGURES 17A–25

The apparatus described above, of course, is susceptible to modification without departing from the spirit and scope of the invention. One such modification is illustrated in FIGURES 17A–25 of the drawings.

Referring now particularly to FIGURES 17A, 17B and 17C, a stream of signatures 200 is transported with the forward, folded edges in overlapping relationship, from, for example, a folder apparatus (not shown) by means of a vertical, double conveyor 201 to a horizontal, single belt conveyor 202. The conveyor 202, in this instance, transports the signature stream 200 to the left (as viewed in FIGURE 17A) past the interrupter 14 (FIGURE 17B).

The structural arrangement of the interrupter 14 is substantially identical to that described previously above in connection with FIGURES 2, 3 and 4. However, since the conveyor 202 is a single conveyor, the upper wooden strip 38' is formed of a single piece of material rather than a plurality of strips as described previously. A modified circuit arrangement for operating the interrupter is shown in FIGURE 17A wherein a plurality of circular cams 203 are fixedly attached to a common shaft 204.

The rotation of the shaft 204 and, thus, the cams 203, is synchronized with the conveyors 201 and 202 by coupling the shaft 204 directly to the axis 206 in conveyor 201. An effective coupling is obtained by means of a belt 207 positioned about pulley 208 on the shaft 206 and about a pulley 209 on a gear box 211.

Each of the cams 203 attached to the shaft 204 has a different number of notches corresponding to the number of signatures that are to be formed into each stack by the mechanism, the fewest number of notches presenting the greatest peripheral distance between successive gaps to give the greatest number of signatures per stack. Since these cams 203 are synchronized with the conveyor 201, the length of an uninterrupted stream of signatures depends on the distance between the notches around the periphery of the selected cam 203.

Alternatively, a switch similar to 17LS associated directly with the stack of signatures being formed may be connected to actuate the interrupter when the stack reaches a preselected height.

By this means, an accurate control is maintained over the height of the signature stack to be formed. The appropriate cam 203 is selected in a manner similar to that described previously by a selector switch to be described in greater detail presently.

The signature stream 200 is delivered from the conveyor 202 past gate 15 to a conveyor 212. In this instance, however, the gate 15 is to be actuated to direct the signature stream over an alternative path 213 only when there is a jam-up or other emergency condition arising along the conveyor 212, as also will be described presently.

Moreover, the conveyor 212 transports the signature stream 200 past a side jogger device 20 substantially identical to that already described.

The stream of signatures 200 is delivered by the conveyor 212 to a jogger receptacle 214. FIGURE 23 shows an end view of the conveyor 212 such that a signature stream would be delivered toward the viewer. A plate 81 is positioned at the delivery end of conveyor 212 and has opposite corners 82 turned up slightly to impart a bend in each signature, as described previously. Also shown in FIGURE 23 are a plurality of vertical, spaced-apart slats 216 that form one side of the jogger receptacle 214.

The plate 81 is also seen in FIGURE 21 of the drawings, which shows a plan view of the jogger receptacle 214.

Opposite sides of the jogger receptacle 214 are formed of metal plates 217 and 218, respectively (see plan view in FIGURE 21). Each of these plates is vibrated by appropriate linkages 219 and connecting rods 221 attached to identical eccentrics 222. A shaft 223 connected between the two eccentrics 222 is rotated by means of a chain drive 224 from a motor 226 through a gear box 227.

A shaft 228 is driven also by the shaft 223 by means of a belt 229. One or more discs, or wheels, 231 are fixedly attached to the shaft 228 for rotation thereby and are provided with a plurality of flexible, say, leather paddles 232 of sufficient length to strike and depress each signature delivered to the receptacle 214. For this purpose, the paddles 232 extend from the wheels 231 between vertical strips 233 forming the rear wall of the receptacle 214.

Instead of supporting the signatures within the receptacle 214 by a vertically movable elevator as in the arrangement described previously, the signature stack is supported initially by slats 236 of a swing table 237 (FIGURE 17C). The swing table 237, as best seen in FIGURES 18 and 19, is formed with a frame 238 that rides on spaced-apart tracks 241 and 242 by means of spool-type pulleys 243.

The frame 238 of the swing table 237 is movable forward and backward by means of piston rod 244 pivotally connected at one end 247 to the frame 238 and a hydraulic cylinder 246 pivotally connected at the opposite end to an axle 248. In addition to movement in a forward and backward direction, the swing table 238 is movable vertically by means of a piston rod 251 pivotally connected at a point 252 beneath the end 247. As the swing table 237 is moved vertically, the frame 238 is pivoted about the axis 248. Movement of the swing table 237 is effected by a hydraulic cylinder 253 (FIGURE 17C).

As the signature stack increases in the receptacle 214, the swing table 237 is lowered in incremental amounts by the action of hydraulic cylinder 253 until the stack of signatures is nearly completed. Since the signatures are fed into the jogger receptacle folded edges first and the pivot 248 for the swing table is located in a direction upstream of the direction of feed of the signature to the jogger receptacle, the downward pivotal motion of the swing table gradually increases the angle of the table to compensate for the increased height of the folded leading edges of the signatures with respect to the trailing edges thereof. Just before the stack of signatures is completed, the swing table 37 is lowered to its lowermost position, the slats 236 passing between spaced-apart brackets, similar to brackets 23 (FIGURE 9) to transfer the partially completed signature stack to the elevator 256 (FIGURE 17E). When the swing table 237 reaches its lowermost position, it is retracted swiftly from under the elevator 256 by the operation of hydraulic cylinder 246 (FIGURE 17F) and is raised by the action of hydraulic cylinder 253 to a position (FIGURE 17G) in readiness for extending to its initial position.

With the swing table 237 retracted and the signature stack on the elevator 256 completed, the elevator 256 lowers to transfer the stack to the pusher conveyor 26 (FIGURE 17H). As the elevator 256 lowers, the swing table 237 is extended to its initial position in time to receive the first signature in the next stream.

The pusher conveyor 26 moves the signature stack to the left as illustrated previously in FIGURE 13, and lifter 28 is raised to support the signature stack while the pusher conveyor 26 is retracted. Then, the lifter 28 is lowered to transfer the stack to the horizontal belt conveyor 27 as described in detail previously.

A jam circuit is provided so that the signature stream 200 may be directed to an alternative path should signatures become fouled in the receptacle 214 or should some other emergency situation arise. As best seen in FIGURES 17C and 17D, an arm 261 is suspended over the receptacle 214 and is attached to switch 1SW so that signatures that strike the arm 261 will actuate contact 18LS to disengage clutch 262. With the clutch 262 disengaged, a break is formed in the conveyor line 212 and the conveyor is halted. This feature will be described in greater detail presently.

OPERATION OF EMBODIMENT SHOWN IN FIGS. 17A–25

With no signatures present on the conveyor 212, contact 2PS is closed and a circuit is completed (FIGURE 25) through contact 2PS and normally-closed contact $4CR_1$, and coil 11CR is energized. With the coil 11CR energized, the contact $11CR_1$ is opened.

As the first signature of a stream passes contact 2PS, the contact 2PS is opened and coil 11CR is de-energized. The electrical contact $11CR_1$ returns to its normally-closed position. Assume, for example, that the selector switch (FIGURE 25) is set at the 8PS position, as shown in the drawing. As the cam 8PS (FIGURE 17A) rotates sufficiently for a notch thereon to actuate contact 8PS, a circuit will be completed through the closed contact $11CR_1$ and the contact 8PS to energize coil 10CR. The energization of coil 10CR closes electrical contact $10CR_1$ to energize solenoid M. When electrical contact $10CR_1$ is closed, the contact $10CR_2$ is open to avoid actuation of the jam circuit and also to prevent opening electrical contact $4CR_1$.

The interrupter 14 (FIGURE 17B) remains in its closed, or interrupting, position until the gap being formed reaches contact 2PS. With no signatures to maintain contact 2PS open, the contact 2PS will close and energize coil 11CR. The energization of coil 11CR opens electrical contact $11CR_1$ to de-energize coil 10CR and open electrical contact $10CR_1$. With the electrical contact $10CR_1$ open, the solenoid M is de-energized and the hydraulic valve 33′ (FIGURE 17B), actuated thereby, is returned to its initial position so that the interrupter 14 is opened again to initiate another stream of signatures.

Thus, it may be seen that the maximum gap is the physical, lineal distance between the interrupter 14 and the contact 2PS. However, a shorter gap is formed by the opening of contact 8PS by an associated cam 203.

In the event a jam of signatures develops in the jogger receptacle 214, lever arm 261 closes switch 1SW and, since electrical contacts $U_4$ and $10CR_2$ are in their normally-closed positions, the interrupter coil M is energized and a gap in the signature stream begins to form.

Also, upon the closing of the jam switch 1SW, coil 4CR is energized to open electrical contact $4CR_1$ and close electrical contacts $4CR_2$ and $4CR_3$. After the gap reaches contact 2PS, the contact 2PS drops closed and completes a circuit to energize coil U, which closes electrical contact $U_1$ (FIGURE 25) and, also to open electrical contact $U_2$ in the power supply of the jogger circuit (FIGURE 24).

Another electrical contact $U_3$ (FIGURE 25) is closed to start the motor supplying power to the upper conveyor 213. In addition, solenoids R and F are energized to disengage the conveyor clutch 262 and to swing gate 15 to its up position, respectively. The coils 11CR and 10CRA are energized momentarily.

Electrical contact 18LS is opened when the clutch 262 is disengaged and the solenoid R is de-energized. However, the clutch remains disengaged and will remain disengaged until solenoid O is energized. With the energization of coil 11CR, the electrical contact $11CR_1$ is opened to de-energize coil 10CR which opens electrical contact $10CR_1$ and de-energizes solenoid M to open the interrupter 14.

The stream of signatures then proceeds up the upper conveyor 213, passing and opening contact $14PS_2$ and closing contact $14PS_1$.

The opening of contact $14PS_2$ de-energizes the coils 11CR and 10CRA, closing contacts $11CR_1$, and a gap can be formed by the interrupter 14 and the selector switch as previously described.

When the jam situation has been cleared, the contact 1SW is opened. By depressing the reset button, coil 4CRS is energized and the solenoid O is energized to engage the clutch 262, starting the conveyor 212 again. The mechanism will reset itself, now, as soon as the next gap straddles contact 14PS.

When a gap appears under the contact 14PS, the contact $14PS_2$ closes, contact $14PS_1$ opens, and coils 11CR and 10CRA are energized. With contact $14PS_1$ open, the solenoid F is de-energized and the gate 15 lowers. Also, coil U is de-energized opening electrical contact $U_3$ (FIGURE 25) and the upper conveyor 213 stops. The electrical contact $U_2$ (FIGURE 24) in the jogger circuit is closed to permit the jogger circuit to be energized when the "start" button is depressed. With signatures again passing over contact 2PS, the contact 2PS is open, and the cycle just described is completed.

The sequential operation of the various components of the mechanism described above is controlled by an electrical circuit which includes a timing cam having six operative positions, as illustrated in FIGURE 24 of the drawings. Referring now more particularly to the circuit diagram shown in FIGURE 24 and to the FIGURES 17E through 17H, the initial or "home" position is when the timing cam is in position No. 6.

In this position No. 6, the elevator 256 is in its uppermost position and contact 13LS is closed. In addition, the swing table 237 is up and fully extended to its forwardmost position. Contact 12LS is closed also, and since coils 2CR and SQD are energized, the electrical contacts $2CR_1$, $2CR_2$, $2CR_3$ and $SQD_1$ are closed. The closing of the contact $2CR_2$ energizes solenoid K.

However, in this initial position, the lifter 28 (FIGURE 17C) is already in its downmost position so that no mechanical action takes place. The closing of the contacts 12LS, 13LS and $2CR_1$ energizes coil 1CRA to maintain electrical contact $1CR_1$ open and to maintain electrical contact $1CR_2$ closed. In this "home" position, therefore, the electrical circuit and the jogger mechanism are prepared for operation.

Operation is begun by depressing the "start" button to energize coil C which, in turn, closes the electrical contacts $C_1$, $C_2$, $C_3$, $C_4$, $C_5$ and $C_7$ and opens electrical contact $C_6$. With the closing of contact $C_3$, solenoid B is energized but no action takes place since the jogger table is already in its uppermost position.

Since the operation has only just begun, there are no signatures on the conveyor and contacts 8LS and 9LS, therefore, are closed. Moreover, since the contacts 12LS, 13LS and $2CR_1$ are in series with the "start" button circuit, the mechanism cannot be started unless the timing cam is in position No. 6, the jogger table 256 is in its uppermost position, and the swing table 237 is up and fully extended.

As the stream of signatures arrives at the jogger receptacle 214, contacts 8LS and 9LS are opened. The contact 1LS will be closed momentarily when the pile of signatures reaches a predetermined level. The closing of contact 1LS energizes a time delay coil TD to close electrical contacts $TD_1$ and, thereby energize solenoid 1C.

When the solenoid 1C is energized, the hydraulic cylinder 253 lowers the swing table 237 until the contact 1LS opens again to de-energize coil TD. The lowering of the swing table 237 is repeated in incremental amounts with the contact 12LS, however, opening when the swing table 237 is lowered the first increment.

When the swing table 237 is lowered sufficiently, contact 17LS is closed to satisfy one condition for unloading the signature stack. In other words, if the stream of signatures is for some reason interrupted prematurely and the contacts 8LS and 9LS are closed, the swing table 237 will not unload the stack unless the swing table had previously been loaded sufficiently to close contact 17LS.

When the swing table is lowered sufficiently to close contact 02LS, the timing cam is rotated to position No. 1 which energizes solenoid 1A to drop the swing table to its lowermost position, transferring the now partially completed stack to the elevator 256. However, when the swing table 237 reaches its lowermost position, contact 03LS is closed to energize solenoid L, and the swing table is retracted from beneath the jogger table 256, as shown in FIGURE 17F.

Also, when the timing cam is turned to position No. 1, coil 1CR is energized, which de-energizes coil 1CRA. The energization of coil 1CR closes electrical contact $1CR_1$ and opens electrical contact $1CR_2$ so that solenoid C is now energized. The result is that further incremental steps in lowering the signature stack due to the action of contact 1LS are transferred from the action of hydraulic cylinder 253 to the hydraulic cylinder 257.

Upon retracting completely, the swing table 237 closes contact 10LS, and the timing cam is rotated to position No. 2, which energizes solenoid 1B to raise the swing table 237 to its uppermost, retracted position. The swing table is now in position to be extended for receiving the next stack of signatures, as seen in FIGURE 17G.

As the last signature is delivered to the jogger receptacle 214 because of the gap previously formed in the stream, contacts 8LS and 9LS close and solenoid A is energized. The energization of solenoid A causes the hydraulic cylinder 257 to lower the elevator 256 and the signature stack swiftly.

Also, the closing of contacts 8LS and 9LS energizes coil 5CR to close electrical contacts $5CR_1$ and $5CR_2$ to bypass the two contacts 8LS and 9LS. When the contact $5CR_2$ is closed, coil 1CRA is energized and coil 1CR is de-energized. When coil 1CR is de-energized contact $1CR_1$ is returned to its normally-open position, and the contact $1CR_2$ is returned to its normally-closed position, transferring the action of the time delay contact $TD_1$ to the solenoid 1C.

As the elevator 256 descends swiftly, contact 2LS is closed when the upper signature in the stack is low enough to permit the swing table 237 to be extended. With the closing of contact 2LS, solenoid P is energized and the swing table 237 is extended rapidly to its initial position (FIGURE 17H) in time to begin receiving the next stream of signatures. The extension of swing table 237 closes contact 12LS, and the arrival of the next stream of signatures opens contacts 8LS and 9LS again.

When the elevator 256 reaches its lowermost position and the signature stack has been transferred to the pusher conveyor 26, a lower limit switch 3LS is closed, and the timing cam turns to position No. 3 which energizes solenoid D. The energization of solenoid D causes the pusher conveyor 26 to transport the signature stack to a second, or extended position over the belt conveyor 27, and contact 6LS is opened.

At approximately this point in the cycle of operation, the swing table 237 is being lowered incrementally due to the increasing stack of signatures delivered thereto.

As the pusher conveyor 26 reaches its extended position at a point over the belt conveyor 27, contact 4LS is closed and the timing cam is rotated to positon No. 4 to energize solenoid E. The energization of solenoid E starts the lifter 28 upwardly to raise the signature stack from the pusher conveyor 26. The movement of the timing cam to position No. 4 de-energizes solenoid D.

As the lifter reaches the uppermost position, contact 5LS is closed, and the timing cam is turned to position No. 5, which de-energizes solenoid E and energizes solenoid J. The latter, in turn, starts the pusher conveyor 26 to retract. In its retracted position, the pusher conveyor 26 closes contact 6LS, and the timing cam turns to position No. 6 to de-energize solenoid J and to energize the solenoids B and K and the coil 2CR.

The energization of solenoid B causes the elevator 256 to rise to its uppermost position, and the energization of solenoid K lowers the lifter 28 to transfor the signature stack to the belt conveyor 27. The raising of the elevator 256, of course, opens contact 5LS, and the timing is such that the elevator 256 reaches its uppermost position in time to receive the partially completed signature stack from the downwardly moving swing table 237. The cycle just described is repeated now.

FIGURES 26A–28B

FIGURES 26A through 28B show another embodiment of the present invention which comprises what may be termed an "in line" jogger system. Referring specifically to FIGURES 26A and 26B, a stream of signatures 300 flows in a given direction, as shown by the arrow, from a folder section (not shown), through an interrupter 301 and a gate 302, to a jogging and stacking section 304.

In the section 304, the stream of signatures is side-jogged in a jogger 305 to correct its alignment, and then passes through another interrupter 306 to a jogger box 308. Within the jogger box the signatures are first deposited on a swing table 309, which is capable of being moved in a downward, backward, upward, and forward direction, to commence the formation of a stack of signatures. Initially, the swing table moves slowly downward, as a partial stack of signatures is formed thereon, until the table passes through a vertically movable jogger table 310, transferring the signatures thereto. (See FIGURE 26C.) The swing table then moves rapidly downward, backward, and upward as shown in FIGURES 26D and 26E.

After the transfer of the partially completed stack of signatures from the swing table 309 to the jogger table 310, the jogger table moves slowly downward until, after the interrupter 306 has temporarily interrupted the stream of signatures, a stack of signatures has been completed thereon, as shown in FIGURE 26E. At this time, the jogger table moves rapidly downward and through a conveyor 311 to transfer the completed stack of signatures to the conveyor, which removes the signatures form above the jogger table, taking them away in a direction that is in line with the direction in which the signatures flow from the folder section to the jogging and stacking section 304. (See FIGURE 26F.) As the jogger table moves rapidly downward, the swing table 309 moves forward into position to receive the first in a new series of signatures, and, thereafter, the jogger table moves upward into position to carry out another cycle of operation.

These operations, and other operations that add to the overall jogging and stacking process, will now be described in detail, beginning with a description of the interrupter 301 which serves to interrupt the flow of signatures moving toward the jogger.

*Stream interrupter*

The interrupter 301, shown in detail in FIGURE 27, is substantially the same as that disclosed in copending application Serial No. 100,250, filed April 3, 1961, now Patent No. 3,149,834, for Stream Interrupter, and comprises a series of spaced apart fingers 312 rigidly attached to a pivotal shaft 315 which extends below and transversely of the conveyor 314. The fingers are positioned in the spaces between adjacent belts of the conveyor, so that upon rotation of the shaft 315 in the proper direction the fingers are capable of passing upwardly through the belts to engage the signatures. Rotational movement is imparted to the shaft by a piston rod 316 which is pivotally connected to a plate 318 attached to the shaft 315. The piston to which the rod is attached moves within a cylinder 319, and the piston is actutaed by fluid pressure through a control system which includes a pair of conduits 320 and 321 (FIGURE 26A) which communicate respectively with the top and the bottom of the cylinder 319. Pressure from a source of pressure P is applied to either one of the lines 320 and 321 through a valve 322 that is controlled by a solenoid M′ and a spring 324.

When the solenoid M′ is deenergized, the valve 322 is in the position shown in FIGURE 26A, and pressure is supplied through the valve 322 to the line 320, the line 321 serving as an exhaust line. The piston 316 is thus forced to the bottom of the cylinder 319, and the interrupting fingers 312 are in an inoperative position below the belts 314, as shown in FIGURE 26A. When the solenoid M′ is energized, the valve 322 is shifted and pressure is supplied to the line 321, the line 320 serving as an exhaust line. This fluid pressure forces the piston 316 upwardly, swinging the fingers 312 between the belts 314 into a position shown in FIGURE 27.

As the interrupting fingers are moved upwardly, they strike a stop plate 325. The stop plate 325 it attached to a pair of rigidly connected linking members 326 and 328. The member 328 pivots freely on the shaft 315. Thus, when the interrupting fingers 312 are raised to interrupt the advance of signatures toward the jogger, the fingers first strike the stop plate 325, which is initially in a position as shown in FIGURE 26A, and pinch a group of the moving signatures therebetween. The fingers and the stop plate are then raised to a position determined by the engagement of a part of the plate 328 with a stop 329. In this raised position, the interrupted signatures are forced back by gravity against the stream moving toward the interrupter.

When the solenoid M′ is deenergized, the piston 316 moves downwardly, swinging the fingers out of the path of the signatures on the conveyor, and the stream again is allowed to flow smoothly. In this inoperative position of the interrupter, the lower stop 330 of the link 326 rests upon a portion of the jogger frame and limits the lower movement of the stop plate 325.

*Bypass gate*

When the interrupter mechanism 301 is not actuated, the stream of signatures 300 flows therethrough into the bypass gate 302. The gate is similar to that shown in FIGURE 6 and comprises two sets of rotating wheels 331 and 332 that rotate about shafts 334 and 335, respectively. The shafts are joined by a linking member 336 which is connected by a downwardly depending arm 338 to a piston rod 339 of a piston which is accommodated for movement within an air cylinder 340. The air cylinder 340 has a conduit 341 connected thereto through which fluid pressure from a source of air pressure P is supplied to the cylinder through a valve 342 that is under the control of a solenoid F′ and a spring 343.

When the solenoid F′ is energized, pressure is applied to the line 341, forcing the piston 339 to the bottom of the cylinder 340 and the gate 302 into the downward position shown in full lines in FIGURE 26A. In this position, the signatures flow toward the main jogger mechanism of FIGURE 26B.

When the solenoid F′ is not energized, the line 341 is exhausted through the valve 342, and the piston 339 is forced upwardly by the action of a spring 344. Another spring 345, pushing against the arm 338, also urges the piston upwardly, pivoting the gate 302 about the shaft 335 into the position shown in dotted lines in FIGURE 26A. In this position, the signatures pass to a catch plate 346 from which the signatures may be removed by a jogger operator (not shown) who stands on a platform 348 commonly used for this purpose.

MAIN JOGGER SECTION

When the bypass gate is in its downward position, the signature stream flows toward the main jogger past a conveyor clutch 349. The clutch arrangement, which includes a limit switch 18LS, is the same as that shown in FIGURE 17D and operates in the same fashion to control the movement of the conveyor belts.

The signatures flowing to the main jogger mechanism form a vertically ascending stream, as shown at 350 in FIGURE 26B. The stream then assumes a horizontal movement and passes between a pair of pressure rollers 351 and 352 which serve to crease the signatures along the folded edges thereof to create a better fold. After passing through the compression rollers, the stream is jogged by the side jogger 305, similar to the jogger 20 of FIGURES 1B and 5, to correctly align the stream. The stream then passes through the interrupter 306 which is similar to the interruptor 301 of FIGURE 26A. The interrupter 306 is actuated periodically, as will be explained later in more detail, to permit the formation of separate stacks of signatures in the main jogger box section.

After the signatures pass through the interrupter 306, a jet of air, under the control of a solenoid W′, is blown through the moving stream from a tube 354. The jet of air separates the signatures slightly from their overlapped positions and removes any static charges tending to keep the overlapped portions of the signatures attracted together.

The signatures continue past the air jet section and pass under a set of speedup or "whiz" wheels 355 which accelerate the signatures passing thereunder and expel them into the jogger box 308.

The swing table 309 and the vertically operable jogger table 310 are components of the jogger box 308. The swing table 309 is similar to the swing table 236 shown in FIGURES 18, 19 and 20, and operates in very much the same fashion. The jogger table 310 is similar to the vertically operable elevator 19 shown in FIGURE 9.

*Swing table*

The swing table consists of a series of spaced slats 356 that are connected to an arm 358. The arm is coupled to a piston 359 which is actuated within a cylinder 360 for imparting a forward and backward movement to the swing table. The arm is also coupled to a piston 361 actuated within a cylinder 362 for imparting an upward and downward movement to the swing table in pivotal fashion about an axis formed from shaft 357. This pivotal movement increases the slope of the slats 356 as the swing table is lowered, and the top of the stack of signatures being formed is kept substantially level at all times.

Forward and backward movement of the swing table 309 is effected by applying a source of pressure P to either one of input lines 364 and 365 of the cylinder 360 through a valve 366. The valve is controlled by a pair of solenoids L′ and P′. When the solenoid L′ is energized, pressure is applied to the pressure line 365, forcing the piston 359 to the right and retracting the swing table. The table is shown in its retracted position, for example, in FIGURE 26D. Energizing solenoid P′, on the other hand, couples pressure to the line 364, moving the swing table to its forward position. This position is shown, for example, in FIGURE 26F.

Upward and downward movement is imparted to the swing table by applying air pressure from a source of pressure P to either one of input lines 368 and 369 of the air cylinder through a valve 370. The valve is controlled by a solenoid A′ and a spring 371. When the solenoid A′ is energized, for example, as shown in FIGURE 26D, pressure is applied to the input line 368, thereby forcing the piston upwardly. When the solenoid A′ is de-energized, however, as shown in FIGURE 26F, pressure is coupled to the line 369, thereby forcing the piston downwardly.

The downward movement of the swing table is controlled by a secondary piston 372 that is coupled to the piston 361 by a link 374. The piston 372 moves within an hydraulic cylinder 375, and contains a check valve 373 that prevents fluid within the cylinder from passing upwardly through the piston. The hydraulic cylinder is coupled by an upper line 376 and a lower line 378 to a pair of hydraulic valves 379 and 380, respectively. The hydraulic valves are ultimately controlled by a pair of solenoids A1′ and A2′ as follows. Assume, for example, as is shown in FIGURE 26F, that both solenoids A1′ and A2′ are energized. In this state, a source of pressure P is coupled through an associated set of valves 381 and 382, respectively, to a pair of actuators 384 and 385. Each of the actuators controls an associated one of the hydraulic valves 379 and 380. For example, when solenoid A1′ is energized and the actuator 384 is pressurized, the hydraulic valve 379 is pulled to the position shown in FIGURE 26F Similarly, when solenoid A2′ is energized, the other actuator 385 is pressurized, and the hydraulic valve 380 is pulled to the position shown. In these positions, the valve 379 presents an unrestricted passage to the flow of fluid therethrough, and the valve 380 presents a partially restricted passage to the flow of fluid. Since the check valve 373 within the cylinder 375 prevents the fluid from flowing upwardly therethrough, the fluid is forced out of the bottom of the cylinder and into the top of the cylinder when the piston 372 moves downwardly. Because of the partially restricted passage in the valve 380, the piston is allowed to move downwardly only at a relatively slow rate.

If solenoid A1′ is energized and solenoid A2′ is not energized, as is shown in FIGURE 26C, the actuator 385 is not pressurized, and the hydraulic valve 380 is pulled to the position shown. In this position the valve 380 presents an unrestricted passage to the flow of fluid therethrough. Since the valve 379 also presents an unrestricted passage, the piston 372 within the hydraulic cylinder 375 may proceed downwardly at a faster rate than when solenoid A2′ is energized, and thus the swing table 309 moves downwardly at a relatively fast rate.

When solenoid A1′ is unenergized, the hydraulic valve 379 is in the position shown in FIGURE 26D, for example. In this position the valve presents a totally restricted passage and prevents fluid from passing therethrough. Thus, the piston 372 within the cylinder 375 is prevented from moving downwardly. While the check valve 373 also prevents downward movement of the piston, it does allow upward movement, and thus, when solenoid A′ is energized, forcing the piston 361 in the air cylinder 362 upwardly, the swing table moves upwardly.

To summarize, the swing table moves upwardly when solenoid A′ is energized. When solenoid A′ is de-energized and solenoids A1′ and A2′ are both energized, the swing table moves downwardly at a first, relatively slow rate. When solenoids A′ and A2′ are de-energized and solenoid A1′ is energized, the swing table moves downwardly at a second, relatively fast rate.

*Jogger table*

Vertical movement is imparted to the jogger table 310 by a movable piston 386 that is actuated within an air cylinder 388. The piston 386 is connected to the frame of the jogger table by a series of intercoupled arms 389, 390, and 391. The arms 389 and 390 are rigidly attached to a rod 392 which is free to rotate. When the piston 386 moves to the right, the jogger table is lowered, and, conversely, when the piston rod moves to the left, the jogger table is raised.

The piston 386 is actuated within the cylinder 388 by a source of pressure P that passes through a valve 394 under the control of a solenoid B′ and a spring 395. The pressure is applied through the valve to either one of a pair of lines 396 and 398 that are connected, respectively, to the left-hand and right-hand ends of the cylinder 388. When the solenoid B′ is energized, as shown in FIGURE 26B, the pressure is applied to the line 398, forcing the piston 386 to the left and raising the jogger table. When the solenoid B′ is de-energized, however, as shown in FIGURE 26C, the pressure passes through the valve to the line 396 of the air cylinder. In this case the piston 386 is forced to the right, thereby lowering the jogger table.

The movement of the piston 386 to the right is constrained by a secondary piston 399 that is coupled thereto by a link 400 and which moves within a secondary hydraulic cylinder 401. The action of the secondary piston 399 moving within the secondary hydraulic cylinder 401 is the same as that of the secondary piston 372 and the secondary cylinder 375 associated with the swing table 309. Namely, a check valve 402 in the pistons 399 prevents the piston from moving to the right; movement to the left is not inhibited. Movement of the piston to the right, i.e., downward movement of the jogger table, however, is controlled by a pair of hydraulic valves 404 and 405 that are coupled to the cylinder by a pair of lines 406 and 408, respectively. The valves are in turn controlled by a pair of solenoids B1′ and B2′ in the same fashion as the hydraulic valves 379 and 380 associated with the swing table 309 are controlled by the solenoids A1′ and A2′. That is, when solenoid B′ is de-energized and solenoids B1′ and B2′ are both energized, as shown in FIGURE 26C, the piston 386 moves to the right at a first relatively slow rate. When the solenoids B′ and B2′ are de-energized and the solenoid B1′ is energized, as shown in FIGURE 26E, the piston 386 moves to the right, lowering the jogger table at a relatively rapid rate.

*Indexing mechanism*

When a pile of signatures is deposited upon the conveyor 311, as shown in FIGURE 26F, and the jogger table lies below the conveyor, a solenoid U′ is energized, coupling pressure from a source P through a valve 409 to a pressure line 410. The line 410 is connected to the left-hand end of a cylinder 411 and moves an indexing piston 412 to the right. Movement of the piston to the right causes a gear 413 coupled thereto to rotate counterclockwise, thereby, through the use of a belt 414, moving the conveyor 311 to the left and moving the stack of signatures away from above the jogger table.

When the piston 412 reaches the end of its stroke, it actuates a switch 20LS which allows the jogger table to be returned to its upward position. Afterward, when solenoid U′ is de-energized, applying pressure to a line 415 connected to the right-hand end of the cylinder 411, the piston 412 is moved to the left. This movement imparts no rotational movement to the gear 413, however, because of a ratchet arrangement therein (not shown).

OPERATION OF EMBODIMENT SHOWN IN FIGURES 26A–28B

FIGURES 28A and 28B are detailed circuit diagrams of the various limit switches of the jogger mechanism and various relays and their associated contacts. To aid in the description, the electrical lines of the figures are numbered from 1 through 36 on the right-hand sides of the figures and from 4′ to 34′ on the left-hand sides. It should be noted here that in FIGURES 28A and 28B the limit switches are all shown in their de-actuated positions. Thus, for example, in line 4 one section of limit switch 2LS is opened during the de-actuated state of the switch, whereas in line 9 another section is closed when the switch is de-actuated.

*Primary relays and switches*

Electrical power is supplied on lines $L_1$ and $L_2$ at the top of FIGURE 28A. An OFF-ON switch in the line $L_1$ serves as a primary control switch. Once the switch is closed, however, a pair of relays R1A and R1B (lines 18 and 19) and a relay R2 (line 33) serve as the primary control elements.

To energize relays R1A and R1B, limit switch 3LS (line 20′) must be actuated. This limit switch is actuated only when the jogger table 310 is in its most downward position. The jogger table may be brought to this position by depressing a CLEAR switch in line 7 to short circuit an associated set of contacts in line **8*a*′**. A circuit is then completed through a normally closed contact R1A to energize solenoid B1′. When solenoid B1′ is energized, the jogger table moves downwardly, finally actuating switch 3LS.

When switch 3LS is actuated (line 20′), a circuit is completed through a normally closed contact R1B (line 20) and a switch 1SW to a READY TO START lamp in line 20. The switch 1SW is a jam switch whose actuating arm extends out over the jogger box 308 to sense a pile up or jam of signatures. If there is no jam, the switch 1SW is de-actuated and the READY TO START lamp is energized, indicating that the jogger may be started.

At this time, then a START switch in line 20′ may be depressed momentarily to complete a circuit through the closed switch 3LS, a normally closed STOP switch, a pair of jam switches, and the closed switch 1SW to energize both relays R1A and R1B. The jam switches are similar to the switch 1SW, and are located at various positions in the jogger system.

Having once been energized, the relays R1A and R1B are held energized through a STOP switch, a SAFE switch, and a contact R1A that is kept closed by relay R1A, all in line 18'.

Relay R2 (line 33) is energized after the energization of relay R1A through a normally open, now closed, contact R1A.

*Stream direction control*

When the relay R1B is energized, an associated contact R1B in line 34' closes and completes a circuit to a relay R7 through a switch placed in a GOOD PRODUCT position. When relay R7 is energized, an associated contact R7 in line 28 is closed and, together with a normally closed contact R8A, completes a circuit to solenoid M'. Solenoid M' controls the interrupter 301 of FIGURE 26A, and when energized causes the interrupter fingers to move upward, thereby interrupting the flow of signatures. As soon as a gap in the stream is sensed by the switch 21LS whose actuating arm extends out over the conveyor belt near the bypass gate 302, a circuit is completed (line 23) through a closed relay contact R7 and the deactuated limit switch contact 21LS to energize relays R8A and R8B. Once energized, these relays are held energized through the closed contact R7 and a contact R8B that is now closed due to the energization of its associated relay. Another energizing path to the relays R8A and R8B is provided through an actuated contact 21LS and contact R8A.

Upon the energization of relay R8A, a normally closed relay contact R8A (line 28') is opened, thereby opening the circuit to the jam interrupter solenoid M' and causing the interrupter fingers to move downwardly, permitting the stream of signatures to flow once again to the bypass gate 302.

Since relay contact R8A (line 27') is closed, completing a circuit to the bypass gate solenoid F' (line 26), the bypass gate is moved to its downward position passing signatures to the main jogger mechanism. At the same time, the relay contact R8A completes a circuit through a switch contact 18LS to energize solenoid O' which controls the conveyor clutch 349 of FIGURE 26A, placing the conveyor in operation. Solenoid O' is a low voltage, intermittent duty solenoid, and thus it has been placed in a separate circuit through the use of a transformer whose primary winding is in line 27. The switch 18LS includes another contact in line 29 that controls the energization of a solenoid R' which, when energized, disengages the conveyor clutch. The switch 18LS operates so that once the conveyor clutch is engaged, the switch is deactuated, opening the contact 18LS in line 27 and closing the contact in line 29. This allows the clutch to be disengaged subsequently, for example, when the contact R8A in line 28 is closed. In similar fashion the switch 18LS is actuated when the clutch is disengaged, and the contact 18LS in line 27 is closed, permitting subsequent engagement of the clutch.

While the jogger is running, the gate 302 may be moved to its upward position to divert the stream of signatures from the main jogger mechanism to the catch plate 346 of FIGURE 26A for manual pickup. This is brought about by de-energizing relay R7 (line 34). Relay R7 is de-energized when the switch in line 34' is moved to the BAD PRODUCT position, or when relay R1B in line 19 is de-energized. Relay R1B is de-energized when one of the jam switches in line 18 is actuated, or either the STOP or SAFE switch is depressed.

When relay R7 is de-energized, an associated contact R7 (line 27') completes a circuit through a normally open, now closed, contact R8A to energize the jam interrupter solenoid M'. Immediately, the interrupter 301 of FIGURE 26A stops the flow of moving signatures. Concurrently, contact R7 in line 23' is opened; however, the relays R8A and R8B remain energized through a presently closed contact 21LS and a closed contact R8A, both in line 24'. As soon as a gap in the stream of signatures is sensed by the switch 21LS, the corresponding contact in line 24' is opened, thereby de-energizing relays R8A and R8B. When these relays are de-energized, the circuits to the solenoid F' (line 26) and solenoid M' (line 28) are broken. This causes the bypass gate 302 to move upwardly and the jam interrupter 301 to move downwardly. Thus, the signatures continue to flow onward through the bypass gate to the catch plate 346 for manual pickup. It should also be noted that closed contact R8A in line 28' completes a circuit to solenoid R' disengaging the main jogger conveyor clutch.

*Swing table control*

The up, down, forward, and back movement of the swing table 309, with downward movement taking place at a relatively fast or a relatively slow rate, is controlled by two relays R3 and R6 (lines 3 and 32) and 6 switches four of which are actuated by the swing table itself. Of the four switches actuated by the swing table, switches 02LS and 03LS are actuated when the table comes forward in its upward position. As the swing table descends in its forward position, switch 02LS is deactuated at the point at which the swing table passes through the jogger table 310. Switch 03LS is deactuated when the swing table, still in its forward position, reaches its most downward position. Switch 10LS is actuated by the swing table when it is fully retracted, regardless of vertical position. Switch 12'LS is actuated when the swing table is in its upward position, regardless of its forward or backward position.

The remaining two switches are switches 1LS and 2LS (lines 6b' and 4'). Switch 1LS is employed to sense the height of the pile of jogged signatures in the jogger box. Switch 2LS is actuated by the jogger table as it descends, and provides a signal when the jogger table is far enough down so that the swing table may come forward without hitting the top of the completed pile of signatures on the jogger table.

Note that most of the circuitry here involved receives power through a normally open contact R2 (line 4'). When this primary relay contact is open, indicating that the jogger mechanism is inoperative, relay R3 (line 3) is de-energized. When relay R3 is de-energized an associated normally closed relay contact R3 in line 2 completes a circuit to solenoid L' causing the swing table to move backward. When the swing table is fully retracted, switch 10LS (line 5) is actuated, thereby energizing solenoid A', which causes the swing table to move upward. When the swing table is in its upward position, switch 12'LS (line 4') is actuated; however, because relay contact R2 is open, solenoid P' cannot be energized, and the swing table remains in its upward and retracted position.

As noted above, the jogger table 310 must be in its most downward position (actuating switch 3LS) to start the jogger mechanism. With the jogger table in this position, switch 2LS (line 4') is also actuated. Thus, when the jogger is started and relay contact R2 is closed, solenoid P' and relay R3 are both energized through switches 2LS and 12'LS. Energizing relay R3 opens the normally closed relay contact R3 in line 2, thereby de-energizing solenoid L' which retains the swing table in its retracted position. Solenoid P' thus causes the swing table to move forward, actuating switches 02LS and 03LS when fully forward. Switch 03LS (line 32') energizes relay R6, one of whose contacts (line 4') retains relay R3 and solenoid P' energized, ensuring that the swing table remains forward.

When the swing table started forward switch 10LS was deactuated (line 5'), thereby de-energizing solenoid A'. The swing table is, however, retained in its upward position by the action of the check valve 373 in the piston 372 of FIGURE 26B.

Upon the de-energization of solenoid A′ the swing table is free to be lowered when solenoid A1′ (line 6) is energized through the closed contact 02LS (actuated when the swing table is in its forward position) and the contact 1LS (actuated as the stream of signatures entering the jogger box forms a pile therein sufficiently high to strike the actuating arm of the switch 1LS). In line 14′, however, switch 02LS is in a closed position, thereby energizing solenoid A2′ which slows the descent of the swing table. Therefore, as the swing table descends, at a relatively slow rate, the top of the stack of signatures formed thereon also drops, thereby deactuating switch 1LS and de-energizing solenoid A1′, stopping the downward movement. As may be seen, then, the swing table moves downwardly in an intermittent fashion as the stack of signatures formed thereon grows sufficiently high, after each intermittent descent, to reactuate the switch 1LS.

The swing table continues its intermittent, downward descent, deactuating switch 12 and finally deactuating switch 02LS when the swing table passes through the jogger table, depositing the partially formed stack of signatures onto the jogger table. When switch 02LS is deactuated, the circuit through contact 1LS (line **6*b*′) to solenoid A1′ is broken and a new circuit through a normally open (now closed) R6 contact (line 6*a*′) is made. At the same time, the 02LS contact in line 14′** is opened, thereby de-energizing the solenoid A2′. Thus, the swing table moves downwardly at a relatively rapid rate.

When the swing table reaches its most downward position, switch 03LS (line 32′) is deactuated, thereby de-energizing the relay R6. This opens the R6 contact associated with line 4′, and since at this time the switch 12′LS is deactuated, relay R3 and solenoid P′ are de-energized. Upon the de-energization of relay R3, normally closed relay switch R3 in line 2 completes a circuit to solenoid L′, thereby retracting the swing table. When the swing table is fully retracted, switch 10LS (line 5′) is actuated, thereby energizing solenoid A′ and moving the swing table upward. When the swing table is fully raised, switch 12′LS is actuated, and, as soon as the jogger table descends below the switch 2LS, the swing table starts forward again for the next cycle of operation.

*Jogger table control*

The jogger table 310 is capable of moving upwardly or downwardly, with its downward motion being relatively fast or relatively slow. These actions are controlled by four relays: TDR, R5B, R5A, and R4 (lines 9, 11, 12, and 15). Relay TDR is a time delay relay whose contact response is delayed for a predetermined time after the relay coil itself is energized.

Control of the jogger table is also effected by seven switches: 1LS, 02LS, 2LS, 19LS, 9LS, 3LS, and 20LS. Switches 1LS, 02LS, 2LS, and 3LS have been described above. Switch 19LS is actuated by the jogger table when, in descending, it reaches the position where the height of the pile of signatures in the jogger box is substantially equal to the desired delivered pile height. Switch 9LS is located at the entrance to the jogger box near the speed up or "whiz" wheels 355, and is actuated by signatures entering the jogger box. Switch 20LS is actuated by the piston 412 which drives the conveyor belts 311 used to remove the completed stacks of signatures from the jogger box. This switch is actuated when the piston reaches the end of the delivery stroke.

Three solenoids are involved in the operation of the jogger table: solenoid B′ (line 14), which sends the jogger table upward when energized; solenoid B1′ (line 7), which permits the descent of the jogger table if solenoid B′ is de-energized; and solenoid B2′ (line 8), which slows the descent of the jogger table.

When the jogger table is in its most downward position actuating switch 3LS, solenoid U′ (line 17) is energized, and the indexing piston goes through a delivery stroke moving a completed stack of signatures away from the jogger box 308 on the conveyor 311. At the end of the stroke, the indexing piston actuates switch 20LS (line 15). At this time, as noted above, the swing table is moving forward and, when it is in its most forward position, switch 02LS is actuated (line 14′), thereby energizing relay R4 and solenoid B′. An R4 contact in line 14 provides a bypass around the switch 20LS so that when the switch is deactuated, solenoid B′ remains energized. Solenoid B′ causes the jogger table to move upward. As the table rises, it deactuates switches 3LS, 2LS, and 19LS in sequence.

When the swing table, carrying a partially completed stack of signatures, descends through the jogger table to deactuate switch 02LS (line 14′), the relay R4 and solenoid B′ are de-energized. In line **6*b*′ a circuit is completed through switches 1LS, 02LS, and the CLEAR switch to energize solenoid B1′, thereby permitting the jogger table to move downwardly. In line 8*b*′ a circuit is completed through a normally closed relay contact R5A to energize solenoid B2′, which slows the descent of the jogger table. Thus, the jogger table moves downwardly in an intermittent fashion under the action of switch 1LS (line 6*b*′**) to form a stack of signatures thereon.

When, during the downward movement of the jogger table, the table actuates the switch 19LS (line 9′), a time delay relay TDR is energized. The switch 19LS also completes a circuit through a normally closed relay contact R5A (line 10) to energize the jogger interrupter solenoid S′. The jogger interrupter moves upwardly, thereby interrupting the stream of signatures flowing into the jogger box and onto the jogger table.

At a predetermined time after the energization of the time delay relay TDR, a relay contact TDR in line 10 closes. When the break in the signature stream caused by the action of the jogger interrupter is sensed by the switch 9LS (the switch is deactuated), a switch contact 9LS in line 10 is closed, thereby completing a circuit to relays R5B and R5A (lines 11 and 12).

Once energized, relays R5A and R5B remain energized through a normally closed contact 3LS (line 11′) and one of the relay contacts R5B. Another relay contact R5B in line 7′ closes and completes a circuit through the CLEAR switch to the solenoid B1′, which permits the jogger table to move downwardly. At the same time, relay contact R5A in line **8*b*′ is opened, de-energizing solenoid B2′, which allows the jogger table to move downward rapidly. In line 10*a* normally closed relay contact R5A** is opened, de-energizing the solenoid S′, and the jogger interrupter is deactuated, permitting the stream of signatures to flow once again to the jogger box.

It should be noted here that the time delay relay TDR in line 9 is utilized to prevent the relays R5B and R5A (lines 11 and 12) from being energized immediately after the jogger interrupter is actuated. Immediate energization of these relays could occur, for example, if a small gap in the stream, caused by the removal of a few signatures from the stream by a jogger operator, were sensed by the switch 9LS. Thus, the delayed contact action of the TDR relay prevents an immediate energization of the relays R5A and R5B, if the contact 9LS in line 10 is closed, and thereby provides at least a minimum gap in the stream of signatures.

As the jogger table descends rapidly, it actuates switches 2LS and 3LS in sequence, thus de-energizing relays TDR (line 9) and R5B and R5A (lines 11 and 12).

When the jogger table reaches its most downward position, the stack of signatures thereon is transferred to the conveyor belt 311. Because switch 3LS in line 17′ is now actuated, solenoid U′ is energized, thereby actuating the indexing piston, which causes the conveyor belts to move the completed stack of signatures away from a position above the jogger table. At the end of the piston stroke switch 20LS (line 15) is actuated, thereby energizing relay R4 and solenoid B′ and sending the jogger table upwardly for another cycle of operation.

The invention may be embodied in other specific forms without departing from the essential characteristics thereof. The present embodiments, therefore, are to be considered in all respects as merely illustrative and not as being restrictive, the scope of the invention being indicated by the appended claims rather than by the foregoing description, and all modifications and variations that fall within the meaning and purview and range of equivalency of the appended claims are intended to be embodied therein.

I claim:

1. A jogger mechanism comprising a conveyor by which signatures are delivered in a stream, interrupter means positioned in contiguous relation with said conveyor to interrupt periodically said signature stream, a jogger receptacle to receive signatures from said conveyor, a plurality of spaced members positioned within said jogger receptacle to support the signatures delivered thereto by said conveyor, means to move said spaced members in a down, retract, up, and extend cycle, a vertically operable jogger table formed from members capable of intermeshing with said spaced members for receiving a partially formed stack of signatures therefrom during a down cycle of said spaced members, means to move said jogger table in an up and down cycle, and means for receiving a completed stack of signatures from said jogger table in its down cycle.

2. In combination with apparatus as recited in claim 1, means for moving said spaced members downwardly at a first rate until the spaced members are intermeshed with the jogger table, means for moving the spaced members downwardly at a second rate greater than the first rate for the remainder of the down portion of the cycle, and means for extending the spaced members during an interruption in the flow of signatures to the jogger receptacle.

3. Apparatus as recited in claim 1, in which the means for moving a completed stack of signatures from the jogger table in the down portion of its cycle comprises a second conveyor, the second conveyor being capable of intermeshing with the jogger table so that the jogger table may pass therethrough, means responsive to the positioning of the jogger table below the second conveyor for indexing the second conveyor thereby to remove the stack of signatures from a position above the jogger table, and means responsive to the indexing of the second conveyor for raising the jogger table in the up portion of its cycle.

4. Signature handling apparatus comprising conveying apparatus for conveying signatures to a first position, a first platform located at a first location directly below said first position for receiving said signatures one on top of the other, means for lowering said first platform as said signatures are accumulated thereon, a second platform located at a second location below said first platform and capable of having said first platform passed therethrough, means responsive to the passing of said first platform through said second platform for swinging the first platform downwardly, backwardly, and upwardly to a third location adjacent to said first location, means for lowering said second platform as said signatures are accumulated thereon, means responsive to the position of said second platform for interrupting the flow of signatures, sensing means for generating a signal when the last one of said signatures has been deposited on said second platform, means responsive to said signal for reinstating the flow of signatures, means responsive to said signal for lowering the second platform through a conveyor system thereby to deposit the accumulated stack of signatures upon the conveyor system, means responsive to the position of the second platform in its downward movement to the conveyor system for swinging the first platform to said first location to receive signatures from the conveying apparatus, means responsive to the depositing of the stack of signatures upon the conveyor system for indexing the system thereby to remove the stack of signatures, and means responsive to the indexing of the conveyor system for raising the second platform to the second location.

5. Signature jogging apparatus comprising a jogging receptacle, a conveyor for delivering a stream of signatures to the jogging receptacle, a swing table, means for cyclically moving the swing table downwardly, backwardly, upwardly, and forwardly, the downward movement of the swing table taking place within the jogger receptacle, a jogger table positioned within the jogger receptacle at a location between the uppermost and lowermost positions of the swing table in the jogger receptacle, the jogger and swing tables being capable of passing through each other, means for cyclically moving the jogger table downwardly and upwardly, the downward movement of the jogger table taking place only after the swing table has passed through the jogger table transferring a partially completed stack of signatures thereto, and a conveyor system located below the jogger table for conveying away a completed stack of signatures transferred thereto by the jogger table in the downward portion of its cycle.

6. In combination with apparatus as recited in claim 5, means for controlling the downward movement of the swing table so that the movement proceeds at a first rate prior to the intermeshing of the swing and jogger tables and at a second, faster rate after the intermeshing of the tables, means for controlling the downward movement of the jogger table so that it proceeds initially at a predetermined rate, means for temporarily interrupting the stream of signatures when the jogger table reaches a predetermined position during its downward movement at the predetermined rate, means for controlling the forward movement of the swing table so that it takes place during the interruption in the stream of signatures, and means for controlling the remaining downward movement of the jogger table so that it proceeds at another rate faster than the predetermined rate.

7. A jogger mechanism comprising a conveyor by which signatures are delivered in a stream, interrupter means positioned in contiguous relation with the conveyor to interrupt periodically the signature stream, a jogger receptacle to receive the signatures from the conveyor, a plurality of spaced members positioned within the jogger receptacle to support the signatures delivered thereto by the conveyor, a vertically operable jogger table positioned below the spaced members and capable of being intermeshed therewith, means for moving the spaced members downwardly at a first rate as signatures are accumulated thereon, means for moving the spaced members downwardly at a second rate faster than the first rate and then backwardly and upwardly to a position outside the jogger receptacle after the spaced members have intermeshed with the jogger table, means for moving the jogger table downwardly at a predetermined rate after being intermeshed with the spaced members, means for sensing a gap in the stream of signatures delivered to the jogger receptacle, means responsive to the sensing of a gap in the stream for moving the jogger table downwardly at a given rate greater than the predetermined rate, means for receiving a completed stack of signatures from the jogger table during its downward movement at the given rate, means for moving the spaced members forwardly after the sensing of the gap in the stream thereby to commence the formation of a new stack of signatures, and means for moving the jogger table upwardly to a position below the spaced members.

8. A signature handling and stacking apparatus comprising a jogger box, a swing table for receiving signatures fed to the jogger box, a vertically movable jogger table within the jogger box and intermeshing with the swing table, drive means for the swing table for moving the table in a down, retract, up, and extend cycle, whereby the swing table initially receives the signatures thereon as it moves downwardly within the jogger box before intermeshing with the jogger table to transfer the signatures thereto and then is retracted from the jogger box while the signatures are stacked on the downwardly moving jogger table, means for interrupting the flow of signatures into the jogger box after the jogger table has moved downwardly to a predetermined point, means for sensing a gap in the flow of signatures to the jogger box, means responsive to the sensing of the gap for reinstating the flow of signatures to the jogger box, and means for regulating the forward movement of the swing table to take place during the gap in the flow of signatures to the jogger box.

9. In combination with apparatus as recited in claim 8, removing means capable of intermeshing with the jogger table and positioned so that the jogger table passes therethrough during its downward movement thereby to transfer a stack of signatures from the jogger table to the removing means.

10. In combination with apparatus as recited in claim 8, means for regulating the downward movement of the swing table so that it proceeds at a first rate prior to the intermeshing of the swing and jogger tables and at a second faster rate subsequent to the intermeshing.

11. In combination with apparatus as recited in claim 9, means for regulating the downward movement of the jogger table so that it proceeds at a predetermined rate prior to the sensing of the gap and at another rate faster than the predetermined rate after the sensing of the gap.

12. A signature handling and stacking apparatus comprising a stacking receptacle, means for successively feeding signatures into the stacking receptacle, the signatures each having a folded leading edge, a table initially within the stacking receptacle, and means for imparting a pivotal downward movement to the table as the signatures are stacked thereon, whereby the pivotal downward movement of the table compensates for the increased height of the folded leading edges of the signatures with respect to the trailing edges thereof.

13. A signature handling and stacking apparatus as set forth in claim 44 including means intermeshing with the table to receive the stack from the table when the table moves into intermeshing relation therewith.

14. A signature handling and stacking apparatus as set forth in claim 13 including means to retract the table out of intermeshing relation with the stack receiving means and then to impart upward and forward motion to the table to return it to its initial signature receiving position.

15. A signature handling and stacking apparatus comprising a stacking receptacle, a vertically movable elevator within said stacking receptacle, means for successively feeding signatures into the stacking receptacle, a stacking table movable in a down, retract, up, and extend cycle and intermeshing with the upper surface of the elevator when the elevator is in raised position and the movable table is in the down position of its cycle to transfer a partial stack built up on said table to the elevator, the table being initially in position at the upper end of the stacking receptacle to receive the signatures, then moving downwardly as the stack of signatures is built up thereon and ultimately coming into intermeshing relation with the elevator to transfer the partial stack of signatures to the elevator, then retracting out of intermeshing relation with the elevator and out of the stacking receptacle while the signatures are fed directly onto the downwardly moving elevator to complete the stack, and then moving to the initial position to receive the incoming signatures while the stack is being removed from the elevator and means for moving the stacking table and the vertically moving elevator in synchronism so that the signatures are initially stacked on the stacking table and then on the vertically moving elevator after the stacking table is retracted from the stacking receptacle.

16. A signature handling and stacking apparatus comprising a stacking receptacle, a vertically moving elevator within said stacking receptacle, means for successively feeding signatures to the stacking receptacle, each of said signatures being folded and fed to the stacking receptacle with the folded edge as the leading edge, a stacking table movable in a down, retract, up and extend cycle and intermeshing with the elevator when the elevator is in raised position and the table is in the down position of its cycle, the table being initially in position at the upper end of the stacking receptacle to receive the signatures, then moving downwardly into intermeshing relation with the elevator to transfer the signatures to the elevator, then retracting out of intermeshing relation with the elevator while the signatures are fed onto the downwardly moving elevator, and then moving to the initial position to receive the incoming signatures while the stack is being removed from the elevator, an arm coupled to the table, pivotally mounted means coupled to the arm for moving the arm forwardly and backwardly to move the table in the forward and retract directions, and means coupled to the arm for pivotally moving the arm downwardly and upwardly, the last-mentioned pivot being located in a direction upstream of the direction of feed of the signatures to the stacking receptacle so that the downward pivotal motion of the table increases the angle of the table to compensate for the increased height of the folded leading edges of the signatures with respect to the trailing edges thereof.

17. A signature handling and stacking apparatus comprising a signature jogging stacking receptacle, a conveyor to feed overlapping signatures in a stream to the stacking receptacle, means interrupting the signature stream after a stack of predetermined height is built up in the stacking receptacle while permitting the conveyor to move in slipping relationship with the signature stream with the interrupted signatures still in overlapping condition, a vertically movable first support positioned within the stacking receptacle to receive the signatures delivered thereto, and a second support having an upper surface which intermeshes with the first support to enable the first support to transfer the stack of signatures from the first to the second support, and means controlled by the position of the second support for controlling the intercepting means.

References Cited by the Examiner

UNITED STATES PATENTS

| | | | |
|---|---|---|---|
| 2,061,358 | 11/1936 | Hunter et al. | 214—18 |
| 2,205,767 | 6/1940 | Lamb | 214—6 |
| 2,318,451 | 5/1943 | Belluche | 271—64 |
| 2,377,295 | 5/1945 | Cook | 271—12 |
| 2,392,746 | 1/1946 | Labombarde | 271—87 |
| 2,606,669 | 8/1952 | Morrison | 214—6 |
| 2,645,476 | 7/1953 | Wood et al. | 271—88 X |
| 2,730,247 | 1/1956 | Lawson. | |
| 2,756,049 | 7/1956 | Stolz | 271—12 |
| 2,770,346 | 11/1956 | Oswalt | 198—19 |
| 2,884,246 | 4/1959 | Kile et al. | 271—89 X |
| 2,963,293 | 12/1960 | Klein | 271—57 |
| 2,973,202 | 2/1961 | Schmeck | 271—57 |
| 3,000,631 | 9/1961 | Hain | 271—64 |

FOREIGN PATENTS

| | | |
|---|---|---|
| 585,778 | 2/1947 | Great Britain. |

GERALD M. FORLENZA, *Primary Examiner.*

MORRIS TEMIN, HUGO O. SCHULZ, *Examiners.*

UNITED STATES PATENT OFFICE
CERTIFICATE OF CORRECTION

Patent No. 3,231,100 January 25, 1966

Harry W. Faeber

It is hereby certified that error appears in the above numbered patent requiring correction and that the said Letters Patent should read as corrected below.

Column 6, line 52, for "conect" read -- connect --; line 66, for "in operative" read -- inoperative --; column 7, line 21, for "oppoiste" read -- opposite --; line 44, strike out "is", second occurrence; column 14, lines 17 and 18, for "energizes" read -- energize --; line 31, for "enerfiization" read -- energization --; column 19, line 59, for "transfor" read -- transfer --; column 20, line 22, for "form" read -- from --; column 31, line 42, for the claim reference numeral "44" read -- 12 --.

Signed and sealed this 10th day of January 1967.

(SEAL)
Attest:

ERNEST W. SWIDER
Attesting Officer

EDWARD J. BRENNER
Commissioner of Patents